(12) United States Patent
Fontana et al.

(10) Patent No.: US 10,148,169 B2
(45) Date of Patent: Dec. 4, 2018

(54) BRIDGELESS FLYBACK CONVERTER CIRCUIT AND METHOD OF OPERATING THEREOF

(71) Applicant: Infineon Technologies Austria AG, Villach (AT)

(72) Inventors: Nico Fontana, Gemona del Friuli (IT); Kenneth Kin Leong, Villach (AT); Anders Soren Lind, San Jose, CA (US); Eric G. Persson, Minnetonka, MN (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/360,747

(22) Filed: Nov. 23, 2016

(65) Prior Publication Data
US 2018/0145595 A1    May 24, 2018

(51) Int. Cl.
*H02M 3/335*    (2006.01)
*H02M 1/42*    (2007.01)
(Continued)

(52) U.S. Cl.
CPC .......... *H02M 1/4258* (2013.01); *H02M 1/08* (2013.01); *H02M 1/12* (2013.01); *H02M 1/143* (2013.01);
(Continued)

(58) Field of Classification Search
CPC ...... H02M 3/33507; H02M 1/08; H02M 1/12; H02M 1/143; H02M 1/34; H02M 1/36;
(Continued)

(56) References Cited

U.S. PATENT DOCUMENTS

| | | | |
|---|---|---|---|
| 5,218,520 A | * | 6/1993 | Rozman ................. H02M 1/14 307/105 |
| 7,903,442 B2 | * | 3/2011 | McDonald ............ H02M 7/217 363/127 |

(Continued)

OTHER PUBLICATIONS

Jong-Won Shin et al., High-Efficiency Bridgeless Flyback Rectifier With Bidirectional Switch and Dual Output Windings, IEEE Transactions on Power Electronics, vol. 29, No. 9, Sep. 2014.*

(Continued)

*Primary Examiner* — Fred E Finch, III
*Assistant Examiner* — Demetries A Gibson
(74) *Attorney, Agent, or Firm* — Murphy, Bilak & Homiller, PLLC

(57) ABSTRACT

A circuit includes a bridgeless flyback converter having a primary side electromagnetically coupled to a secondary side by a transformer, the primary side being devoid of a diode bridge rectifier, an input capacitor coupled to the primary side of the bridgeless flyback converter, an output capacitor coupled to the secondary side of the bridgeless flyback converter, an EMI (electromagnetic interference) filter coupled between an AC input and the input capacitor, and a compensation stage coupled in parallel with the output capacitor and including a storage capacitor. The input capacitor has a capacitance such that the compensation stage filters the AC mains frequency ripple of the AC input from the secondary side. The compensation stage is configured to store energy in the storage capacitor and regulate the voltage across the output capacitor. The bridgeless flyback converter is configured to regulate the voltage across the storage capacitor.

19 Claims, 50 Drawing Sheets

(51) Int. Cl.
| | |
|---|---|
| *H02M 1/08* | (2006.01) |
| *H02M 1/12* | (2006.01) |
| *H02M 1/14* | (2006.01) |
| *H02M 1/34* | (2007.01) |
| *H02M 1/36* | (2007.01) |
| *H02M 1/44* | (2007.01) |
| *H02M 7/217* | (2006.01) |
| *H02M 1/00* | (2006.01) |

(52) U.S. Cl.
CPC ............... *H02M 1/34* (2013.01); *H02M 1/36* (2013.01); *H02M 1/42* (2013.01); *H02M 1/44* (2013.01); *H02M 3/33507* (2013.01); *H02M 7/217* (2013.01); *H02M 2001/0054* (2013.01)

(58) Field of Classification Search
CPC .. H02M 1/42; H02M 1/44; H02M 2001/0054; H02M 1/14; H02M 1/15; H02M 1/4258; H02M 7/217
See application file for complete search history.

(56) References Cited

U.S. PATENT DOCUMENTS

| | | | | |
|---|---|---|---|---|
| 8,670,250 | B2 * | 3/2014 | Fu | ............................ H02M 3/28 363/39 |
| 9,318,971 | B2 | 4/2016 | Yamahira | |
| 2008/0310201 | A1 * | 12/2008 | Maksimovic | ........ H02M 3/1584 363/85 |
| 2010/0246215 | A1 * | 9/2010 | Mase | ...................... H02M 1/36 363/21.04 |
| 2012/0212986 | A1 * | 8/2012 | Minami | ............... H02M 1/4208 363/126 |
| 2014/0307484 | A1 * | 10/2014 | Yang | ................. H02M 3/33569 363/21.12 |
| 2014/0328097 | A1 * | 11/2014 | Gumaer | .............. H02M 1/4225 363/89 |
| 2015/0015071 | A1 * | 1/2015 | Deboy | .................. H02M 3/335 307/31 |
| 2015/0224885 | A1 * | 8/2015 | Lee | ......................... B60L 11/18 320/109 |
| 2016/0276941 | A1 * | 9/2016 | Iwaya | .................... H02M 3/33584 |
| 2016/0329814 | A1 | 11/2016 | Fahlenkamp et al. | |
| 2017/0085183 | A1 * | 3/2017 | Notsch | ............... H02M 3/33507 |
| 2017/0271993 | A1 * | 9/2017 | Jitaru | ................... H02M 1/4225 |

OTHER PUBLICATIONS

Shin, Jong-Won et al., "Bridgeless isolated PFC Rectifier Using Bidirectional Switch and Dual Output Windings", IEEE Energy Conversion Congress and Exposition (ECCE), Sep. 2011, pp. 2879-2884.

* cited by examiner

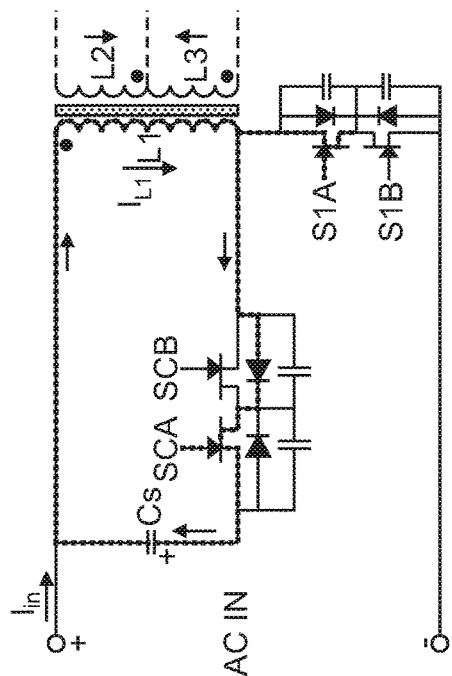
Fig. 36B
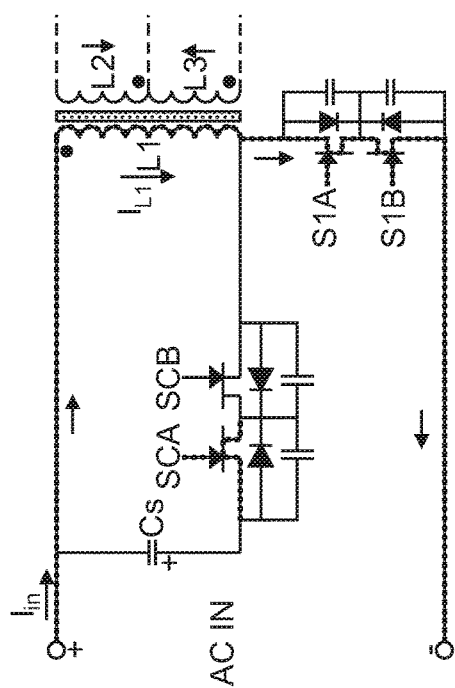
Fig. 36A
Fig. 36C

BRIDGELESS FLYBACK CONVERTER CIRCUIT AND METHOD OF OPERATING THEREOF

TECHNICAL FIELD

The present application relates to bridgeless flyback converter systems, and methods of operating bridgeless flyback converter systems.

BACKGROUND

The physical size of AC adapters and chargers for portable devices such as laptop and smartphones is an important consideration in system design. Two specific constraints define the minimum physical size of conventional adapters: the physical volumetric size consumption of the components making up the adapter; and the thermal consideration, specifically maximum skin temperature for e.g. plastic enclosures determines a maximum internal power dissipation for a given surface area (assuming uniform power dissipation/heat distribution inside the enclosure). Both constraints taken together yields a minimum possible physical size limitation using state-of-the art approaches. More specifically, the state-of-the-art approach can be described as a combination of a ubiquitous input stage combined with a converter stage.

The converter stage is traditionally implemented using some form of the flyback topology, but in some cases, also forward or similar topologies, which are essentially wide input voltage range capable DC/DC converters providing galvanic isolation (and typically voltage step-down by means of a transformer, which also provides galvanic isolation). The input stage for AC adapters operating below 65 W and with no PFC (power factor correction) requirement typically has input protection circuitry, EMI (electromagnetic interference) filter, a diode bridge rectifier and a bulk-capacitor for AC line frequency filtering.

Conventional input stages require significant physical volumetric space consumption as well as significant power losses, none of which are addressable by typically targeted loss mechanisms or space consumers in the converter. For example, Even if an ideal converter stage with no volumetric space consumption and zero power dissipation were realizable, the input stage still imposes an upper limit on power density, which is not too far away from best-in-class demonstrated power densities achieved to date (approximately 15 W/in$^3$ can be achieved in a 65 W converter using this approach, but about 50% of the volumetric space consumption and at least 30% of the power dissipation resides in the input stage, thus setting the power density of ~15 W/in$^3$ for 65 W as possibly the highest practically achievable power density with this approach. With an ideal converter stage, the theoretically highest power density achievable by is on the order of 30 W/in$^3$, but of course is not practically achievable.

SUMMARY

According to an embodiment of a circuit, the circuit comprises a bridgeless flyback converter having a primary side electromagnetically coupled to a secondary side by a transformer, the primary side being devoid of a diode bridge rectifier, an input capacitor coupled to the primary side of the bridgeless flyback converter, an output capacitor coupled to the secondary side of the bridgeless flyback converter, an EMI (electromagnetic interference) filter coupled between an AC input and the input capacitor, and a compensation stage coupled in parallel with the output capacitor and including a storage capacitor. The input capacitor has a capacitance such that the compensation stage filters the AC mains frequency ripple of the AC input from the secondary side. The compensation stage is configured to store energy in the storage capacitor and regulate the voltage across the output capacitor. The bridgeless flyback converter is configured to regulate the voltage across the storage capacitor.

According to an embodiment of a method of operating the circuit, the method comprises: filtering the AC mains frequency ripple of the AC input from the secondary side via the compensation stage; storing energy in the storage capacitor and regulating the voltage across the output capacitor; and regulating the voltage across the storage capacitor via the bridgeless flyback converter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIGS. 36A through 36C illustrate the current flow paths in the power converter circuit during different conduction periods of MODE 1.

DETAILED DESCRIPTION

Figure 1:
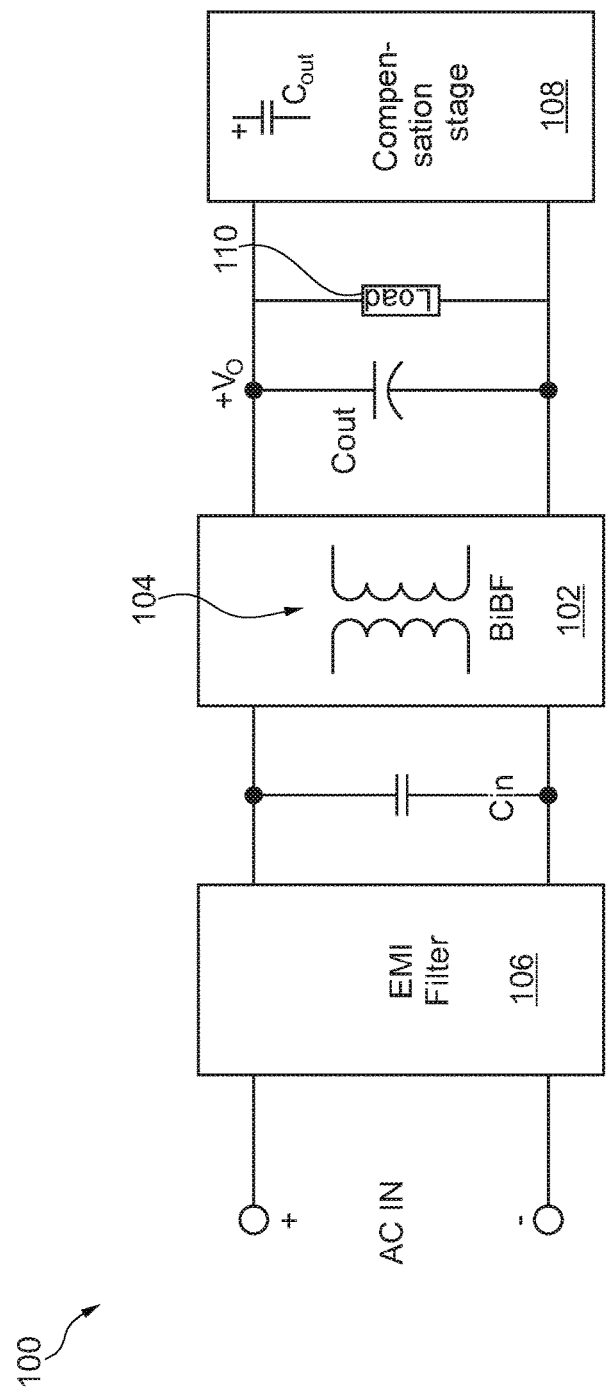
FIG. 1 illustrates a schematic diagram of a power converter circuit devoid of a diode bridge rectifier on the primary (input) side and which filters the AC mains frequency ripple of the AC input from the secondary side.

According to the embodiments described herein, a power converter circuit is provided that has a bridgeless flyback converter with a primary (input) side electromagnetically coupled to a secondary (output) side by a transformer. The flyback converter is bridgeless in that the primary side is devoid of a diode bridge rectifier. An output capacitor is coupled to the secondary side of the bridgeless flyback converter, and a compensation stage is coupled in parallel with the output capacitor. The compensation stage is configured to store energy and regulate the voltage across the output capacitor. The input capacitor of the power converter on the primary side of the power converter has a capacitance such that the compensation stage filters the AC mains frequency ripple of the AC input from the secondary side.

By moving the AC line frequency filtering to the secondary side of the power converter circuit, the input bulk capacitor size requirement can be reduced. The constraints that determine the physical size of the capacitor can be significantly mitigated and therefore the size minimized e.g. to the fundamental physical limit. The size of the bulk capacitor in a conventional arrangement, when considering universal input voltage requirement, is determined by several constraints that must be met simultaneously. For example, a large capacitance value is needed to store sufficient energy when the AC input voltage is low such as low-line situation in the United States, which could be as low as 85 Vac. A second constraint is the voltage rating, meaning the dielectric must be able to withstand high-line conditions in Europe (264 Vac). However, it is detrimental to the size of such a capacitor to have both these requirements at once, on top of the relatively poor FOM (figure or merit) at that voltage rating. By filtering the AC mains frequency ripple on the secondary side of the power converter circuit, a very low voltage range of operation can be selected for the capacitor as well as a voltage range allowing for a much better capacitor FOM, thereby greatly alleviating the constraints and consequently the physical size requirement of the capacitor. Since the compensation stage now filters the AC mains frequency ripple of the AC input from the secondary side, the conventional bulk capacitor is eliminated on the primary side. Thus, the converter input voltage range is much greater e.g. effectively 0-400V rather than ~85-400V, and the converter can be appropriately selected; dimensioned.

The power converter circuit embodiments described herein also eliminate the rectifying diode bridge on the primary side. These embodiments, in concert with the secondary side AC line frequency filtering, address directly not only the physical size constraint by minimizing bulk capacitor size, but also the thermal constraint by eliminating the rectifying diode bridge and an arbitrarily large portion of the losses associated with it. The EMI filter is not directly addressed, nor the size or losses incurred by the EMI filter, however a reduction of both size and losses in the EMI filter can be realized through soft-switching properties of the converter circuits described herein as well as increased switching frequencies. By using soft-switching, an increase in switching frequency may be afforded, and through a combination of both soft-switching and increased switching frequency, the requirements to the EMI filter can be diminished. The range of frequencies the EMI filter must attenuate might be set on the lowest end by the fundamental of the switching frequency, which is intended to be increased, and on the highest end by the high order harmonic content of the voltages and currents inside, which are to a significant extent eliminated with soft-switching techniques.

Increase of switching frequency, afforded by improvements in switch technology and materials for the passive components such as capacitors and magnetics, should result in physically smaller and less lossy EMI filters. Furthermore, the losses associated with the EMI filter can be to some degree a function of peak-to-RMS current ratio, or at the very least the high-frequency content of the AC current at frequencies where the EMI filter inductor chokes are fundamentally and intentionally lossy. A bridgeless AC/DC adapter converter operating with almost purely low-frequency (e.g. 50-60 Hz) sinusoidal input current waveforms can ensure current flowing through the EMI chokes have near zero frequency content in the range, where these chokes are intentionally lossy. The losses associated with the EMI filter can thus be effectively minimized using the power converter circuit embodiments described herein. In addition, mandatory (for regulatory compliance) requirements to PFC and THDi (total harmonic distortion current) for input power greater than 75 W might be directly met, resulting in a single architecture optimized for all power levels including e.g. the 100 W highest power profile of the USB-PD standard.

The power converter circuit embodiments described herein directly address the size associated with the bulk capacitor and losses associated with the diode bridge rectifier, both of which are fundamental limiters to power density in adapters, and both of which do not scale with switching frequency or by other traditional means. The EMI filter can scale by frequency, both in terms of physical size and losses. The power converter circuit embodiments described herein enable significantly high switching frequencies by offering soft-switching techniques (ZVS—zero voltage switching) and further benefits that can be derived by certain HEMT (high electron mobility transistor) device technology such as GaN devices with Bi-directional blocking capabilities and monolithic integration of several devices.

FIG. 1 illustrates an embodiment of a power converter circuit 100 devoid of a diode bridge rectifier on the primary (input) side, and which filters the AC mains frequency ripple of the AC input from the secondary side. The power converter circuit 100 includes a bridgeless flyback converter 102 having a primary side electromagnetically coupled to a secondary side by a transformer 104. The primary side is devoid of a diode bridge rectifier. The bridgeless flyback converter 102 is bidirectional in the sense that the bridgeless flyback converter operates from positive and negative input voltage (AC IN).

The power converter circuit further includes an input capacitor Cin coupled to the primary side of the bridgeless flyback converter 102, an output capacitor Cout coupled to the secondary side of the bridgeless flyback converter 102, an EMI (electromagnetic interference) filter 106 coupled between the AC input and the input capacitor Cin, and a compensation stage 108 coupled in parallel with both the output capacitor Cout and the load 110. The compensation stage includes a storage capacitor Cstore for storing energy, and regulates the voltage Vo across the output capacitor Cout. The input capacitor has a very small capacitance such that the compensation stage 108 filters the AC mains frequency ripple of the AC input from the secondary side. The bridgeless flyback converter 102 regulates the voltage across the storage capacitor Cstore of the compensation stage 108. The compensation stage 108 can include a buck, boost or buck-boost converter coupled to the storage capacitor through an inductor.

Figure 2:
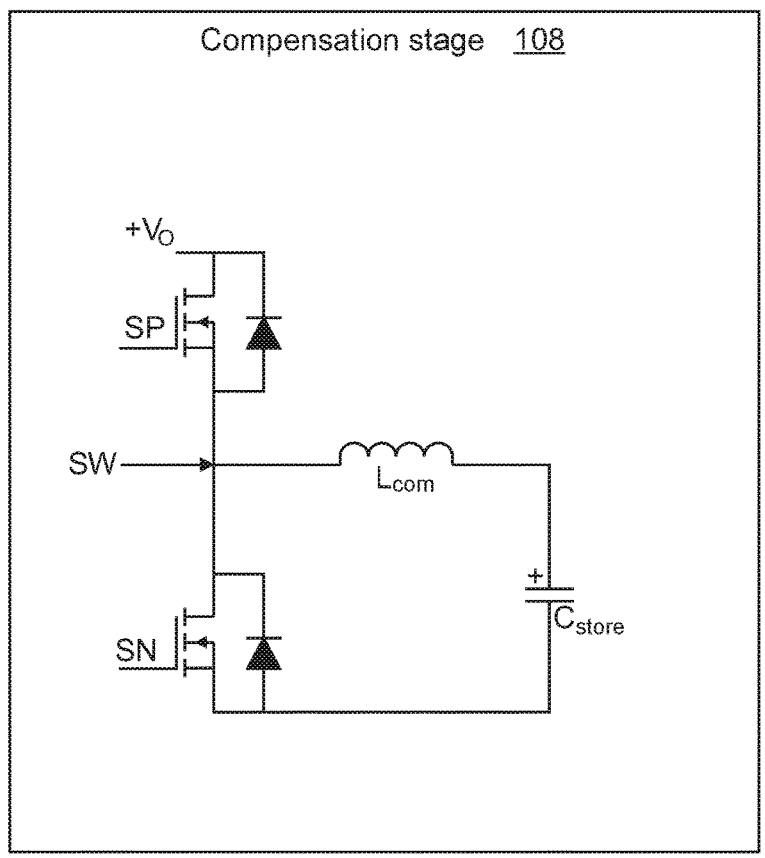
FIG. 2 illustrates a schematic diagram of a compensation stage included in the power converter circuit.

FIG. 2 illustrates an embodiment of the compensation stage 108 implemented as a buck converter. The buck converter includes a high-side switch device SP coupled between the voltage Vo across the output capacitor Cout and a common switch node SW, a low-side switch device SN coupled between the common switch node SW and a reference potential such as ground. The buck converter is coupled to the storage capacitor Cstore through an output inductor Lcom. The compensation stage of the power converter circuit 100 stores energy in the storage capacitor Cstore and regulates the voltage Vo across the output capacitor Cout as explained above, allowing for a reduction in the size of the input capacitor Cin.

Various embodiments of the bridgeless flyback converter 102 are described next under DCM (discontinuous conduction mode) operation. However, other modes of operation such as CCM (continuous conduction mode) and CRM (critical conduction mode) are possible, as well as various soft switching techniques such as TOM (triangular current mode).

Figure 3A:
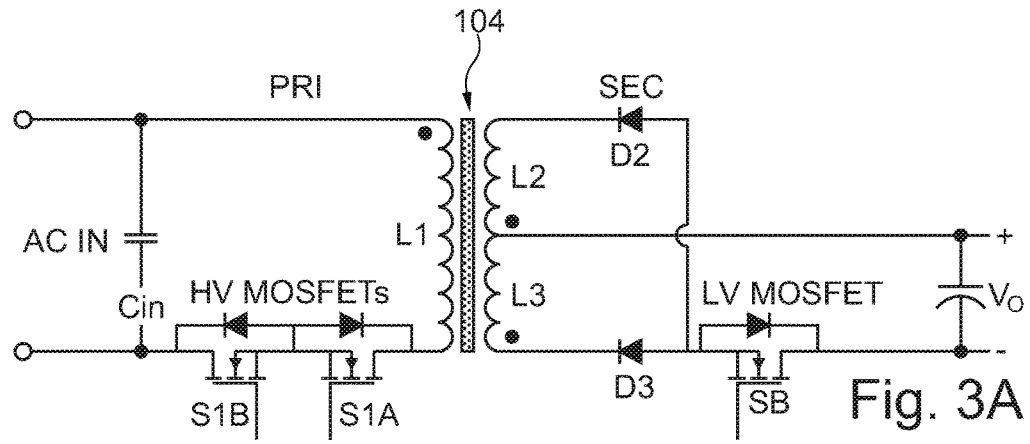
FIGS. 3A through 3C illustrate different bridgeless flyback converter topologies for the power converter circuit.
Figure 3B:
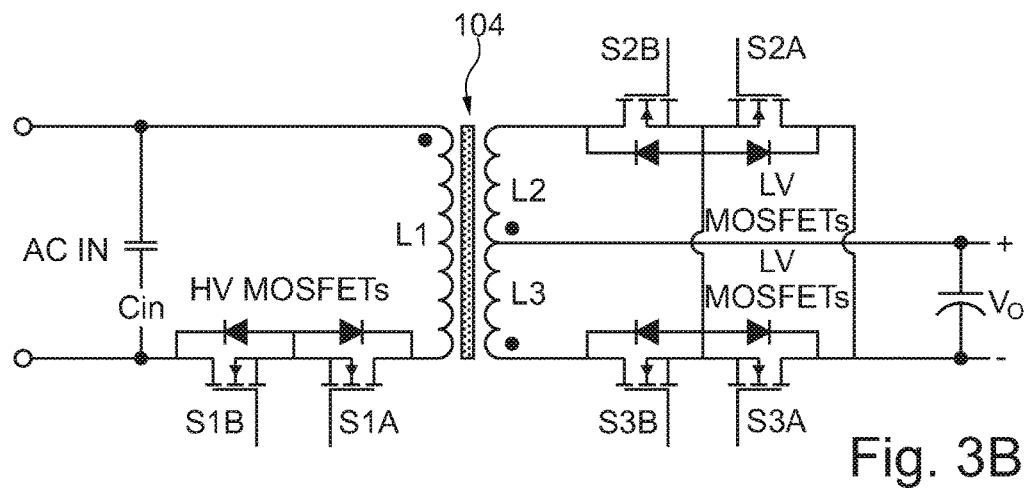

The embodiments of the bridgeless flyback converter 102 shown in FIGS. 3A and 3B use high voltage (HV) back-to-back MOSFETs (metal-oxide-semiconductor field effect transistors) on the primary side and low voltage (LV) MOSFETs on the secondary side. The embodiment of the bridgeless flyback converter 102 shown in FIG. 3C uses HV GaN-based transistors having a bidirectional configuration on the primary side and LV GaN-based transistors having a bidirectional configuration on the secondary side. In each case, the bridgeless flyback converter 102 is bidirectional in that the converter 102 operates from positive and negative input voltage (AC IN). The transformer 104 used in topologies shown in FIGS. 3A through 3C has one primary side winding L1 and two secondary side windings L2, L3. The secondary side windings L2, L3 are in either a centre-tapped configuration as shown in FIGS. 3A through 3C, or a split-winding configuration separated by switches but operating fundamentally the same way.

FIG. 3A illustrates an embodiment of the bridgeless flyback converter 102 in which a single bidirectional switch device on the primary side and formed by HV MOSFETs S1A and S1B in a source-to-source configuration, and a single secondary side switch SB plus a diode D2, D3 for each secondary side winding L2, L3 on the secondary side. All active switches S1A, S1B, SB operate in both AC input polarities, and therefore for the ideal case the polarity of the input voltage AC IN is not important for the control. However, diodes D2 and D3 have higher conduction losses compared to transistor devices. Diodes D2 and D3 and active switch SB can be repositioned in other configurations e.g. above the windings L2, L3 or below. Furthermore, D2 and D3 can be replace with active MOSFETs as synchronous rectification switches to reduce conduction losses.

FIG. 3B illustrates an embodiment of the bridgeless flyback converter 102 in which one bidirectional switch is connected in series with each winding L1, L2, L3 of the transformer 104. On the primary side, one bidirectional switch device is connected in series to the primary side winding L1 of the transformer 104. The primary side bidirectional switch device includes HV MOSFETs S1A and S1B shown in a source-to-source configuration. On the secondary side, two bi-directional switch devices are shown each in a source-to-source configuration. The first bidirectional switch device on the secondary side includes LV MOSFETs S2A and S2B, and is connected in series to secondary side winding L2 of the transformer 104. The second bidirectional switch device on the secondary side includes LV MOSFETs S3A and S3B, and is connected in series to secondary side winding L3 of the transformer 104. Both secondary-side bidirectional switch devices can share the same source point (common source), and therefore can share the same isolated gate driver across all four transistors S2A, S2B, S3A, S3B. Conduction loss across the bidirectional switch devices on the secondary side should be lower compared to the dual diode plus MOSFET configuration shown in FIG. 3A. Fundamentally, either transistor S2A or S3A is not necessarily required. However, transistors S2A and S3A could operate in parallel to reduce on-state resistance $R_{DSon}$. For all the bidirectional switch devices, a drain-to-drain configuration is also possible as well as other separate configurations including two switches separated by the secondary side windings L2, L3. IGBTs (insulated gate bipolar transistors) or other high voltage switches are also possible.

Figure 3C:
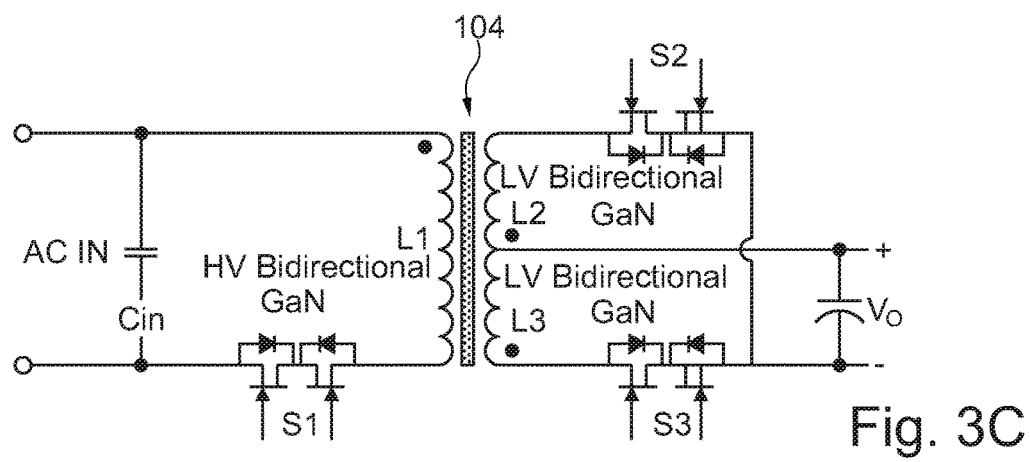

FIG. 3C illustrates an embodiment of the bridgeless flyback converter 102 in which bidirectional GaN transistors are used to form the bidirectional switch devices on the primary and secondary sides of the converter 102. Each bidirectional switch device S1, S2, S3 includes two enhancement mode GaN HEMTs configured internally in a drain-to-drain manner. Due to the construction of GaN HEMTs, each pair of GaN HEMTs share the same drift region, lowering $R_{DSon}$ to almost the same value as a single transistor device. The result is a bidirectional blocking device with the conduction loss of a single device. In FIG. 3C, the bidirectional switch device S1 on the primary side is a high voltage GaN-based device and the bidirectional switch devices S2, S3 on the secondary side are low voltage GaN-based devices. Because the GaN-based bidirectional switch devices S1, S2, S3 each have effectively the same $R_{DSon}$ value as a single transistor, the conduction losses across the active devices are the same as a conventional flyback but eliminate the diode bridge losses.

Figure 4A:
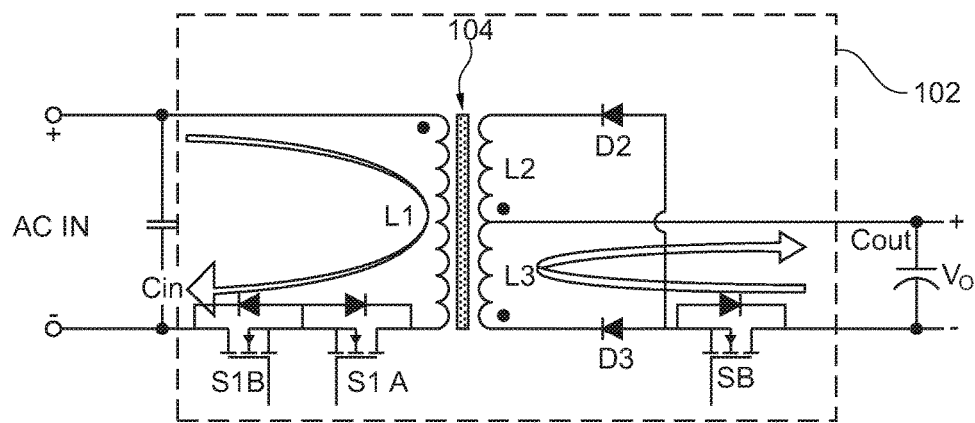
FIGS. 4A through 5B illustrate current flow paths for the bridgeless flyback converter topologies of FIGS. 3A through 3C.
Figure 4B:
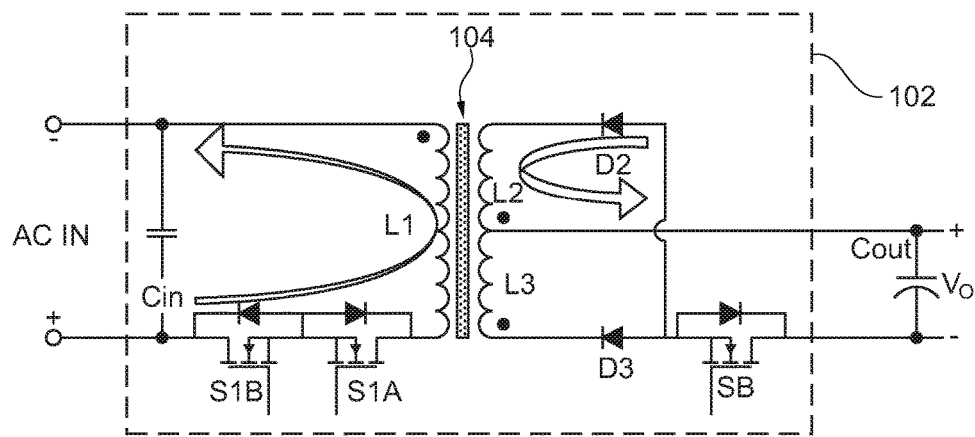
Figure 5A:
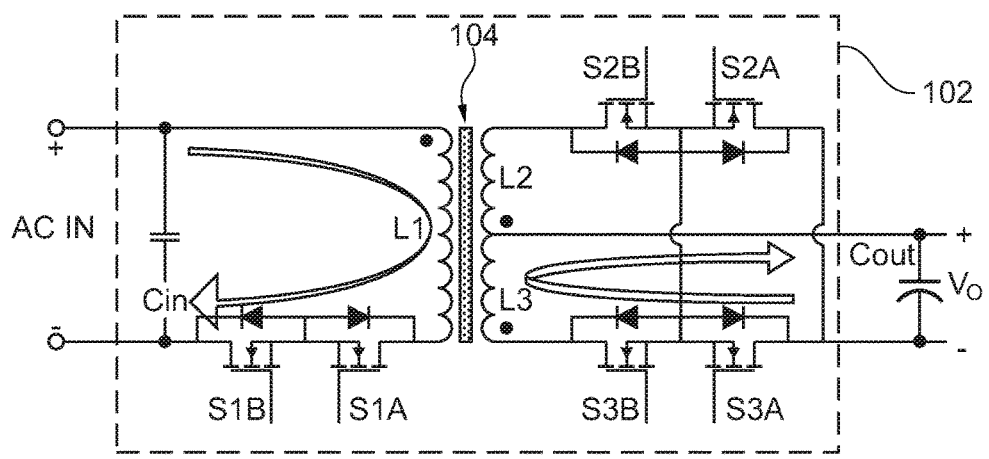
Figure 5B:
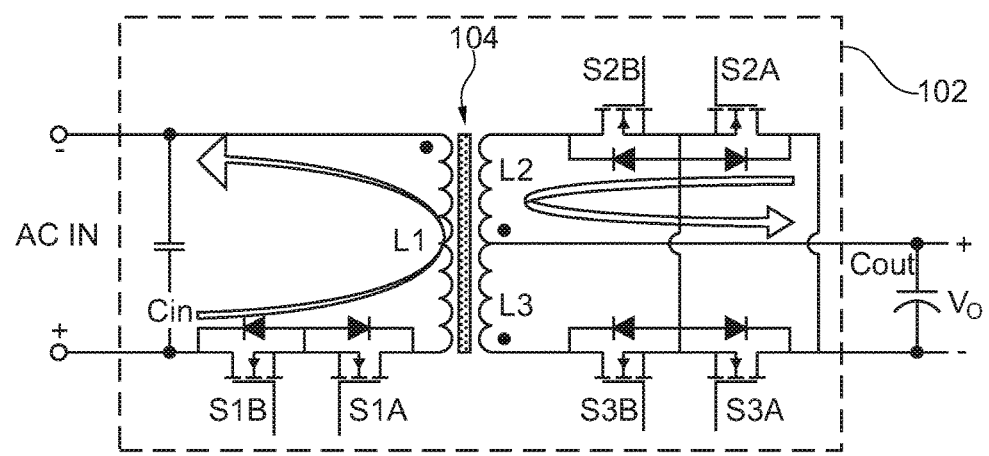

The bidirectional switch devices shown in FIGS. 3A through 3C allow the bridgeless flyback converter 102 to operate in a bidirectional manner in that current on the primary side can conduct in either direction as shown in FIGS. 4A through 4B and in FIGS. 5A through 5B. The current only conducts in one secondary side winding at any time. Operation during the positive AC input is illustrated in FIGS. 4A and 5A, and operation during the negative AC input is illustrated in FIGS. 4B and 5B. The curved line on the primary side shows the direction and conduction paths during the energizing state of the primary side winding L1. The curved lines on the secondary side show the direction and conduction paths during the de-energizing state of the secondary side windings L2, L3.

Figure 6:
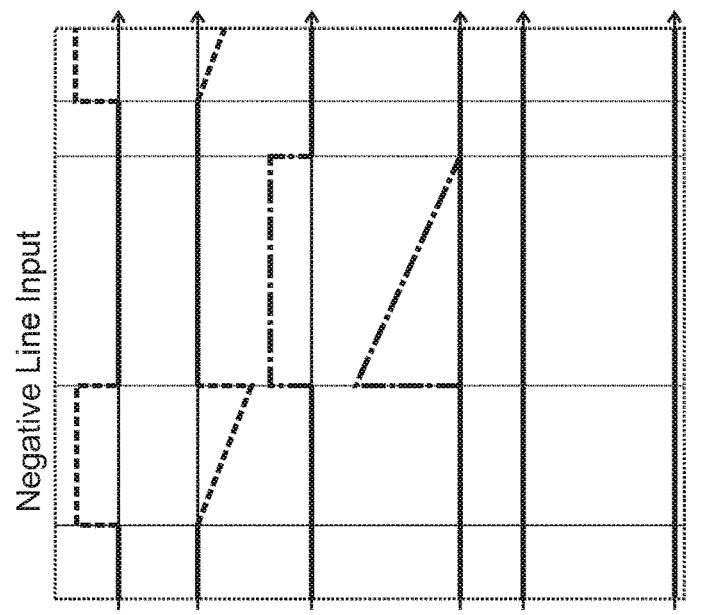
FIG. 6 illustrates various waveforms associated with the operation of the bridgeless flyback converter topologies in FIG. 3B.
Figure 6:
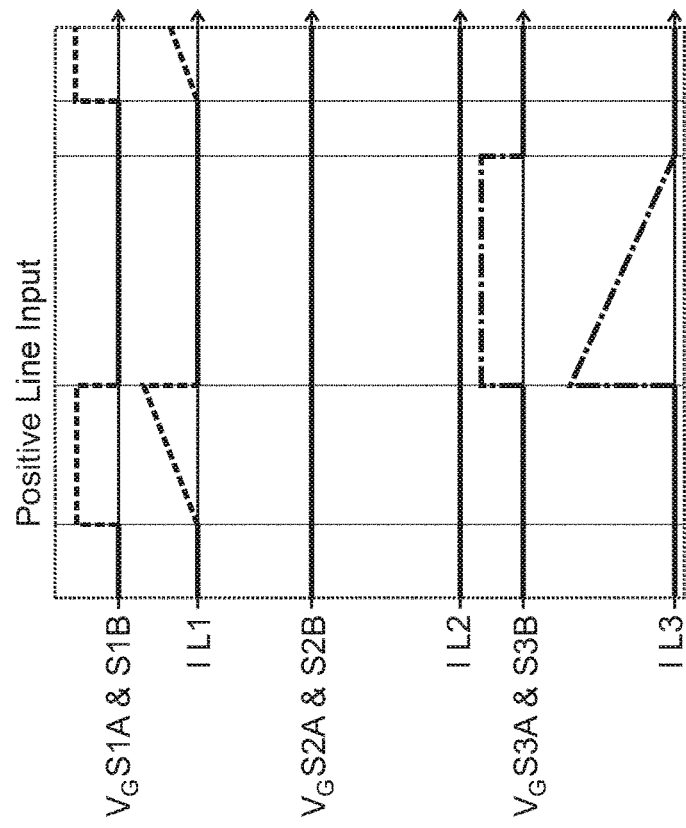

FIG. 6 illustrates exemplary gate signals $V_{G\ SXY\&SXY}$ for the primary and secondary side bidirectional switch devices and the current $I_{LN}$ through the corresponding transformer winding for the converter embodiment shown in FIG. 3B. During start-up, the secondary side has bi-directional blocking and there is no natural body diode to allow transfer of energy to charge up the storage capacitor Cstore on the secondary side and wake up the secondary side control logic (not shown). To by-pass this problem, a normally-on transistor device can be used for transistors SB, S3A or S2A. With a normally on device, a conduction path can occur during start-up. Furthermore, the circuit is still inherently safe since if transistor SB, S3A or S2A remains on in which the circuit can operate as a forward converter. Therefore, it is possible to operate the bridgeless flyback converter 102 in the same manner as a forward converter if required.

The converter configurations shown in FIGS. 1 through 5B can be enhanced to improve performance and/or robustness. For example, since the converter 102 is fundamentally a flyback, most soft switching concepts can be applied, including forced frequency ZVS (zero voltage switching) control, secondary side control with ZVS and other known soft switching control for flyback converters. Furthermore, anti-parallel/bidirectional active clamps and bidirectional freewheeling techniques can also be utilized. Soft switching, anti-parallel/bidirectional active clamps and bidirectional freewheeling techniques and their application to the power converter circuit embodiments described above are described next in more detail.

Anti-Parallel Active Clamps

Figure 7A:
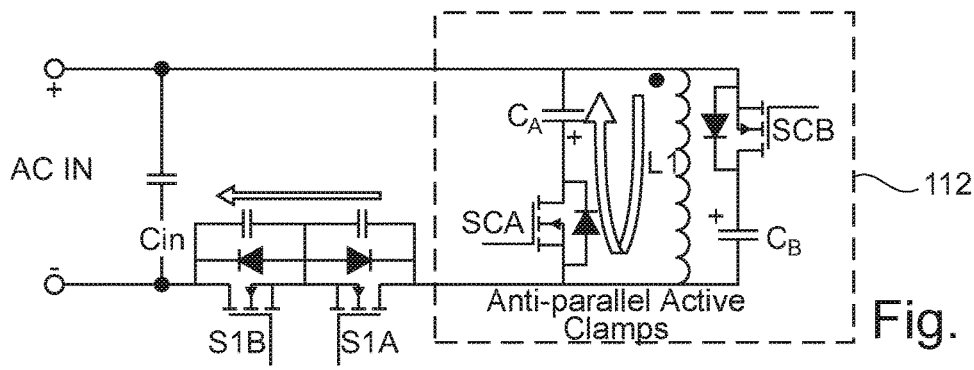
FIGS. 7A through 7D illustrate an embodiment of anti-parallel active clamps for the power converter circuit.
Figure 7B:
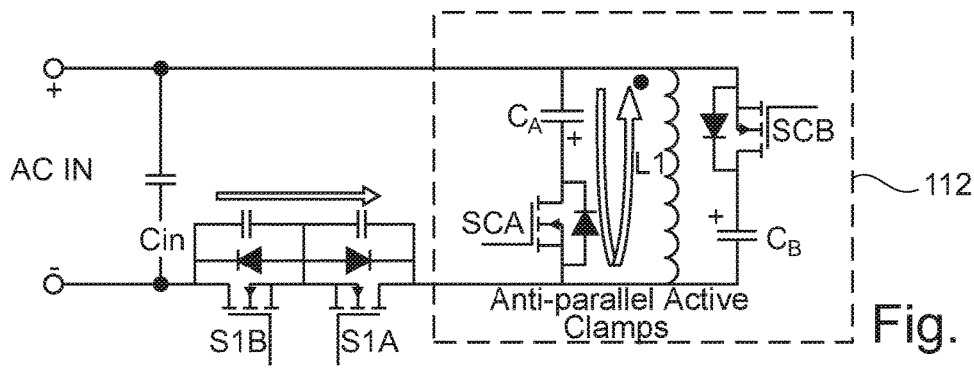
Figure 7C:
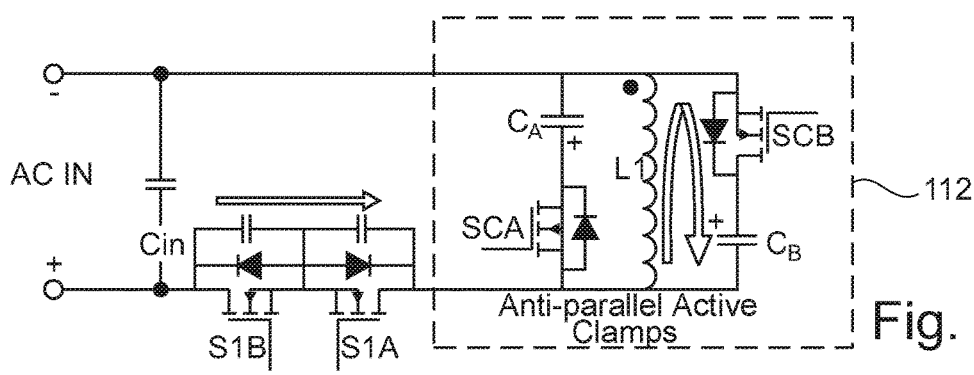
Figure 7D:
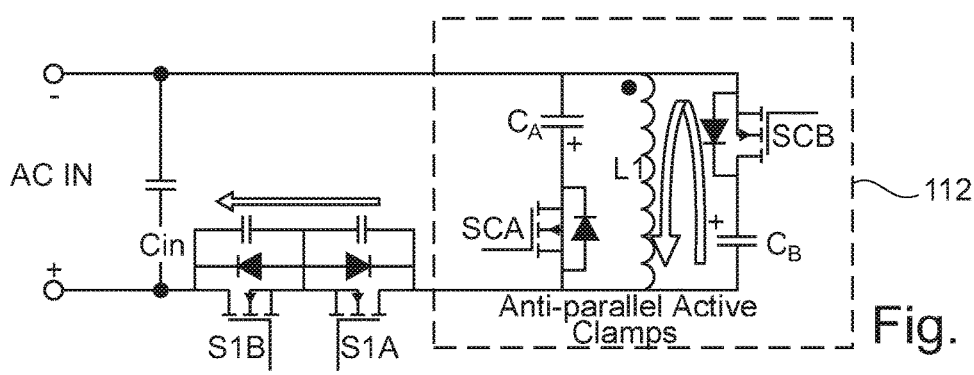
Figure 8A:
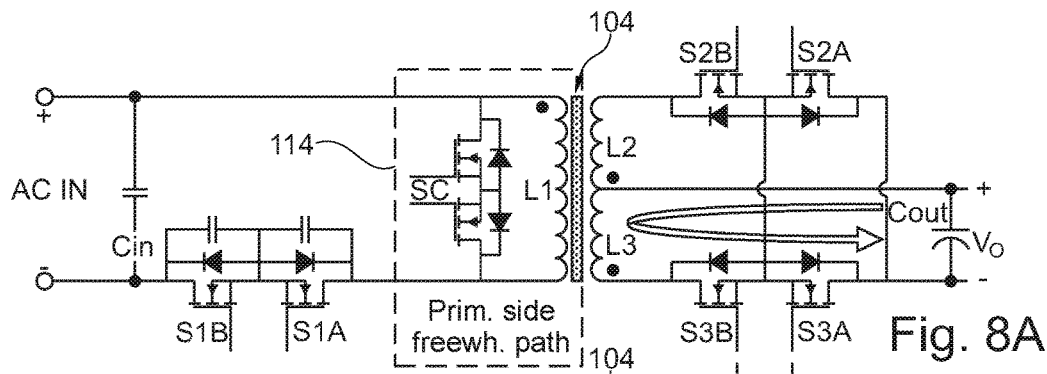
FIGS. 8A through 8D illustrate an embodiment of a primary side bidirectional freewheeling path for the power converter circuit.
Figure 8B:
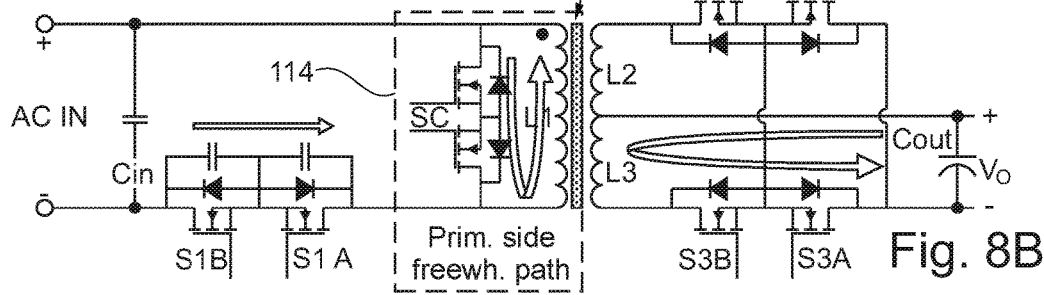
Figure 8C:
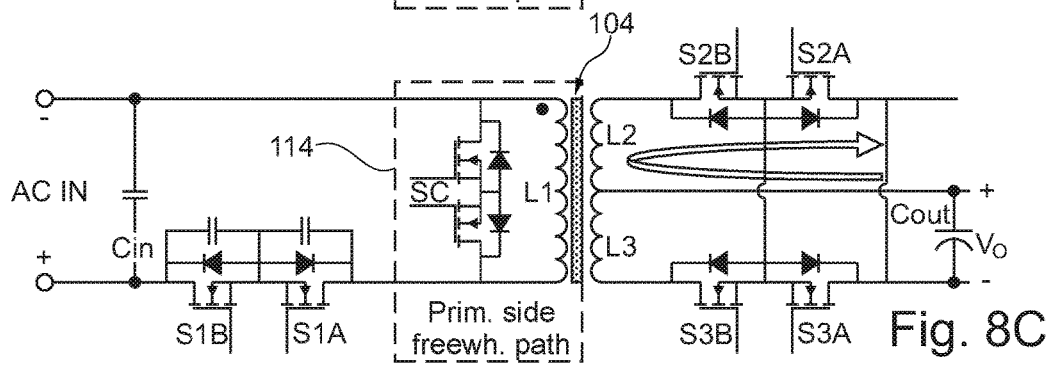
Figure 8D:
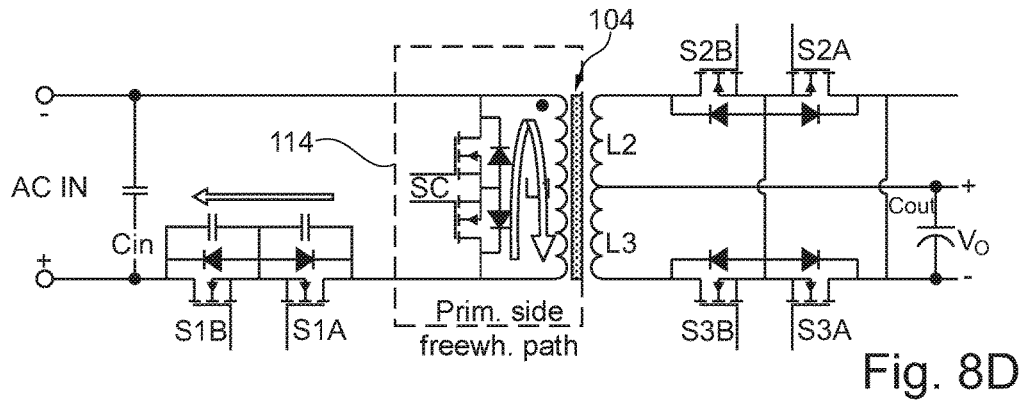

FIGS. 7A through 7D illustrate an embodiment of anti-parallel active clamps 112 incorporated into the power converter circuit 100. To achieve ZVS on the primary side, the soft switching control must be aware in advance of the AC input polarity. This information is needed to turn on the correct switch and create the correct negative current signal for the right polarity. According to the embodiment illustrated in FIGS. 7A through 7D, two active clamps 112 are coupled to the transformer primary side winding L1 in parallel and in an inverted manner to recycle leakage energy of the transformer 104 in both directions. Each active clamp includes a clamp transistor SCA/SCB and a clamp capacitor $C_A/C_B$ connected in series with the corresponding clamp transistor. The curved lines shown in FIGS. 7A and 7C show the conduction paths when the first active clamp is recycling energy from the leakage of the primary side winding L1 and the bidirectional switch device formed by transistors S1A and S1B is blocking the AC input voltage plus the voltage generated from the primary side winding L1. The curved lines shown in FIGS. 7B and 7D show the ZVS currents from the clamp capacitors CA/CB driving the primary side winding L1 in the reverse direction and driving the voltage of blocking transistors S1A and S1B towards zero when clamp transistors SCA and SCB are off. The storing of the leakage energy for the anti-parallel active clamps 112 is passive, and no control is required since the current simply conducts via the body diodes of clamp transistors SCA and SCB. Since all three windings L1, L2, L3 of the transformer 104 are all coupled, the negative current to achieve ZVS on the primary side on any of the three windings L1, L2, L3 will not only discharge the output capacitance of transistors S1A and S1B, it will also charge the output capacitance of one of the secondary side bi-directional switch devices, in this sense, the required negative current may be slightly higher than conventional control.

Primary Side Bidirectional Freewheeling Path

FIGS. 8A through 8D illustrate an embodiment of a primary side bidirectional freewheeling path 114 incorporated into the power converter circuit 100. The primary side bidirectional freewheeling path 114 includes a bi-directional switch device SC placed in parallel with the primary side winding L1 of the transformer 104. The bidirectional switch device SC can be any bidirectional switch device such as a bidirectional GaN or MOSFET switch device.

Figure 9:
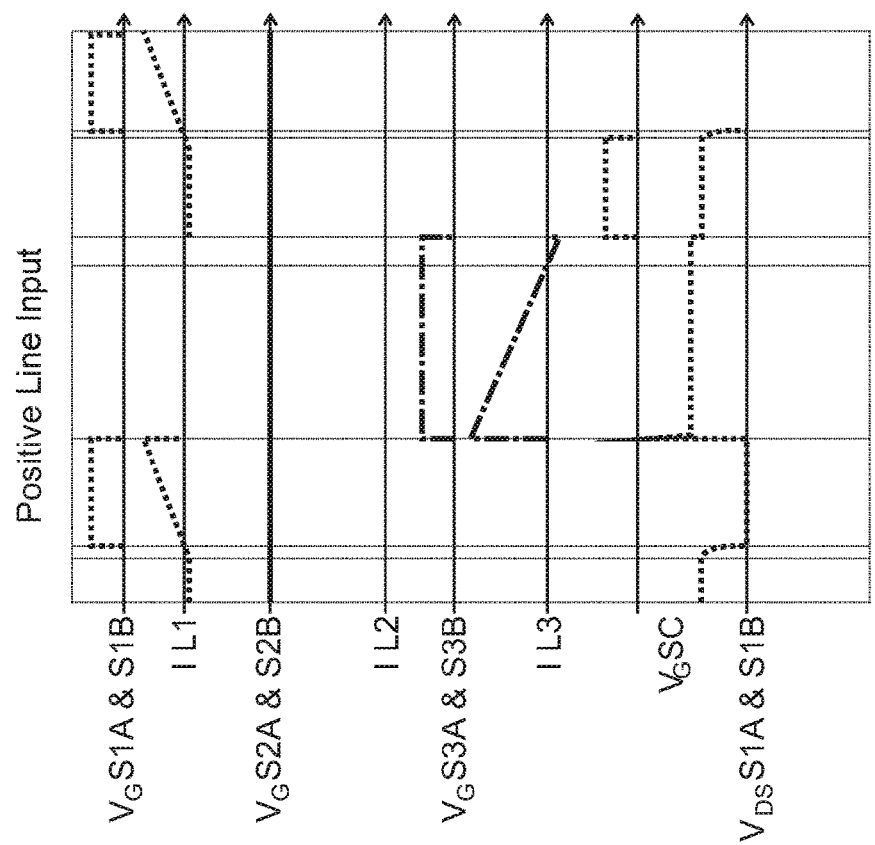
FIG. 9 illustrates various waveforms associated with the primary side bidirectional freewheeling path in FIGS. 8A through 8D.
Figure 10A:
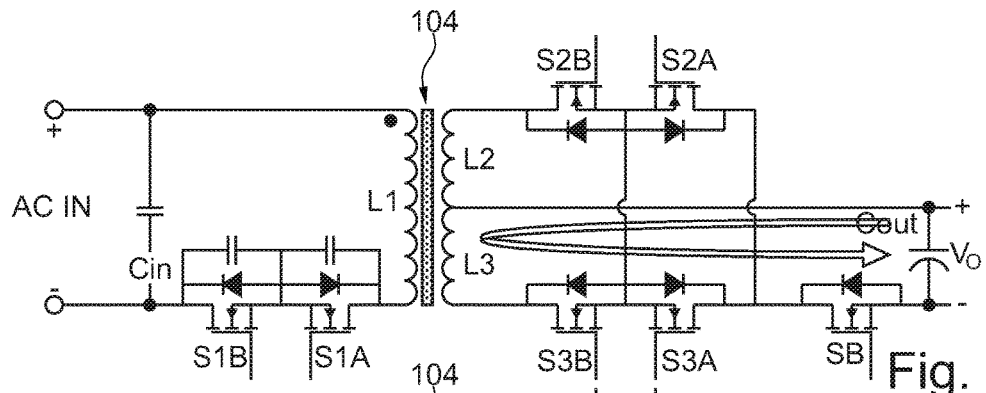
FIGS. 10A through 10D illustrate an embodiment of a secondary side bidirectional freewheeling path for the power converter circuit.
Figure 10B:
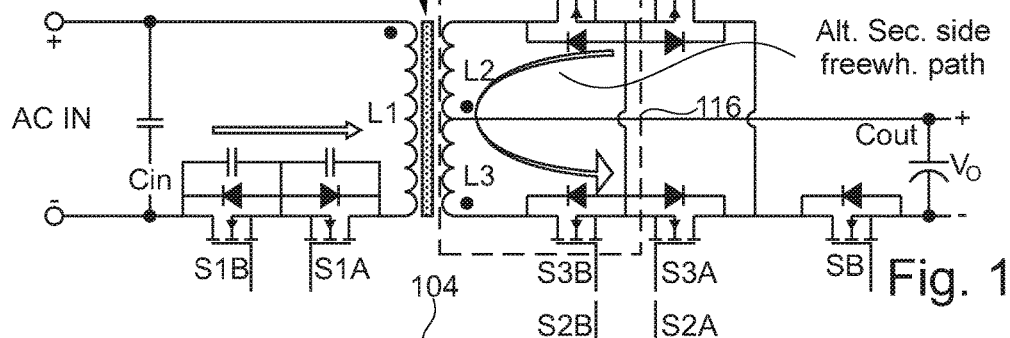
Figure 10C:
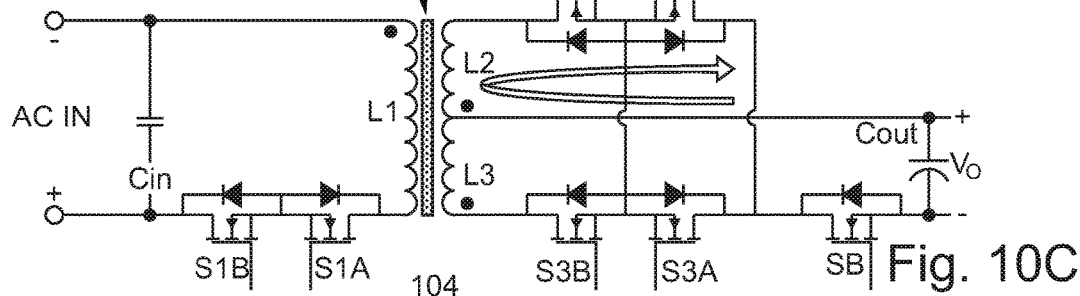
Figure 10D:
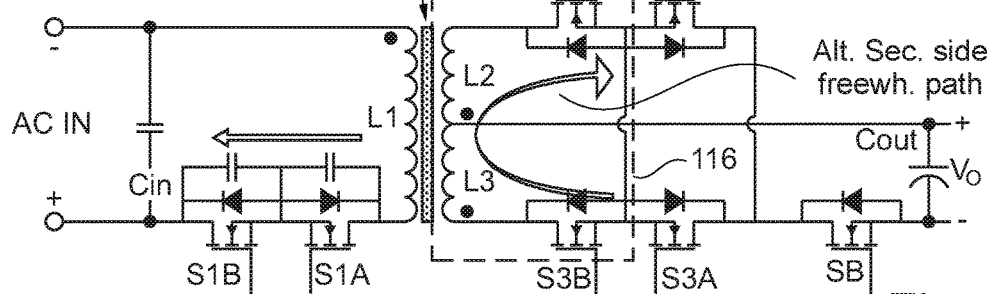

FIG. 9 illustrates related waveforms associated with operation of the primary side bidirectional freewheeling path 114 illustrated in FIGS. 8A through 8D. In FIG. 9, $V_{G\ SXY\&SXY}$ are the gate signals for the primary and secondary side bidirectional switch devices S1A/S1B, S2A/S2B, S3A/S3B and $I_{LN}$ represents the current through the respective transformer windings L1, L2, L3. At the end of the previous cycle when the de-energizing current from either secondary side winding L2 or L3 reaches zero, secondary side switches S3A/S3B or S2A/S2B stay on for a short period to energize secondary side winding L2 or L3 in the reverse direction as shown by the curved lines in FIGS. 8A and 8C. After this time period has expired, secondary side switches S3A/S3B or S2A/S2B turn off and the bidirectional switch device SC turns on and the secondary side current is coupled to the primary side as a freewheeling current within the freewheeling path 114, as shown by the curved lines in FIGS. 8B and 8D and by waveform IL1 in FIG. 9. Once the bidirectional switch device SC turns off, the freewheeling current drives the voltage of transistors S1A and S1B to zero.

Secondary Side Bidirectional Freewheeling Path

Figure 11:
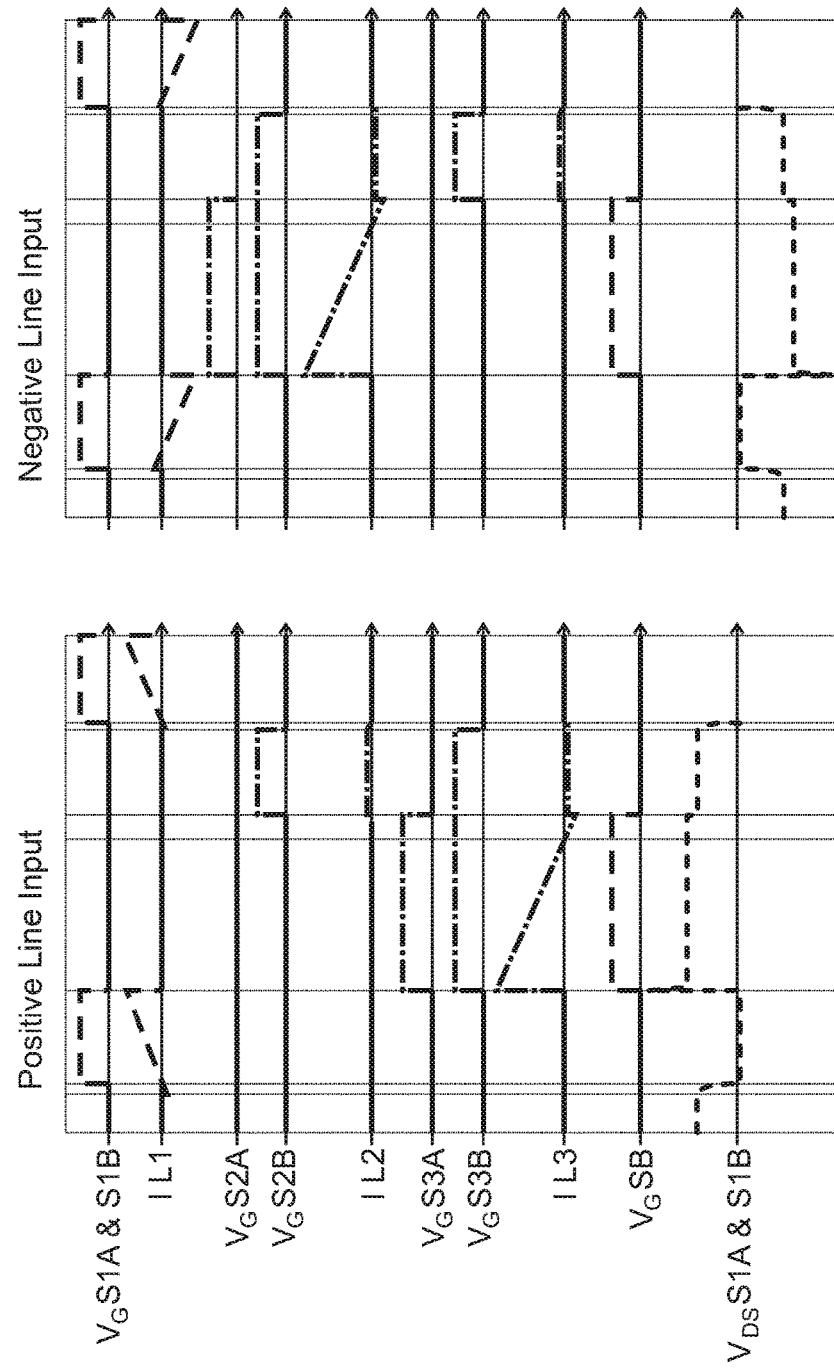
FIG. 11 illustrates various waveforms associated with the secondary side bidirectional freewheeling path in FIGS. 10A through 10D.

FIGS. 10A through 10D illustrate an embodiment of a secondary side bidirectional freewheeling path 116 incorporated into the power converter circuit 100. The secondary side bidirectional freewheeling path 116 includes an additional switch SB on the secondary side to stop the output capacitor Cout from discharging through part of the secondary side freewheeling path 116. The secondary side freewheeling path 116 is through transistors S2B and S3B on the secondary side via a common source connection, as well as going through both secondary windings L2, L3 as indicated by the curved line in FIGS. 10B and 10D. FIG. 11 illustrates related waveforms associated with operation of the primary side bidirectional freewheeling path 114 illustrated in FIGS. 8A through 8D. In FIG. 11, $V_{G\_SXY\&SXY}$ and $V_{G\_SXY}$ are the gate signals for the primary and secondary side bidirectional switch devices S1A/S1B, S2A/S2B, S3A/S3B and $I_{LN}$ represents the current through the respective transformer windings L1, L2, L3. When transistors S2A and S3B turn off, freewheeling current again discharges the output capacitance of the primary side bidirectional switch device S1A/S1B. Higher conduction loss can occur on the secondary side due to the high number of switches in the conduction path.

Figure 12:
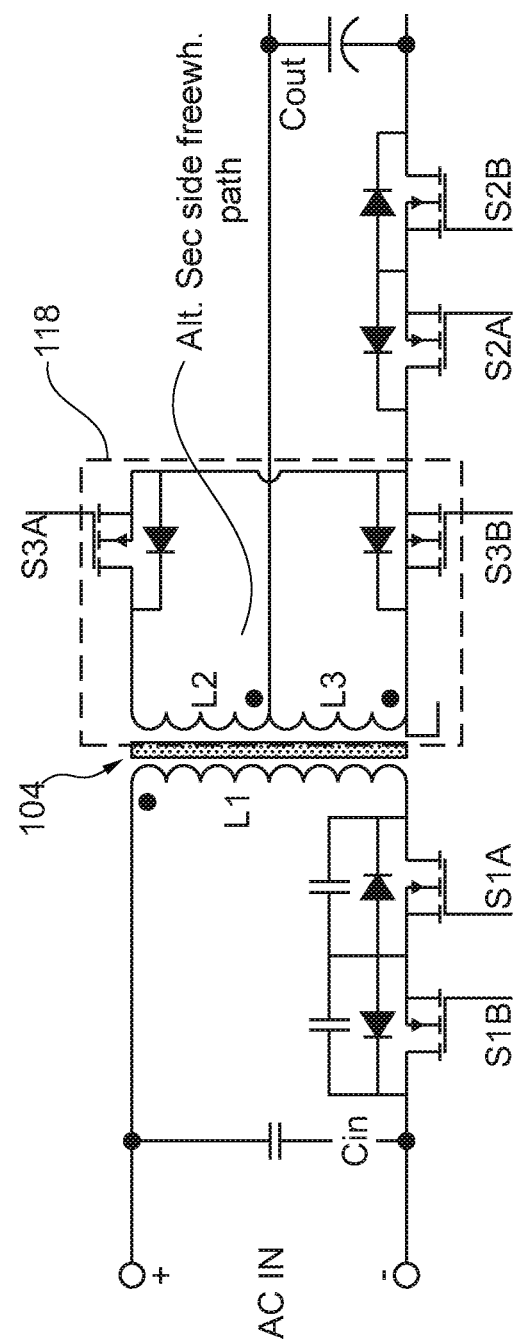
FIG. 12 illustrates a simplification of the secondary side bidirectional freewheeling path illustrated in FIGS. 10A through 100.

FIG. 12 illustrates a modification to the embodiment illustrated in FIGS. 10A through 10D. The modification reduces the number of switches by one, and simplifies the control and configuration on the secondary side where transistors S2A and S2B form a bidirectional switch device. Transistors S3A and S3B can also form a bidirectional switch device if their midpoints are accessible. If not, transistors S3A and S3B can be two synchronous rectification switches. With the topology illustrated in FIG. 12, a freewheeling path 116 is provided on the secondary side which conducts via only two transistors S3A and S3B without the need for the additional transistor SB shown in FIGS. 10A through 10D.

Monolithic Integration

The individual switches of the bridgeless flyback converter 102 can be monolithically integrated into a single die or co-packaged into a single package. The gate drivers can also be integrated, monolithically or co-packaged, into the package itself making the system small and potentially increasing the power density and efficiency for the converter circuit 100.

Figure 13A:
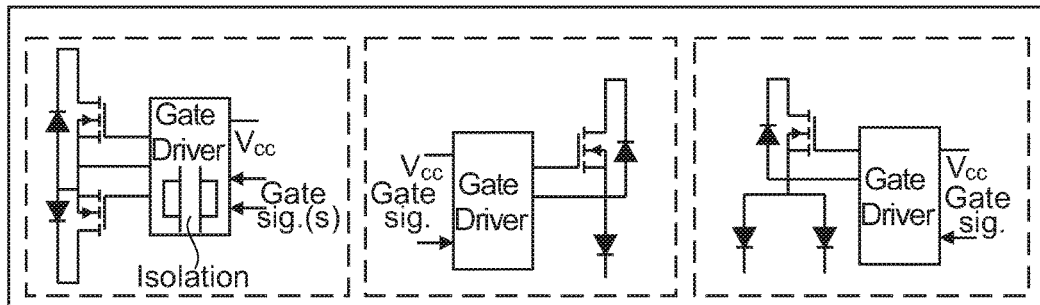
FIGS. 13A through 13C illustrate exemplary integration configurations for the bi-directional switch.
Figure 13B:
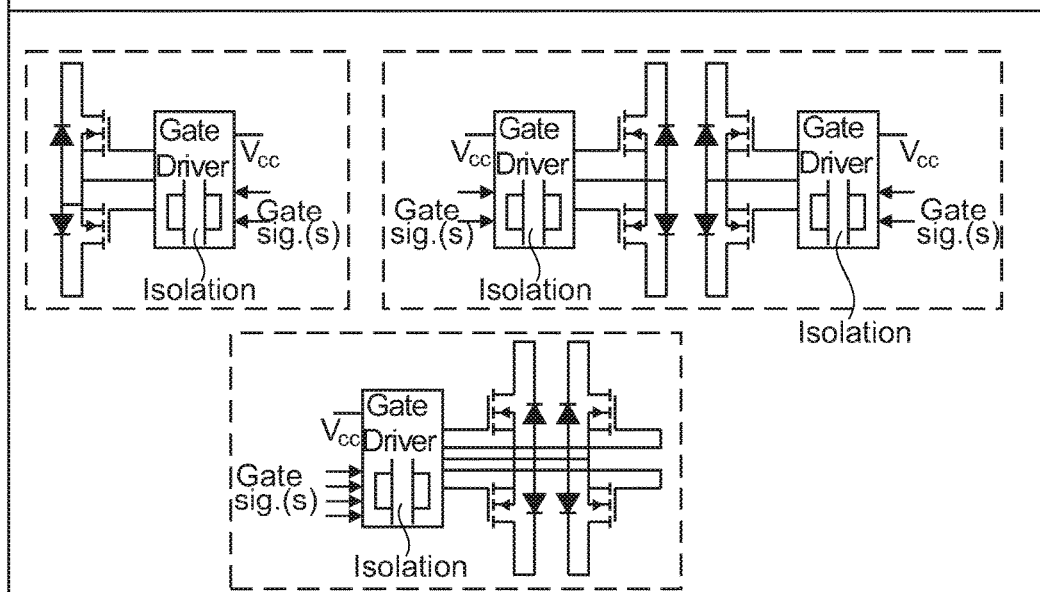
Figure 13C:
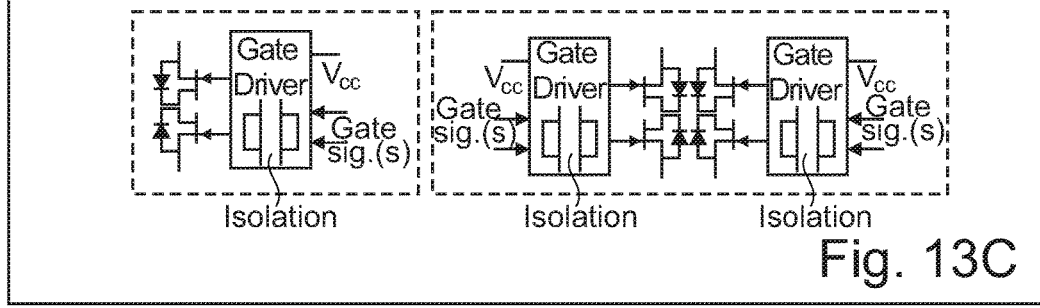

FIGS. 13A through 13C illustrate exemplary integration configurations. The devices included in each dashed box can be integrated into a single die or package. FIG. 13A illustrates different integration examples for the bridgeless flyback converter embodiment shown in FIG. 3A. FIG. 13B illustrates different integration examples for the bridgeless flyback converter embodiment shown in FIG. 3B. FIG. 13C illustrates different integration examples for the bridgeless flyback converter embodiment shown in FIG. 3C.

Further Embodiments of Entire System

Figure 14:
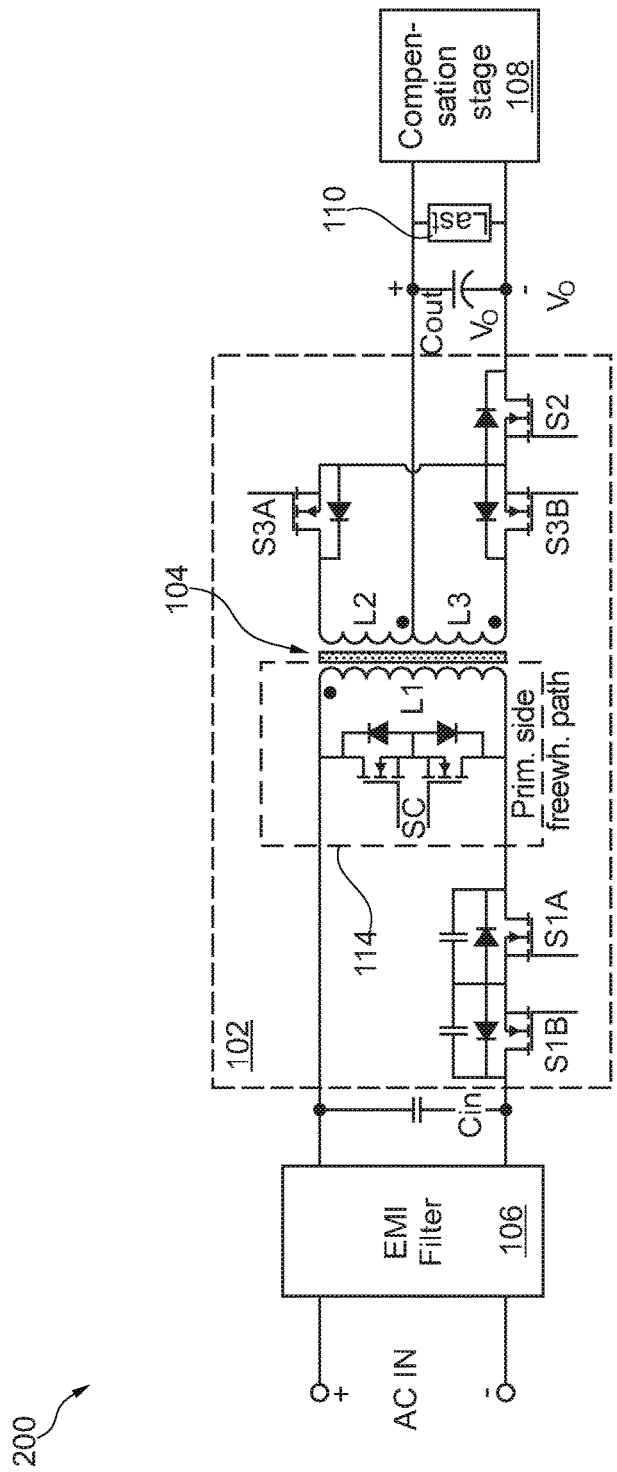
FIG. 14 illustrates another embodiment of a power converter circuit devoid of a diode bridge rectifier on the primary (input) side, and which filters the AC mains frequency ripple of the AC input from the secondary side.

FIG. 14 illustrates another embodiment of a power converter circuit 200 devoid of a diode bridge rectifier on the primary (input) side, and which filters the AC mains frequency ripple of the AC input from the secondary side. The embodiment shown in FIG. 14 is like the embodiment shown in FIG. 1, with the bridgeless flyback converter 102 including the primary side bidirectional freewheeling path 114 shown in FIGS. 8A through 8D and minimised device count on the secondary side. If ZVS control is implemented, the requirement on the EMI filter 106 on the input can be reduced. This in turn can lead to higher power density and higher efficiency. The compensation stage 108 significantly reduces the size of the input capacitor Cin to a few μF, as previously described herein. The compensation stage 108 operates in both the forward and reverse direction.

Figure 15:
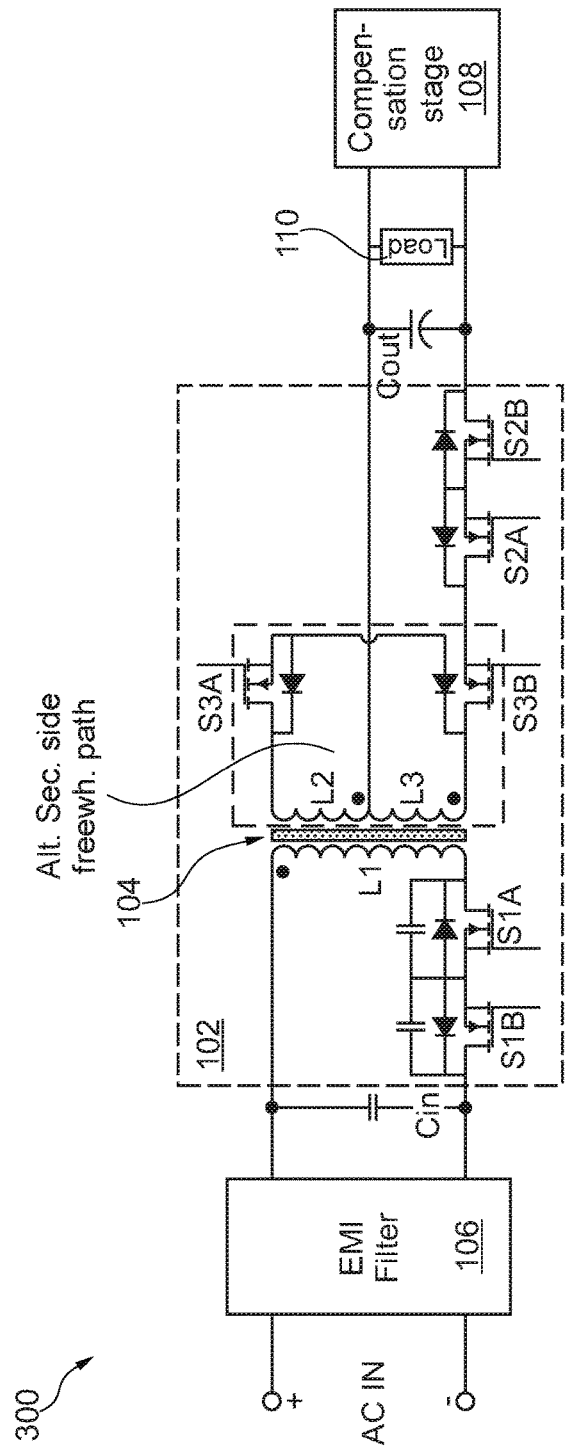
FIG. 15 illustrates yet another embodiment of a power converter circuit devoid of a diode bridge rectifier on the primary (input) side, and which filters the AC mains frequency ripple of the AC input from the secondary side.

FIG. 15 illustrates yet another embodiment of a power converter circuit 300 devoid of a diode bridge rectifier on the primary (input) side, and which filters the AC mains frequency ripple of the AC input from the secondary side. The embodiment shown in FIG. 15 is like the embodiment shown in FIG. 14, however the bidirectional freewheeling path 116 is implemented on the secondary side of the bridgeless flyback converter 102 as shown in FIGS. 10A through 10D. The power converter circuit 300 also has minimised device count on the secondary side as shown in FIG. 12.

Soft Switching Methods with Bi-Directional Active Clamp

Described below are embodiments that provide ZVS (zero voltage switching) commutation for all switches on the secondary side of the bridgeless flyback converter 102, and ZCS (zero current switching) for the bidirectional switch of an active clamp circuit on the primary side of the converter 102. Such switching control is achieved with a novel switching pattern and commutation path on the secondary side. Doing so significantly reduces the turn-on losses for all secondary side switches, and the switching loss of the bidirectional switch of the active clamp circuit is reduced, hence improving overall efficiency.

Figure 16:
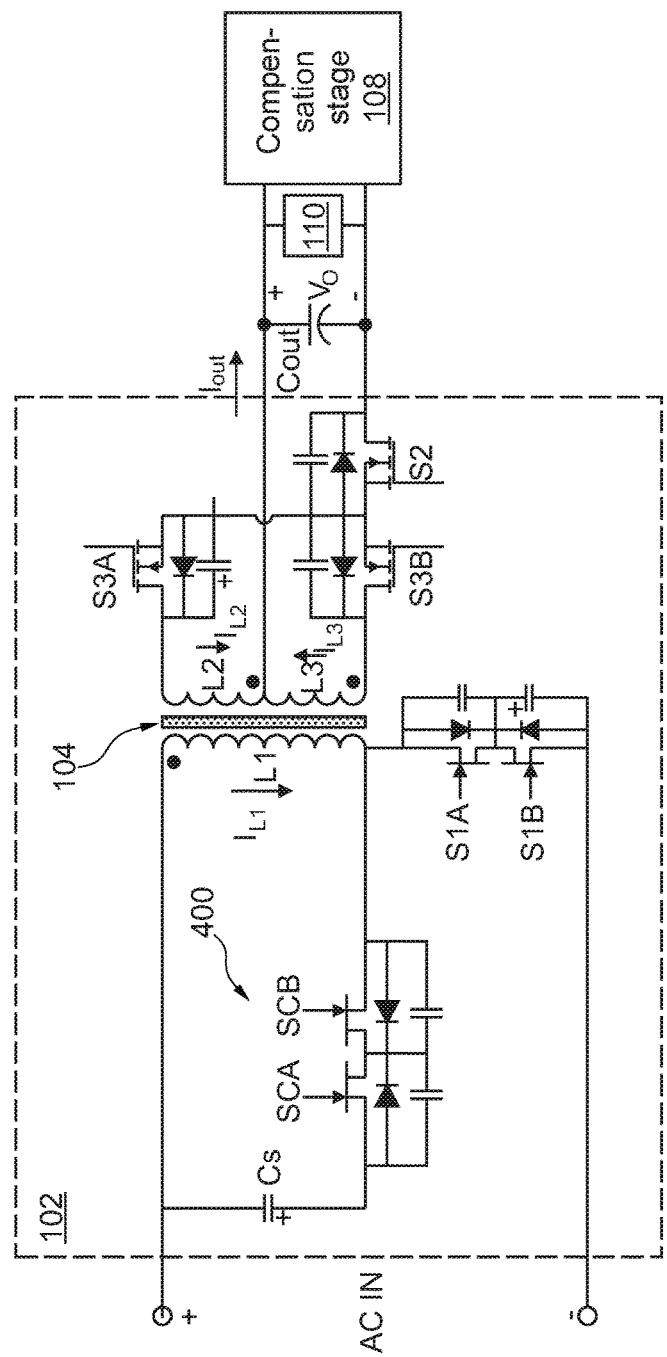
FIGS. 16 and 17 illustrate embodiments of a clamping circuit for the bridgeless flyback converter.

FIG. 16 illustrates an embodiment of the bridgeless flyback converter 102. The control strategy enables a snubbering function reducing energy dissipation, by adding an active clamp 400 to the bridgeless flyback converter topology. The snubbering function is realized by transferring energy stored into leakage inductance at the turn-off instant of primary side bidirectional switch device S1A/S1B into a clamping capacitor Cs, which is then discharged back into the AC source (AC IN) every half grid period (e.g. 100-120 Hz), thereby supplying energy back to the source or to the load 110. With such an approach, the active clamp 400 formed by capacitor Cs and bidirectional switch device SCA/SCB is essentially lossless in a bi-directional manner. Moreover, part of the energy stored in the clamp capacitor is used to achieve ZVS for the primary side bidirectional switch device S1A/S1B.

Figure 17:
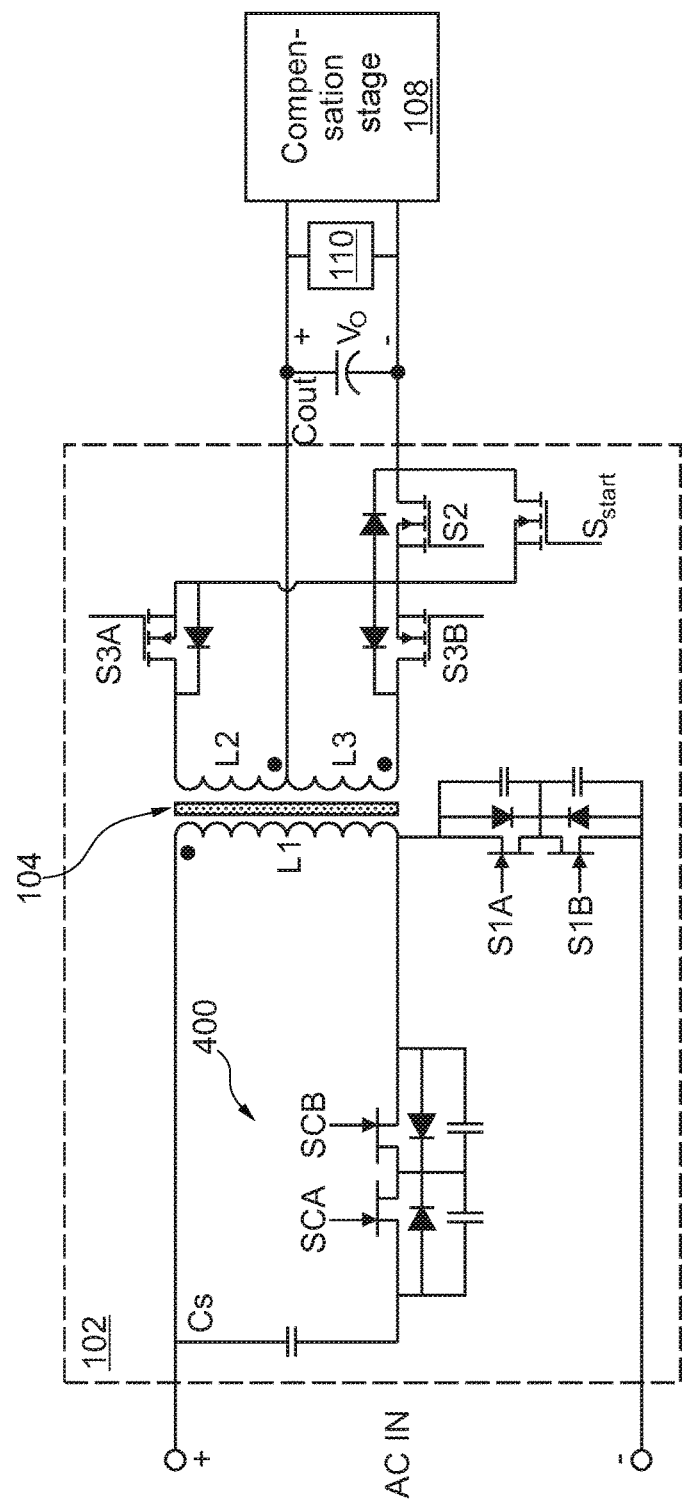

During the start-up phase, switch S2 on the secondary side is blocking the path for current to charge the output capacitor Cout. This problem can solved by adding a normally on switch ($S_{start}$) in parallel to S2 with relatively high $R_{DSon}$ on the secondary side. The equivalent circuit can be obtained by substituting the parallel connected switches S2 and $S_{start}$ with the on resistance $R_{DSon\_Start}$ of normally-on switch $S_{start}$ as shown in FIG. 17. During the start-up phase, the converter 102 is not controlled as a flyback as described in more detail later herein. The start-up phase lasts until the voltage Vo across the output capacitor Cout is high enough to adequately power gate drivers and control logic on the secondary side (not shown). Afterwards, normally-on switch $S_{start}$ is turned off and the converter 102 begins normal operation.

Figure 18:
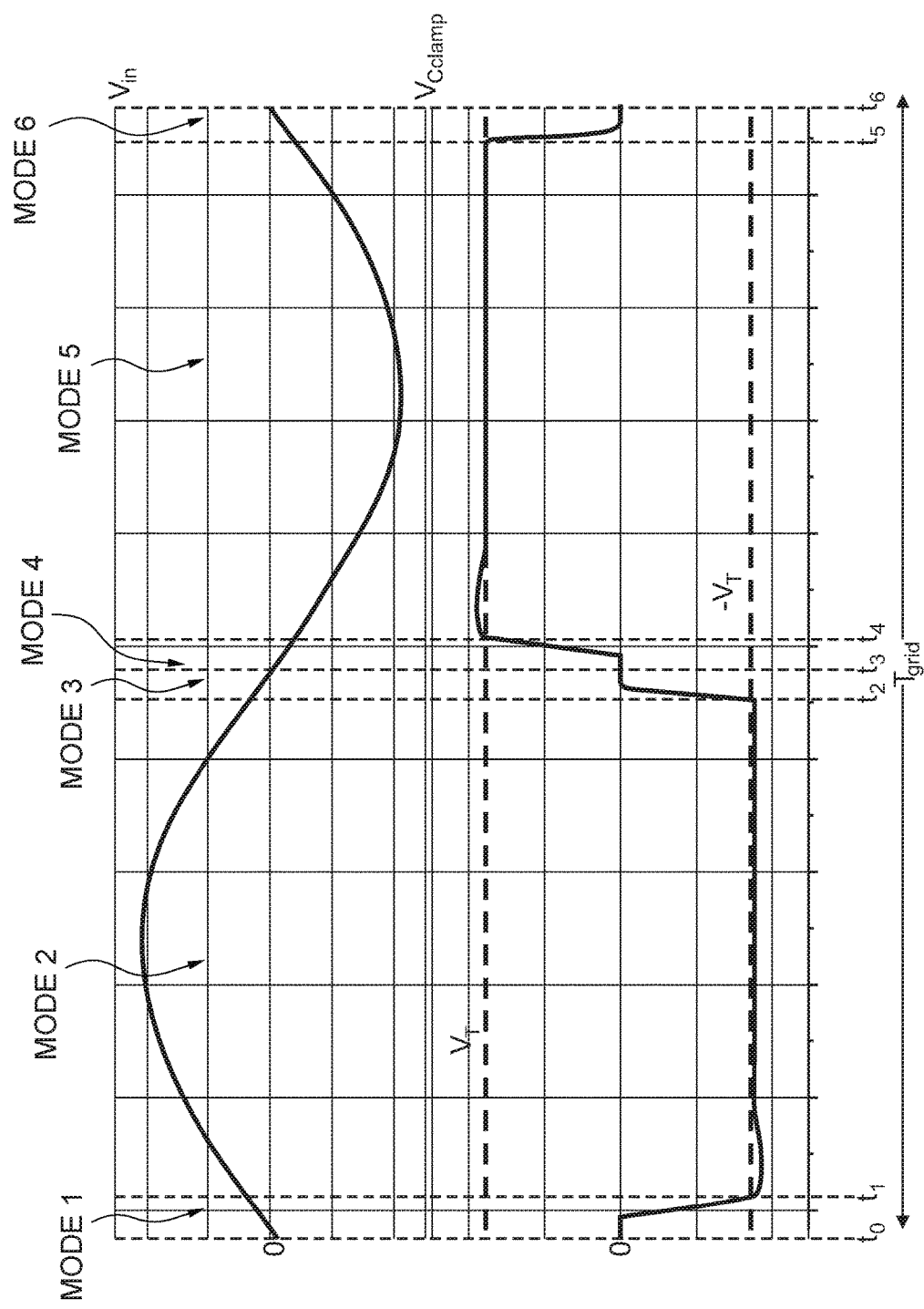
FIG. 18 illustrates different operating modes of the bridgeless flyback converter with the clamping circuit from FIGS. 16 and 17.

The bridgeless flyback converter 102 operates in different modes depending on the phase of the input voltage Vin, as shown in FIG. 18. Also plotted in FIG. 18 is the clamping voltage $V_{Cclamp}$ of capacitor Cs included in the active clamp 400.

Mode 1 ($t_0$-$t_1$):

The primary side of the bridgeless flyback converter 102 is operated as a buck-boost converter to pre-charge the clamping capacitor $C_s$ to a voltage equal to $-V_T$. During this operation mode, the secondary side of the bridgeless flyback converter 102 is disabled, so no energy is provided from the source to the load 110 and the load voltage is kept constant by the compensation stage 108.

Mode 2 ($t_1$-$t_4$):

The converter 102 operates as a flyback converter with a positive input voltage in this mode, and the secondary side is enabled and energy is provided from the source to the load 110.

Mode 3 ($t_2$-$t_3$):

The primary side of the bridgeless flyback converter 102 is operated as a buck-boost converter to discharge the clamping capacitor $C_s$ back to the AC source AC IN or discharge to the load. If discharge back to AC source, the secondary side is disabled, so no energy is provided from the source to the load 110 and the load voltage is kept constant by the compensation stage 108.

Mode 4 ($t_3$-$t_4$):

The primary side of the bridgeless flyback converter 102 is operated as a buck-boost converter to pre-charge the clamping capacitor $C_s$ to a voltage equal to $V_T$. During this mode, the secondary side is disabled, so no energy is provided from the source to the load 110 and the load voltage is kept constant by the compensation stage 108.

Mode 5 ($t_4$-$t_5$):

The converter 102 operates as a flyback converter with a negative input voltage during this mode, and the secondary side is enabled and energy is provided from the source AC IN to the load 110.

Mode 6 ($t_5$-$t_6$):

The primary side of the bridgeless flyback converter 102 is operated as a buck-boost converter to discharge the clamping capacitor $C_s$ back to the AC source AC IN or discharge to the load. If discharge back to AC source, the secondary side is disabled, so no energy is provided from the source to the load 110 and the load voltage is kept constant by the compensation stage 108.

The main operating modes of the bridgeless flyback converter 102 are MODE 2 and the MODE 5, wherein the topology is operated as a flyback converter with a positive and negative input voltage respectively and energy is transferred from the source AC IN to the load 110. MODE 1 and MODE 4 are provided to pre-charge the clamping capacitor $C_s$ to a voltage equal to $V_T$ (with the correct polarity), to avoid discharging of the load 110 towards the clamping capacitor $C_s$ during the snubbering action of the active clamp 400 as will be explained later herein. MODE 3 and MODE 6 are provided to discharge the clamping capacitor $C_s$ and transfer energy stored in the clamping capacitor $C_s$ back to the source before the change of the grid polarity. Otherwise, a large current spike would occur when performing the snubbering function during the flyback operation mode (MODE 2 or MODE 5) for the first time with the opposite polarity. During MODE 3 and 6, the converter 102 can also transfer the stored energy to the load 110 instead of the source.

Since the converter 102 is a bridgeless flyback converter, PFC can be achieved during MODE 1, 2, 4 and 5. One method to achieve PFC is with constant on-time technique, which can be adjusted based on load conditions.

Mode 2/Mode 5: Flyback Operation

MODE 2 and MODE 5 are the only modes where energy is supplied from the source AC IN to the load 110. During these modes, the converter 102 operates as a flyback converter with positive and negative input voltage, respectively. The primary side bidirectional switch device of the converter 102 can be implemented as two unidirectional switches in drain-to-drain configuration with separate gate control. In another embodiment, the primary side bidirectional switch device can be implemented as two unidirectional switches in back-to-back configuration or as a monolithic bidirectional switch with two gates Mode 2

Figure 19:
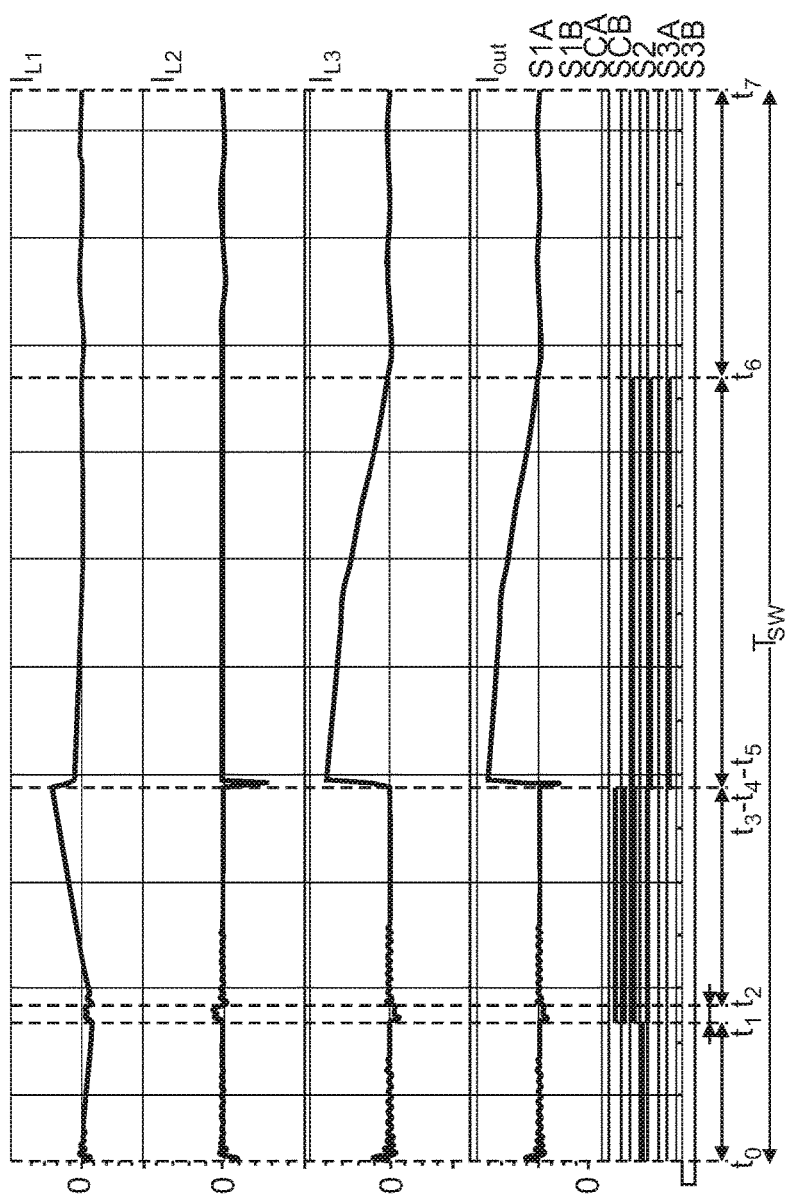
FIG. 19 illustrates various waveforms associated with the operation of bridgeless flyback converter in MODE 2.

In MODE 2, the polarity of the grid voltage AC IN is positive and the clamping capacitor $C_s$ is pre-charged to a voltage equal to $-V_T$ as shown in FIG. 18. Each switching cycle $T_{sw}$ is formed by seven conduction periods as shown in FIG. 19. The switching cycles are described in more detail below in connection with FIG. 19 which illustrates waveforms of the current through the windings $I_{L1}$, $I_{L2}$, $I_{L3}$ and of the output current $I_{out}$ in a switching period $T_{sw}$ for a positive input voltage.

Figure 20:
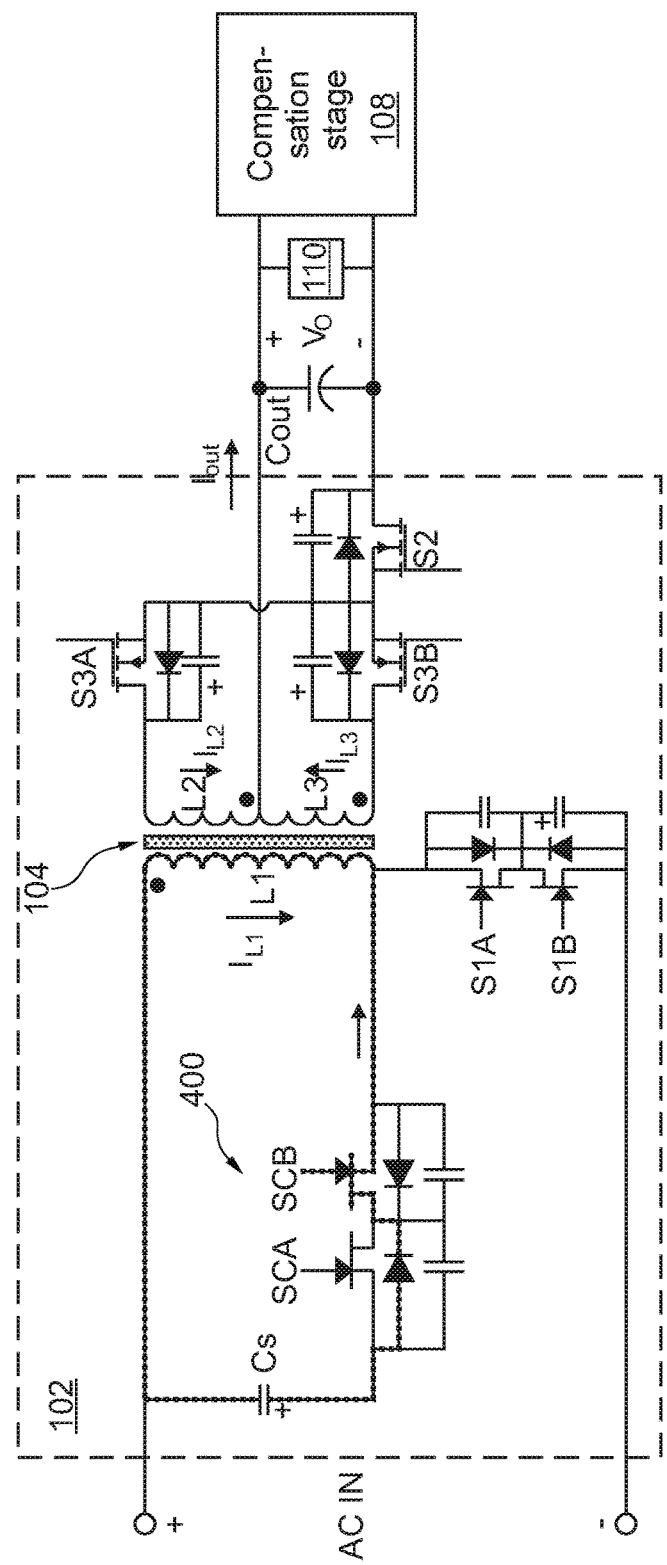
FIGS. 20, 21, 23, 24 and 26-27 illustrate the current flow paths in the power converter circuit during different conduction periods of MODE 2.

Conduction Period 1 ($t_0$-$t_1$) of Mode 2:

This conduction period is provided to charge the series of leakage and magnetizing inductance with a negative current $I_{L1}$ to, in the next conduction period, discharge the output capacitance of the bidirectional switch S1 and turn S1 on under ZVS conditions. To do this, switch SCB is turned on as shown in FIG. 20. Since the clamping capacitor $C_s$ is charged, negative current flows through the primary winding L1 of the transformer 104, thereby charging the magnetizing inductance of the transformer 104. When this negative current has reached a threshold value, which allows to fully discharge the output capacitance of the bidirectional switch device S1A/S1B, this conduction period ends and the next conduction period begins.

Figure 21:
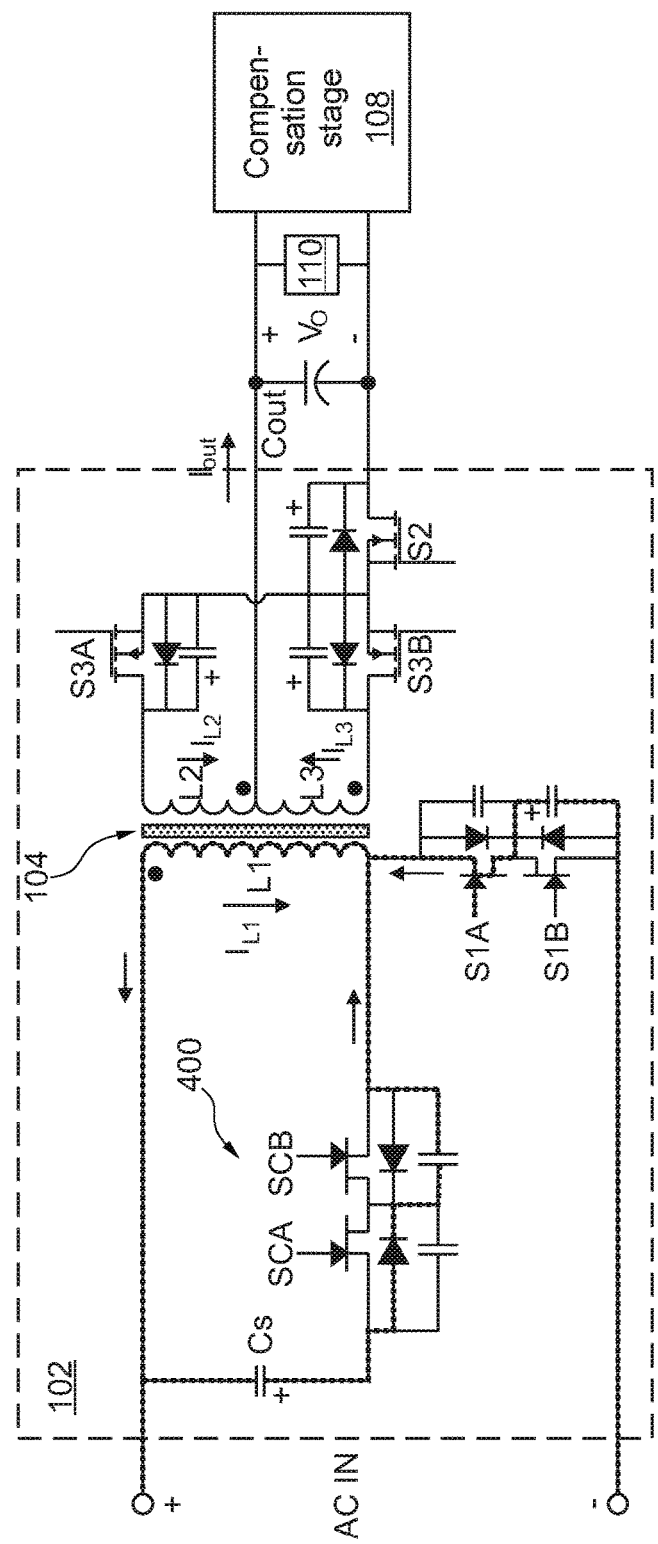
Figure 22:
FIG. 22 illustrates various waveforms associated with the operation of the bridgeless flyback converter in conduction period 2 of MODE 2.

Conduction Period 2 ($t_1$-$t_2$) of Mode 2:

This conduction period is provided to discharge the output capacitance of the bidirectional switch device S1A/S1B and to turn S1A/S1B on under ZVS conditions in the next conduction period. At the beginning of this period, switch S1A is turned on in ZVS and switch S0B is turned off as shown in FIGS. 21 and 22. FIG. 22 illustrates waveforms of voltages and currents of the bidirectional switches S1A/S1B and SCA/SCB throughout a switching cycle Tsw for a positive input voltage. Since the leakage and magnetizing inductance drive a negative current $I_{L1}$, the output capacitance of switch SIB starts to get discharged by this current. When the discharge is completed, this conduction period ends and the next conduction period begins.

Figure 23:
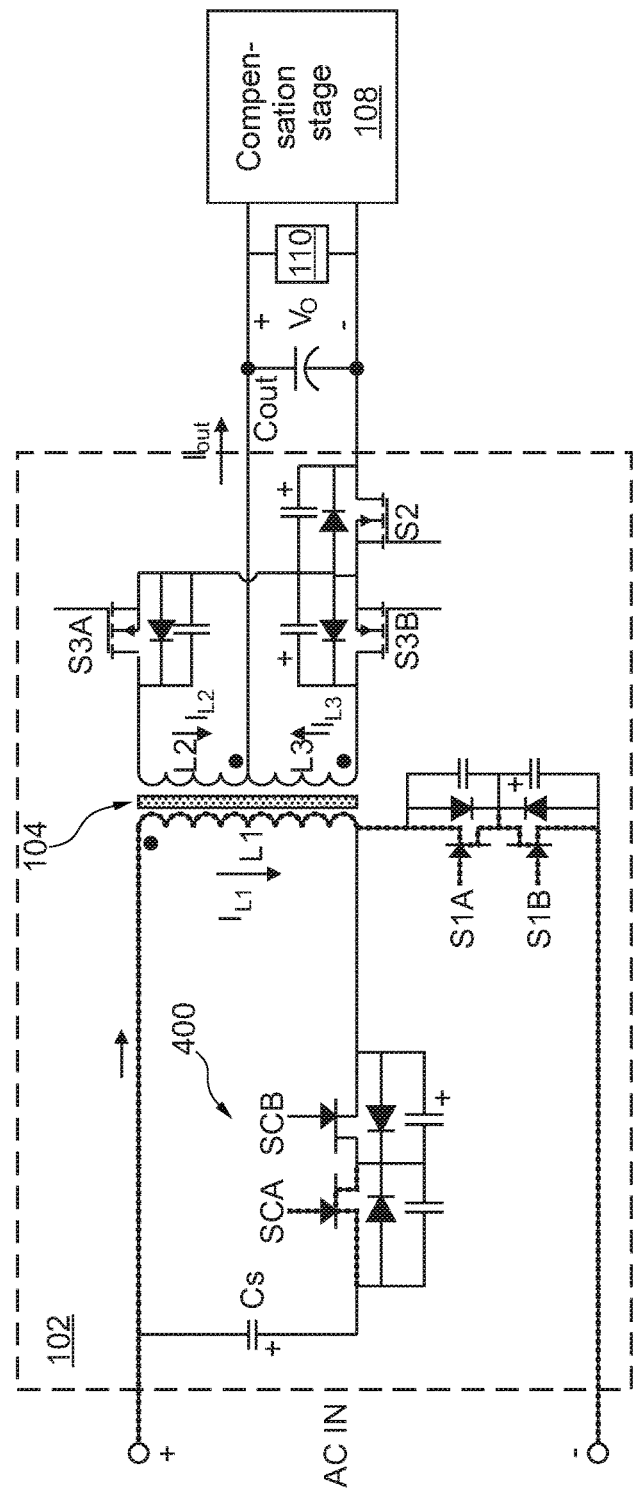

Conduction Period 3 ($t_2$-$t_3$) of Mode 2:

The state of the switches and the current path during this conduction period are shown in FIG. 23. Switches S1A and S1B which form the bidirectional switch S1A/S1B on the primary side of the bridgeless flyback converter 102 are both on while only switch SCA of the bidirectional switch SCA/SCB of the active clamp 400 is gated on. Current $I_{L1}$ flows entirely through the primary winding L1, and increases linearly and charges the magnetizing inductance of the gapped transformer 104. This current flows entirely through the bidirectional switch device S1A/SIB as shown in FIG. 22. Since the current flows entirely through bidirectional switch device S1A/S1B, switch SCA is turned on at zero current (ZCS) and zero voltage switching (ZVS) and thus has zero turn-on loss.

Figure 24:
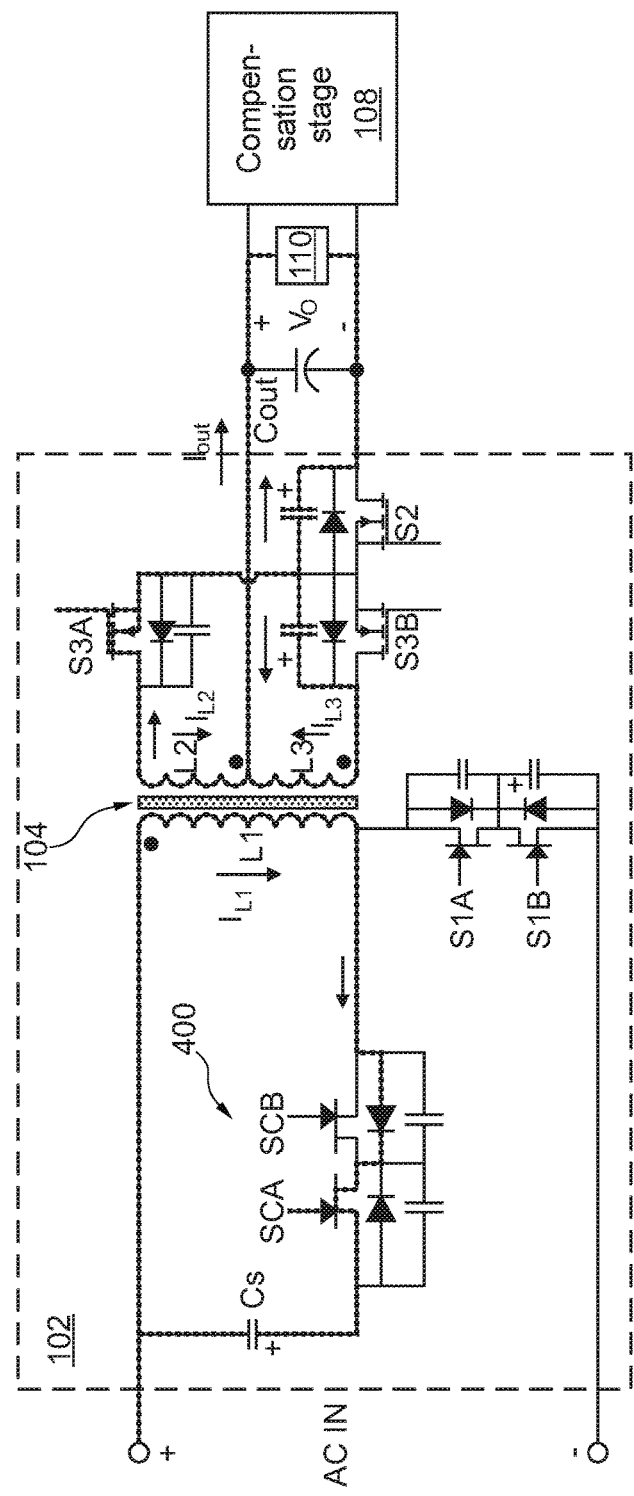
Figure 25:
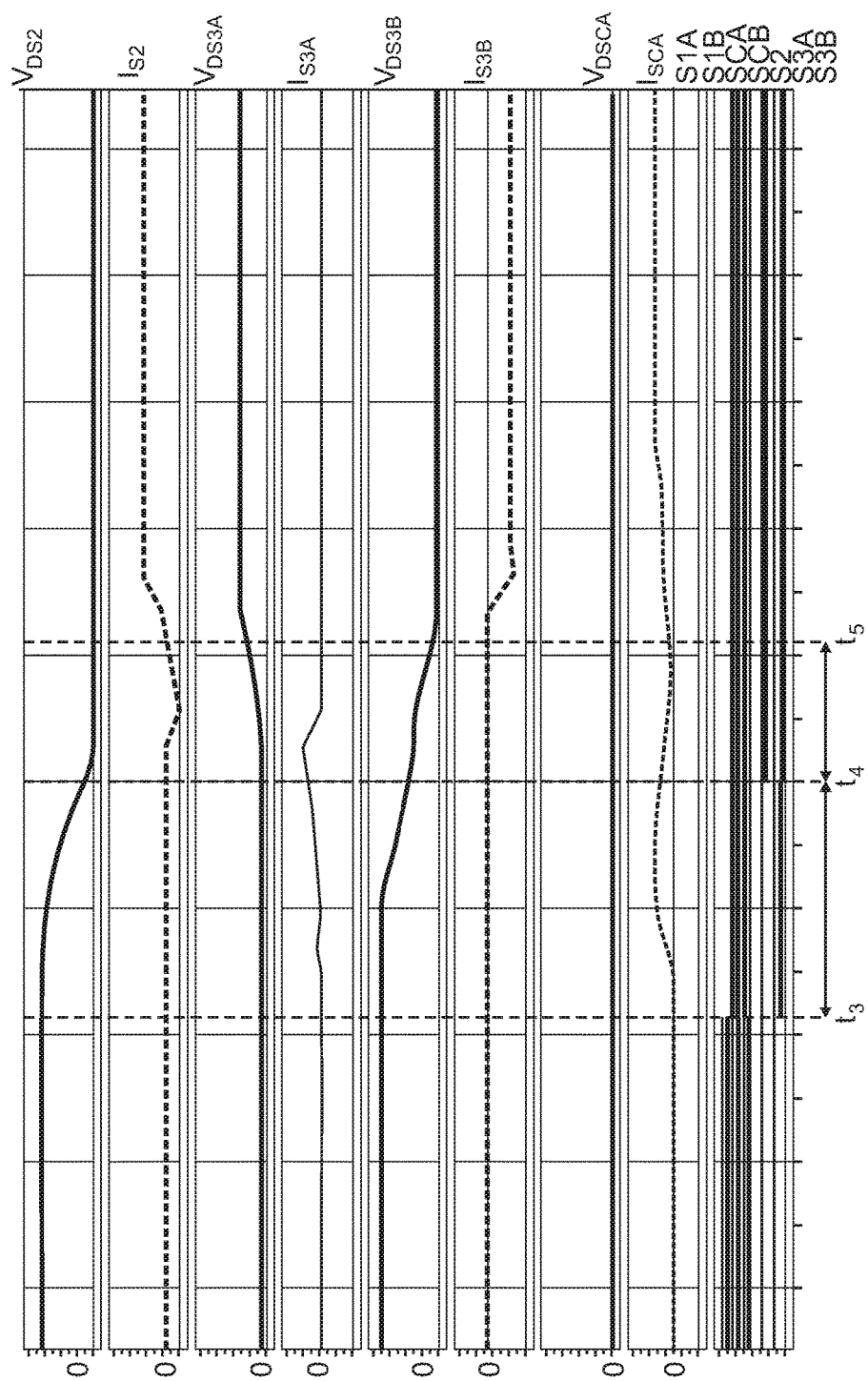
FIG. 25 illustrates various waveforms associated with the operation of the bridgeless flyback converter in conduction period 4 of MODE 2.

Conduction Period 4 ($t_3$-$t_4$) of Mode 2:

This conduction period is provided to discharge the output capacitance of the switch S2 on the secondary side of the bridgeless flyback converter 102 to turn S2 on under ZVS conditions in the next conduction period. To accomplish ZVS switching of S2, switch S3A is briefly turned on as shown in FIG. 24 to allow a path on the secondary side for a negative current to discharge the output capacitance of switch S2 and partially discharge the output capacitance the switch of S3B. This current tends to also discharge the output capacitor Cout, but since this conduction period lasts only for a very small fraction of the switching period, this discharge can be neglected. Since this conduction period starts after the turn off-of bidirectional switch device S1A/S1B, switch SCA is kept on to provide a path on the primary side for the current to discharge the leakage inductance (snubbering function) and therefore prevent an overvoltage. This conduction period lasts until the output capacitance of switch S2 is completely discharged as shown in FIG. 25 which illustrates zoomed waveforms of voltages and currents of switches S2, S3A, S3B around conduction MODES 2 and 3 for a positive input voltage.

Figure 26:
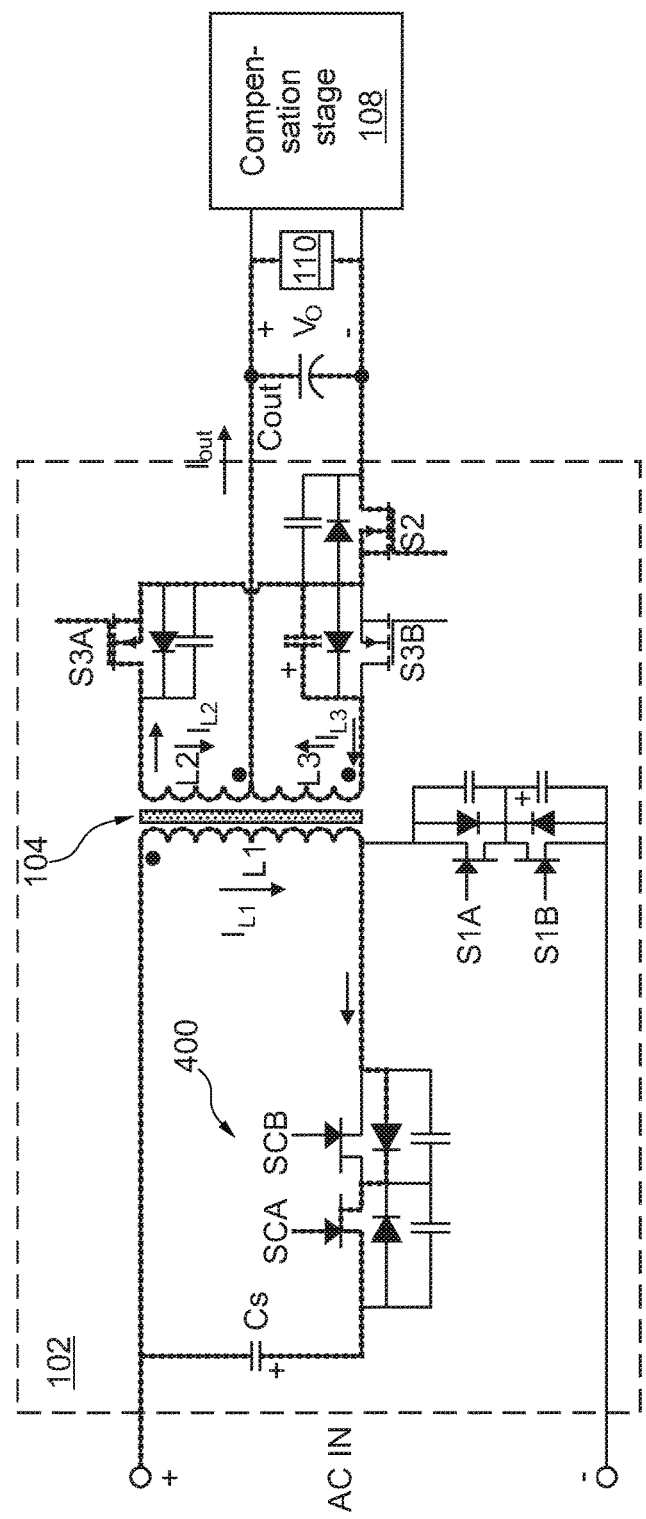

Conduction Period 5 ($t_4$-$t_5$) of Mode 2:

This conduction period is provided to discharge the output capacitance of switch S3B to turn S3B on under ZVS conditions in the next conduction period. The switch configuration and path of the current are shown in FIG. 26. At the beginning of this conduction mode, switch S2 is turned on under ZVS conditions. With this switch configuration on the secondary side of the converter 102, the current charges the output capacitance of switch S3A and at the same time discharges the output capacitance of switch S3B. When the output capacitance of switch S3B is completely discharged, the current flows entirely through switch S2 and the body diode of switch S3B so this conduction period can end and switch S3B can be turned on under ZVS condition in the next conduction period.

Figure 27:
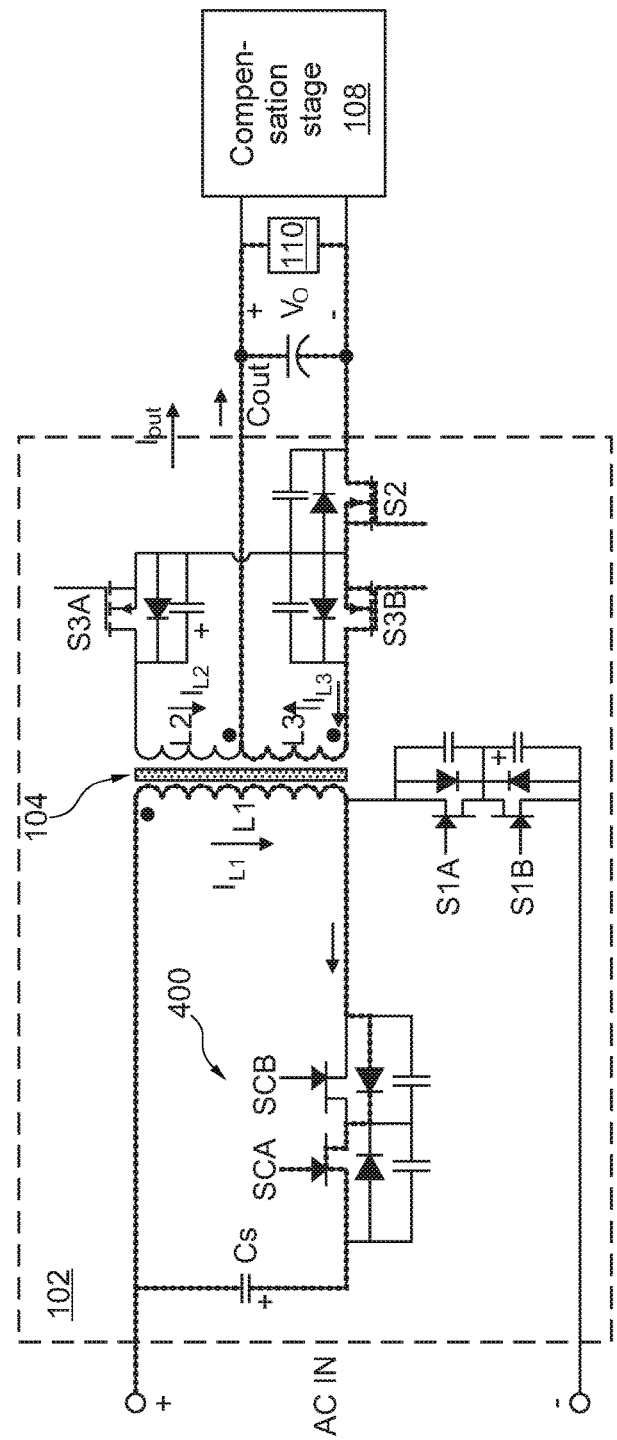

Conduction Period 6 ($t_5$-$t_6$) of Mode 2:

During this conduction period, the magnetizing inductance of the transformer 104 is discharged to the load 110. The converter switch configuration is shown in FIG. 27 and the corresponding waveforms of the current flowing through the secondary side windings L2, L3 is shown in FIG. 19. At the beginning of this conduction period, switch S3B is turned on under ZVS conditions to provide synchronous rectification while switch S3A is blocking. Under these switch conditions, the current flows only through the lower secondary winding L3 of the transformer 104 and through switches S3B and S2 to provide energy to the load 110 while no current flows through the upper secondary winding L2 of the transformer 104. This conduction period ends when the current flowing through winding L3 becomes zero. At this point, switches S2 and S3B are turned off under zero current switching (ZCS) conditions, essentially eliminating turn off losses.

Conduction Period 7 ($t_6$-$t_7$) of Mode 2:

During this conduction period, the converter 102 is essentially idling and waiting for the end of the switching period since the converter 102 operates at a fixed frequency. As shown in FIG. 16, all switches are off and no energy is provided to the load 100 and no energy is absorbed from the AC source AC IN during this conduction mode. A new switching cycle begins at the of this conduction period.

Mode 5

Figure 28A:
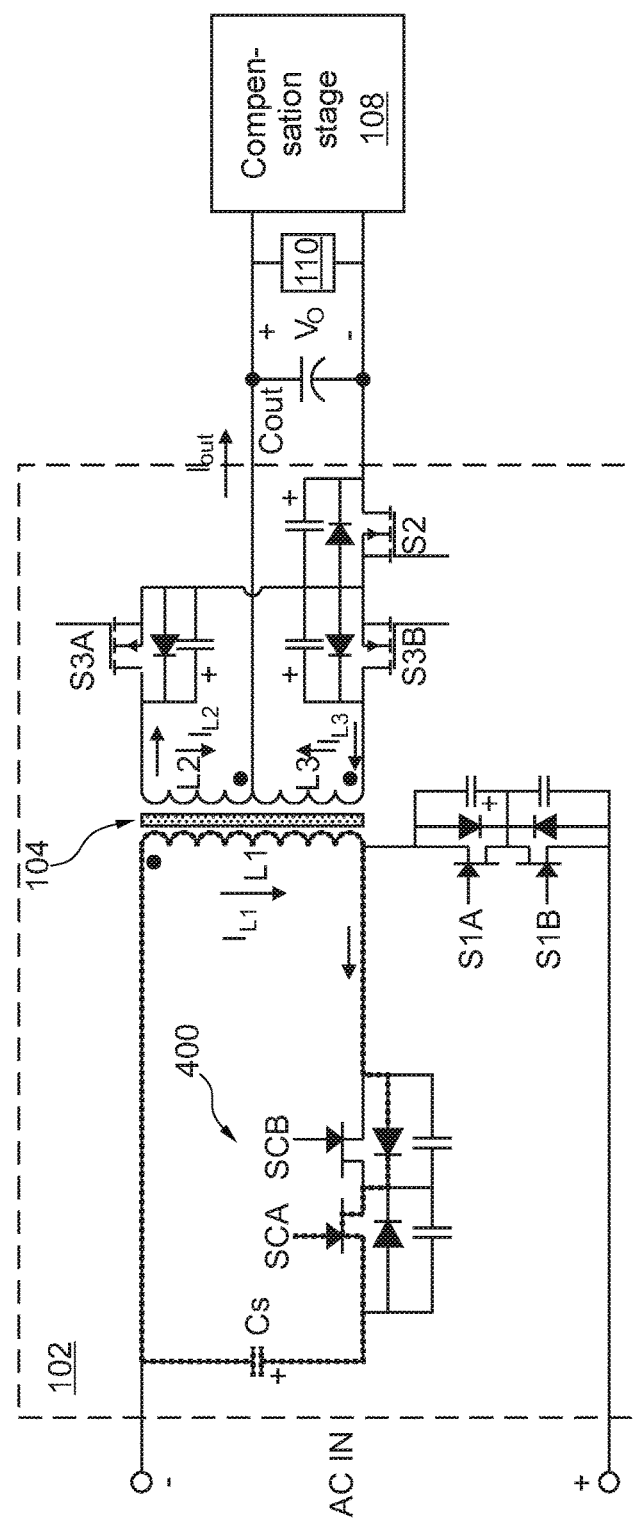
FIGS. 28A through 28F illustrate the current flow paths in the power converter circuit during different conduction periods of MODE 5.
Figure 28B:
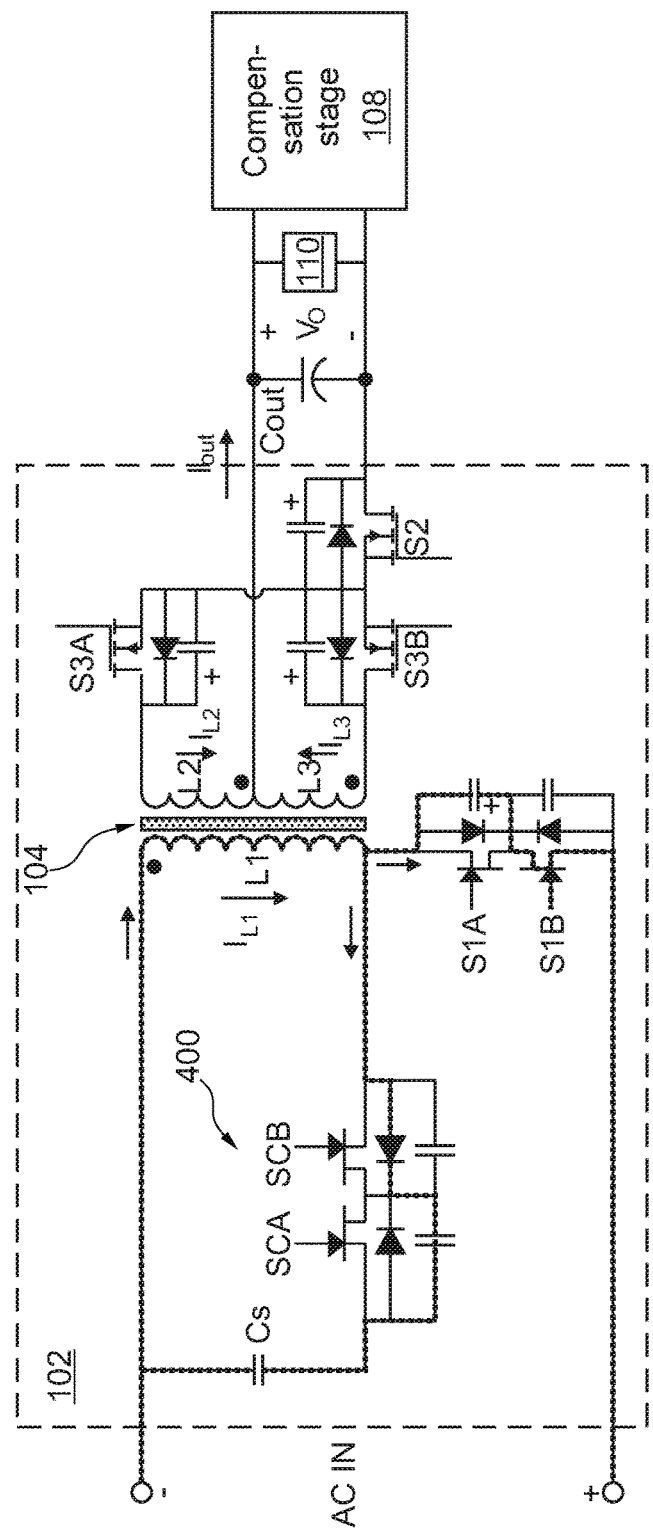

During MODE 5, the polarity of the grid voltage Vin is negative and the clamping capacitor $C_s$ is pre-charged to a voltage equal to $V_T$ with the polarity specified in FIGS. 28A through 28F. During MODE 5, each switching cycle $T_{sw}$ is formed by seven conduction modes as illustrated in FIG. 29 which shows waveforms of the current through the windings L1, L2, L3 of the transformer 104 and of the output current Iout in a switching period Tsw for a negative input voltage.

Conduction Period 1 ($t_0$-$t_1$) of Mode 5:

This conduction period is provided to charge the leakage and magnetizing inductance of the transformer 104 with a positive current $I_{L1}$ to, in the next conduction period, discharge the output capacitance of bidirectional switch device S1A/S1B and to turn S1A/S1B on under ZVS conditions. To do this, switch SCA is turned on as shown in FIG. 28A. Since the clamping capacitor is charged as shown in FIG. 28A, positive current flows through the primary winding L1 of the transformer 104, charging the magnetizing inductance. When this positive current reaches a threshold value, which allows to fully discharge the output capacitance of bidirectional switch S1A/SIB, this conduction mode ends and the next conduction mode begins.

Figure 30:
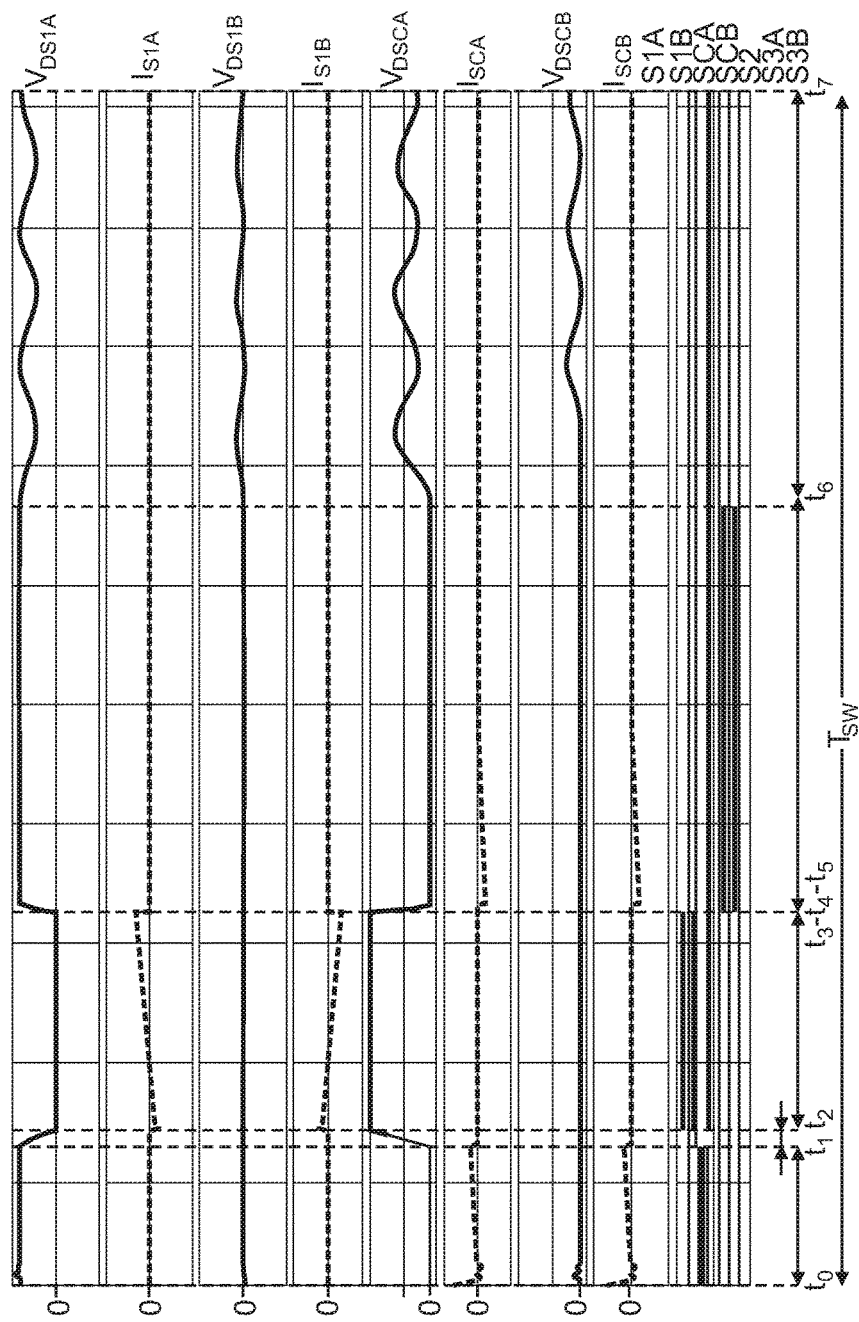
FIGS. 30 and 31 illustrates various waveforms associated with the operation of the bridgeless flyback converter in conduction period 2 of MODE 5.

Conduction Period 2 ($t_1$-$t_2$) of Mode 5:

This conduction period is provided to discharge the output capacitance of bidirectional switch S1A/S1B and to turn S1A/S1B on under ZVS conditions in the next conduction period. At the beginning of this period, switch S1B is turned on in ZVS and switch SCA is turned off as shown in FIGS. 28B and 30. FIG. 30 illustrates waveforms of voltages and currents of the bidirectional switches S1A/S1B and SCA/SCB throughout a switching cycle Tsw for a negative input voltage. Since the leakage and magnetizing inductance of the transformer 104 are driving a positive current $I_{L1}$, the output capacitance of switch S1A starts to get discharged by this current. When the discharge is completed, this conduction period ends and the next conduction period begins.

Figure 28C:
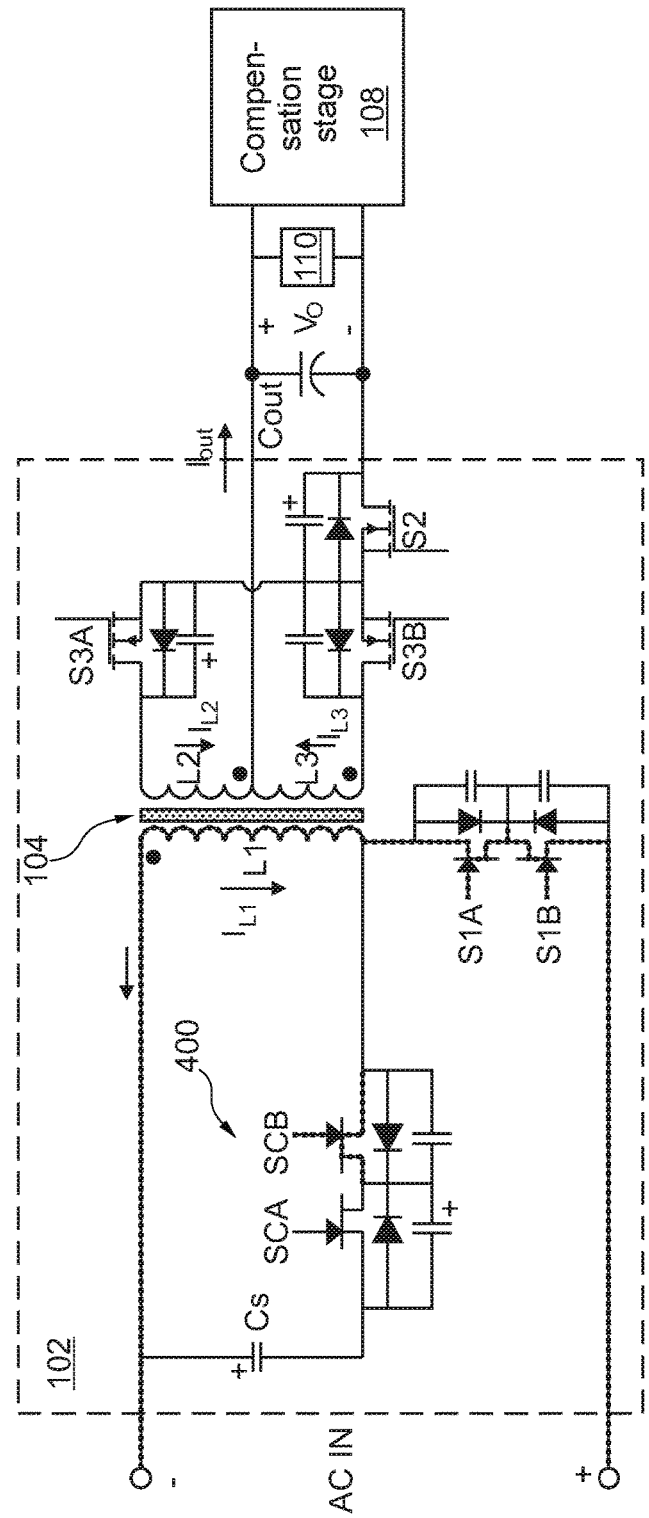
Figure 29:
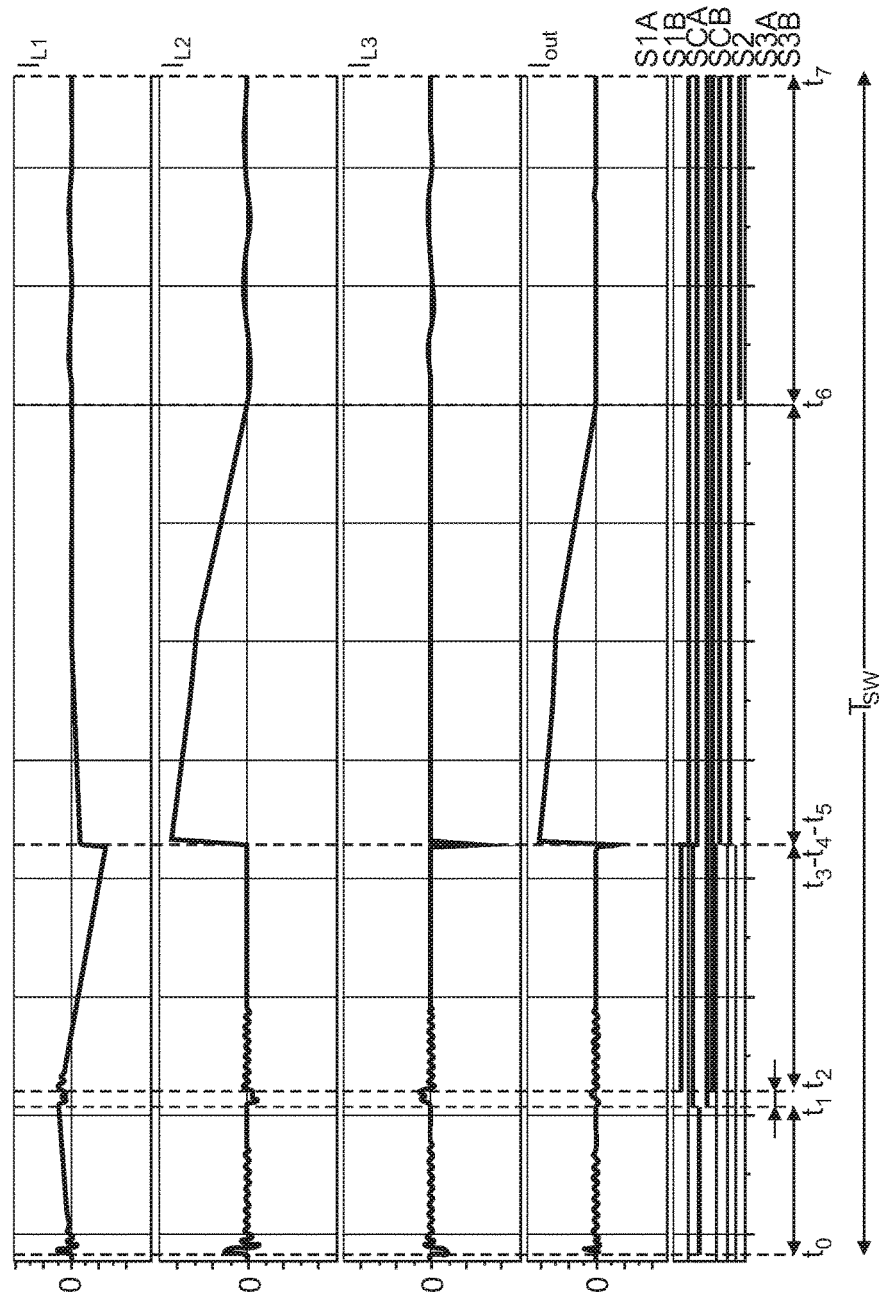
FIG. 29 illustrates various waveforms associated with the operation of the bridgeless flyback converter in conduction period 6 of MODE 5.

Conduction Period 3 ($t_2$-$t_3$) of Mode 5:

The switch states and current path during this conduction period are shown in FIG. 28C. Switches S1A and S1B, which form the bidirectional switch S1A/S1B on the primary side of the converter 102, are both on while only switch SCB of the bidirectional switch SCA/SCB is gated on. Current $I_{L1}$ is negative and flows entirely through the primary winding L1 of the transformer 104, and decreases linearly to charge the magnetizing inductance of the gapped transformer 104. This current flows entirely through bidirectional switch S1A/SIB as shown in FIG. 30. Since the current flows entirely through bidirectional switch S1A/S1B switch SCB is turned on at zero current (ZCS) and zero voltage switching (ZVS), the turn-on loss of switch SCB is zero.

Figure 28D:
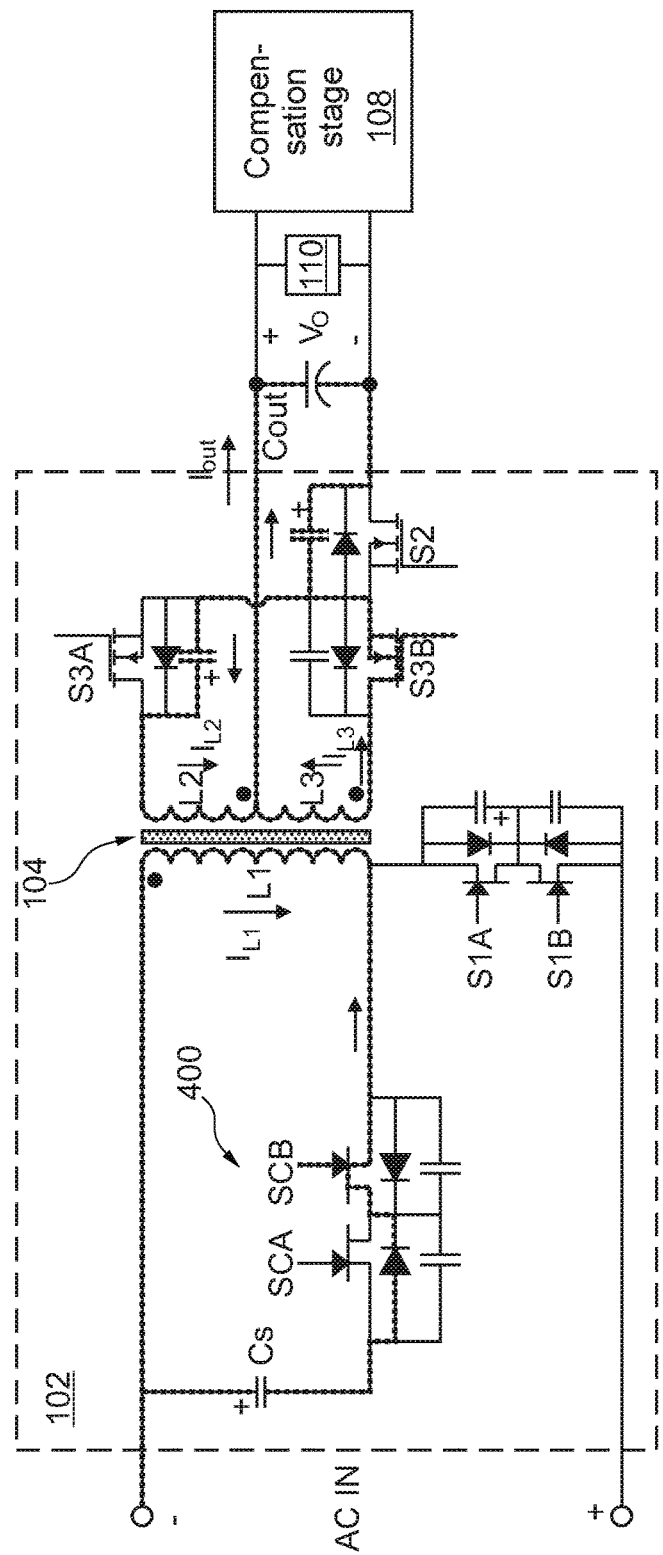
Figure 31:
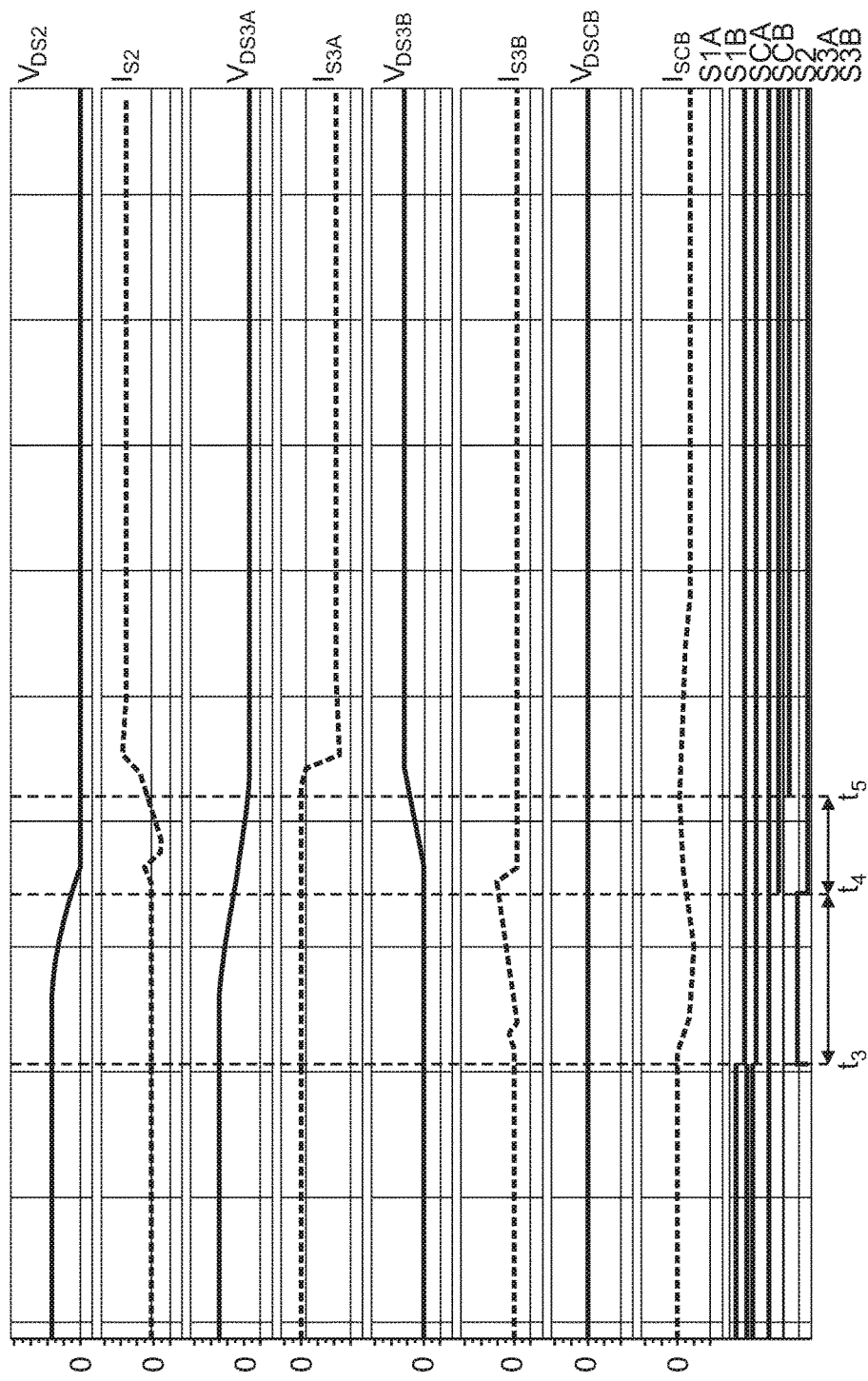

Conduction Period 4 ($t_3$-$t_4$) of Mode 5:

This conduction period is provided to discharge the output capacitance of switch S2 and to turn S2 on under ZVS conditions in the next conduction period. To accomplish this, switch S3B is briefly turned on as shown in FIG. 28D, to allow a path on the secondary side of the converter 102 for a negative current to discharge the output capacitance of switch S2 and partially the discharge the output capacitance of switch S3A. This current tends to discharge the output capacitor Cout as well, but since this conduction period lasts only for a very small fraction of the switching period, this discharge can be neglected. Since this conduction period starts after the turn off of bidirectional switch S1A/S1B, switch SCB is kept on to provide a path on the primary side of the converter 102 for the current to discharge the leakage inductance (snubbering function) of the transformer 104 and thereby prevent an overvoltage. This conduction period lasts until the output capacitance of switch S2 is completely discharged as illustrated in FIG. 31, which shows zoomed waveforms of voltages and currents of switches S2, S3A, S3B around conduction period 2 and 3 of MODE 5 for a negative input voltage.

Figure 28E:
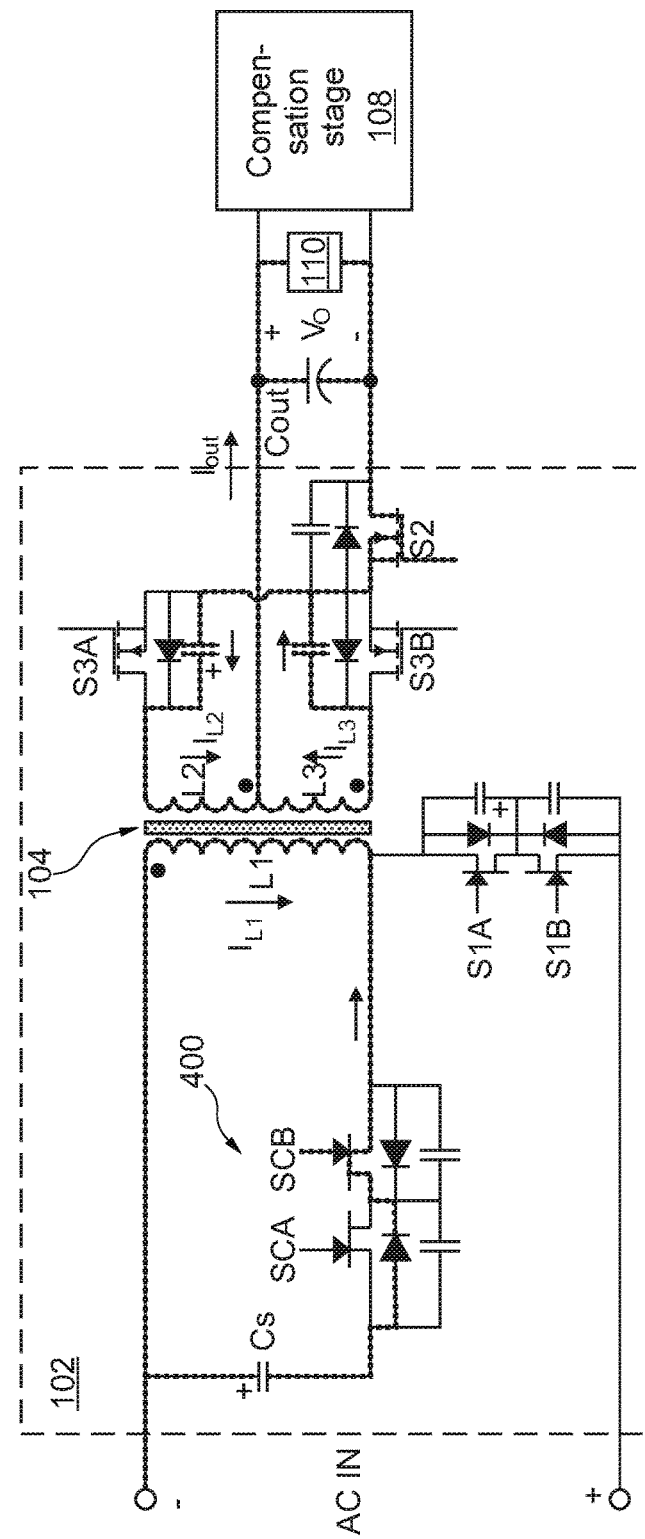

Conducton Period 5 ($t_4$-$t_5$) of Mode 5:

This conduction period is provided to discharge the output capacitance of switch S3A to turn S3A on under ZVS conditions in the next conduction period. The switch configuration and the current path are shown in FIG. 28E. At the beginning of this conduction period, switch S2 is turned on under ZVS conditions. With this switch configuration on the secondary side of the converter 102, the current charges the output capacitance of switch S3B and at the same time discharges the output capacitance of switch S3A. When the output capacitance of switch S3A is completely discharged, the current flows entirely through switch S2 and the body diode of switch S3A so this conduction period can end and switch S3A can be turned on under ZVS condition in the next conduction period.

Figure 28F:
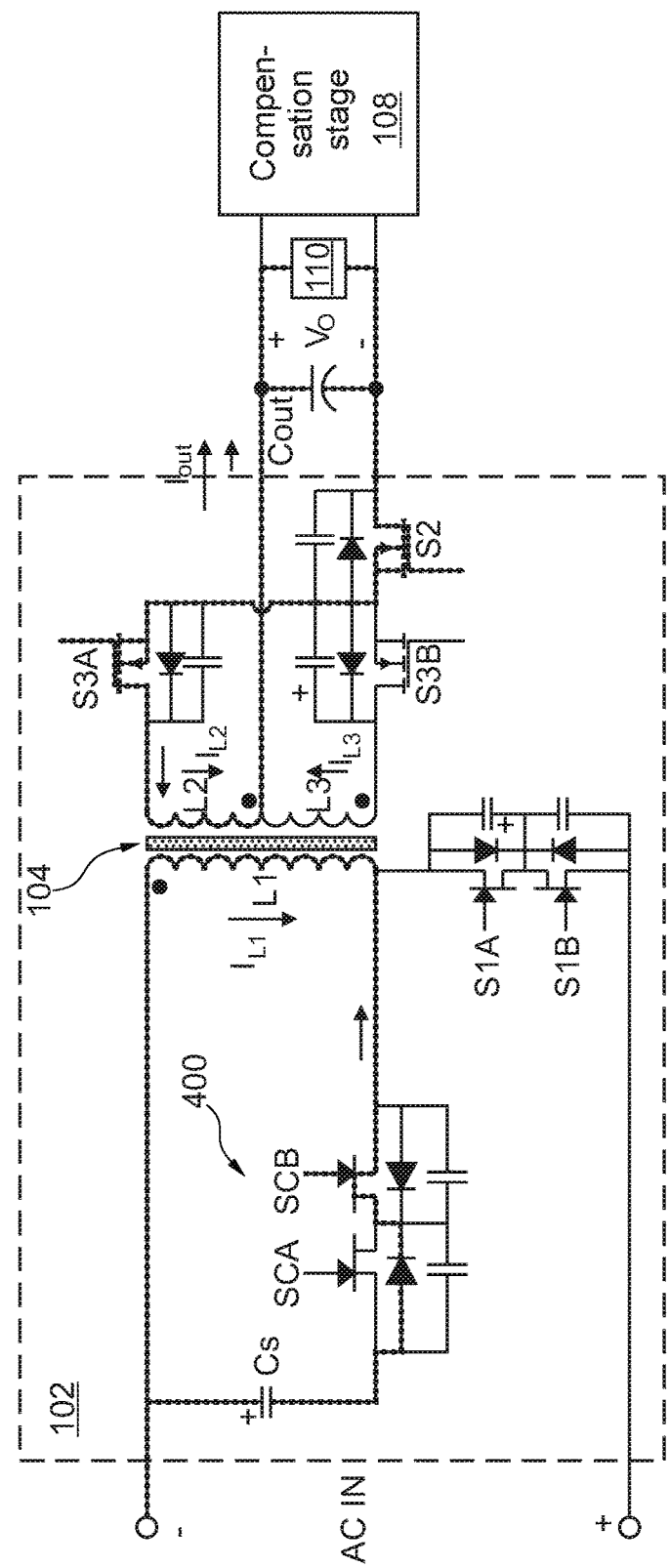

Conduction Period 6 ($t_5$-$t_6$) of Mode 5:

During this conduction period, the magnetizing inductance of the transformer 104 is discharged to the load 110. The switch configuration of the converter 102 is shown in FIG. 28F and the waveform of the current flowing through the secondary side windings L2, L3 of the transformer is shown in FIG. 29. At the beginning of this conduction period, switch S3A is turned on under ZVS conditions to provide synchronous rectification while switch S3B is blocking. With this switch configuration, the current flows only through the lower secondary winding L2 of the transformer 104 and through switches S3A and S2 to provide energy to the load 110 while no current flows through the upper secondary winding L3 of the transformer 104. This conduction period ends when the current flowing through secondary winding L2 becomes zero. At this point, switches S2 and S3A are turned off under zero current switching (ZCS) conditions and their turn off losses are virtually eliminated.

Conduction Period 7 ($t_6$-$t_7$) of Mode 5:

During this conduction period, the converter 102 is essentially idling and waiting for the end of the switching period since the converter 102 is operating at a fixed frequency. As shown in FIG. 16, all switches are off and no energy is provided to the load 100 and no energy is absorbed from the AC source AC IN during this conduction period. A new switching cycle begins at the end of this conduction period.

Mode 3/Mode 6

MODE 3 and MODE 6 are provided to discharge the clamping capacitor $C_s$ back to the source when the polarity of the input voltage Vin is positive and negative, respectively. The clamping capacitor $C_s$ is discharged back to the source so that the snubbing operation is performed properly. To this end, the clamping capacitor $C_s$ is charged positively (with the highest potential on the lower plate) when the input voltage polarity is positive and negatively (with the highest potential on the upper plate) when the input voltage polarity is negative.

Mode 3

Figure 32A:
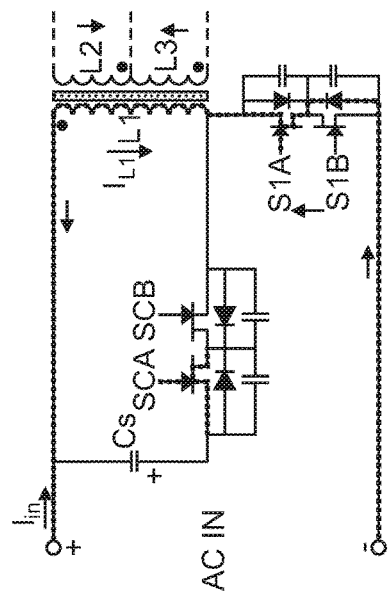
FIGS. 32A through 32O illustrate the current flow paths in the power converter circuit during different conduction periods of MODE 3.
Figure 32B:
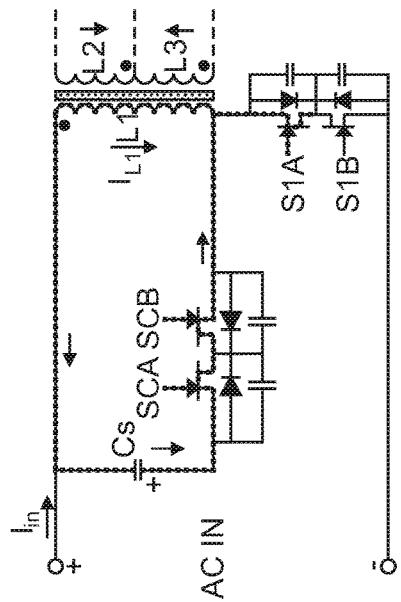
Figure 32C:
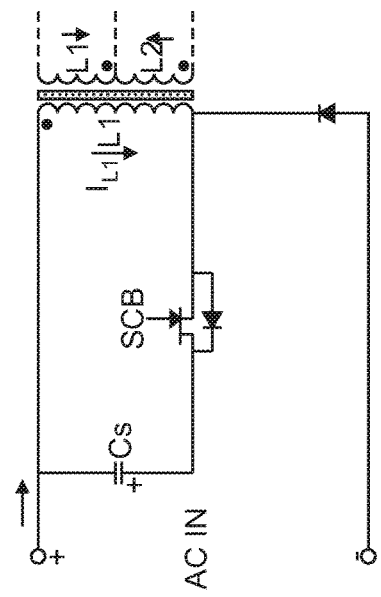

During MODE 3, the clamping capacitor $C_s$ is charged positively (the highest potential is on the lower plate) and the polarity of the input voltage is positive. MODE 3 is provided to transfer back to the source the energy stored into the clamping capacitor $C_s$. The secondary side of the converter 102 is deactivated, and the primary side is controlled as a boost converter as shown in FIGS. 32A through 32C. FIG. 32A shows the current path during conduction period A during MODE 3 and FIG. 32B shows the current path during conduction period B during MODE 3.

During MODE 3, switch S1A is gated on so bidirectional switch S1A/S1B on the primary side of the converter 102 effectively operates as a diode. Also, switch SCA is kept on for the entire MODE 3 while switch SCB is switching. Accordingly, the bidirectional switch SCA/SCB is equivalent to a unidirectional switch. The equivalent circuit of the primary side of the converter 102 during MODE 3 is shown in FIG. 32C. During MODE 3, the primary side can work in CCM, DCM or CRM. Next, only CRM is presented.

Conduction Period A ($t_0$-$t_1$) of Mode 3:

During this conduction period, the magnetizing inductance of the transformer 104 is charged with a linear negative current through the bidirectional switch SCA/SCB and the clamping capacitor $C_s$ is consequently discharging as desired.

Conduction Period B ($t_1$-$t_2$) of Mode 3:

During this conduction period, the magnetizing inductance of the transformer 104 is discharged with a linear negative current through the bidirectional switch S1A/S1B to the source AC IN. Since during this period the input current is negative while the input voltage is positive, power is provided back from the clamping capacitor $C_s$ to the source AC IN.

Figure 33:
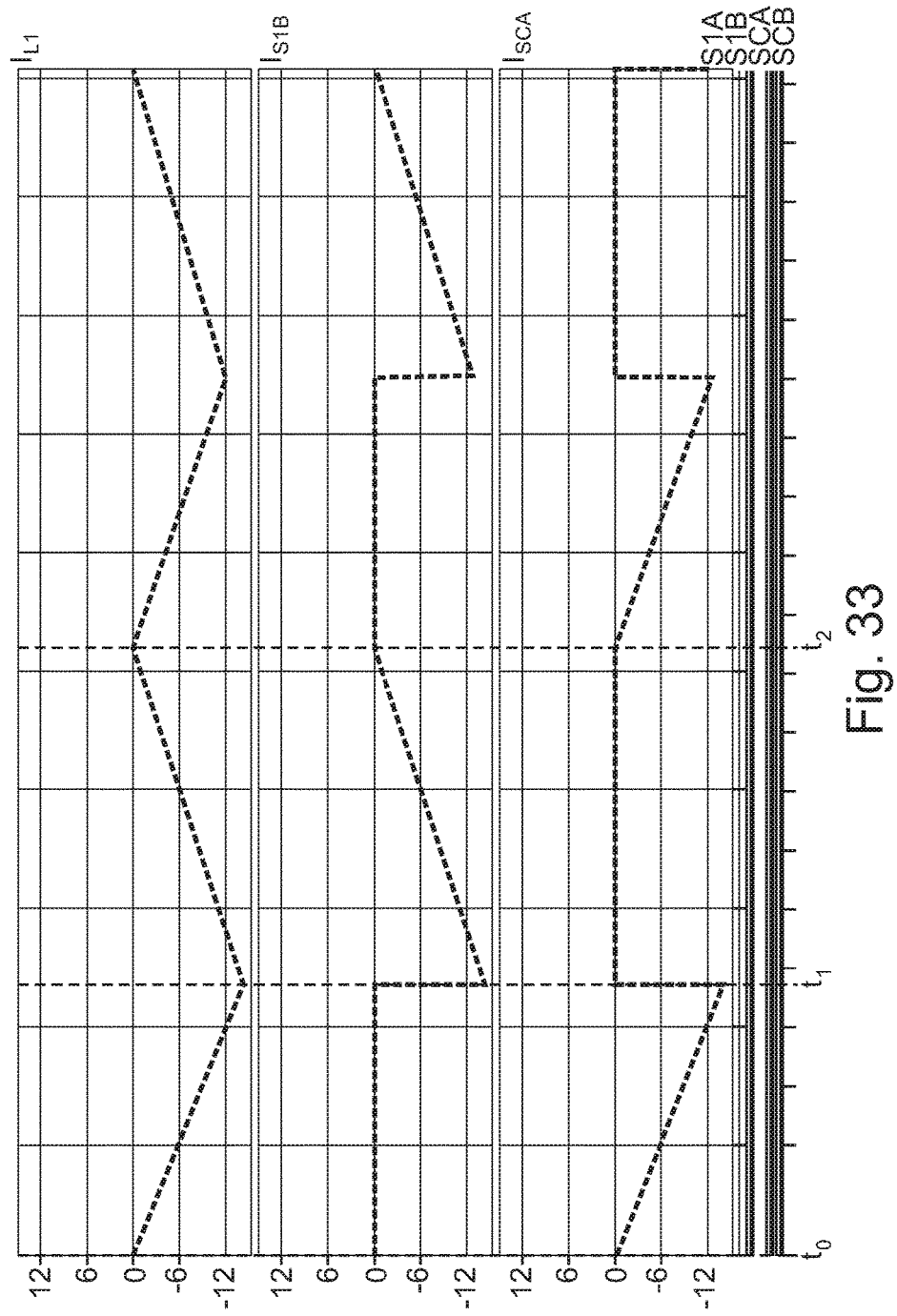
FIG. 33 illustrates various waveforms associated with the operation of the bridgeless flyback converter in MODE 3.

FIG. 33 illustrates waveforms and gate signals over two switching periods for the primary winding L1 of the transformer 104, for the bidirectional switch S1A/S1B and for the bidirectional switch SCA/SCB during MODE 3.

Mode 6

During MODE 6, the clamping capacitor $C_s$ is charged negatively (the highest potential is on the upper plate) and the polarity of the input voltage Vin is negative. MODE 6 provides back to the source AC IN the energy stored into the clamping capacitor $C_s$. The secondary side of the converter 102 is deactivated in MODE 6, and the primary side is controlled as a boost converter as shown in FIGS. 34A through 34C.

Figure 34A:
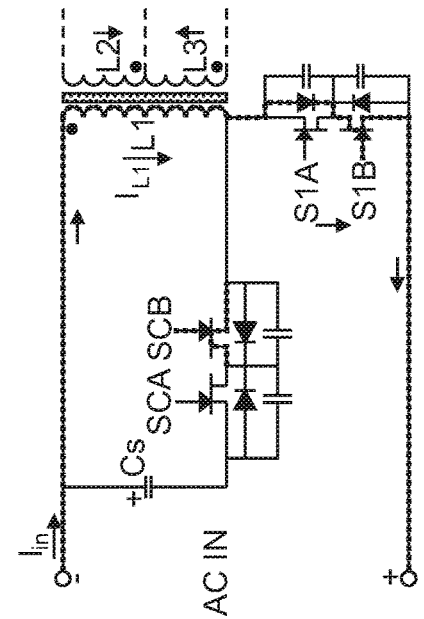
FIGS. 34A through 34C illustrate the current flow paths in the power converter circuit during different conduction periods of MODE 6.
Figure 34B:
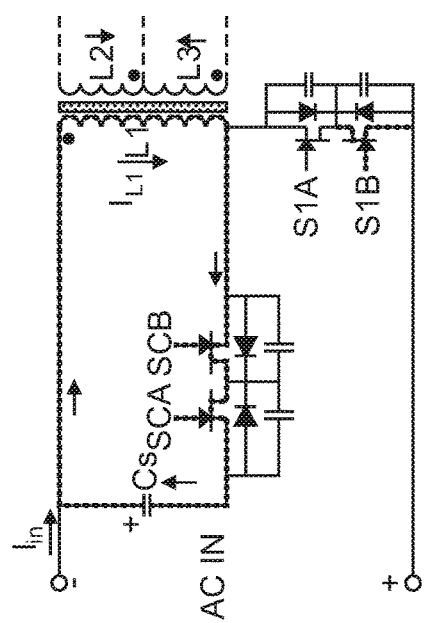
Figure 34C:
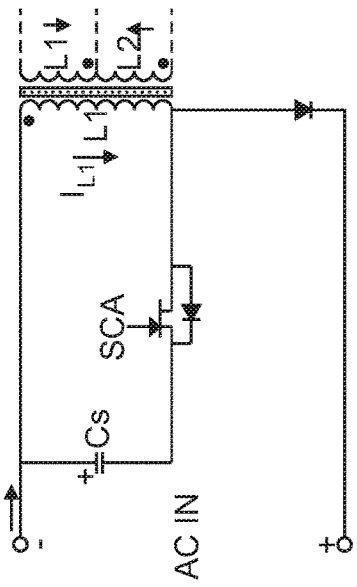

FIG. 34A illustrates the current path during conduction period A of MODE 6 and FIG. 34B illustrates the current path during conduction period B of MODE 6.

Figure 35:
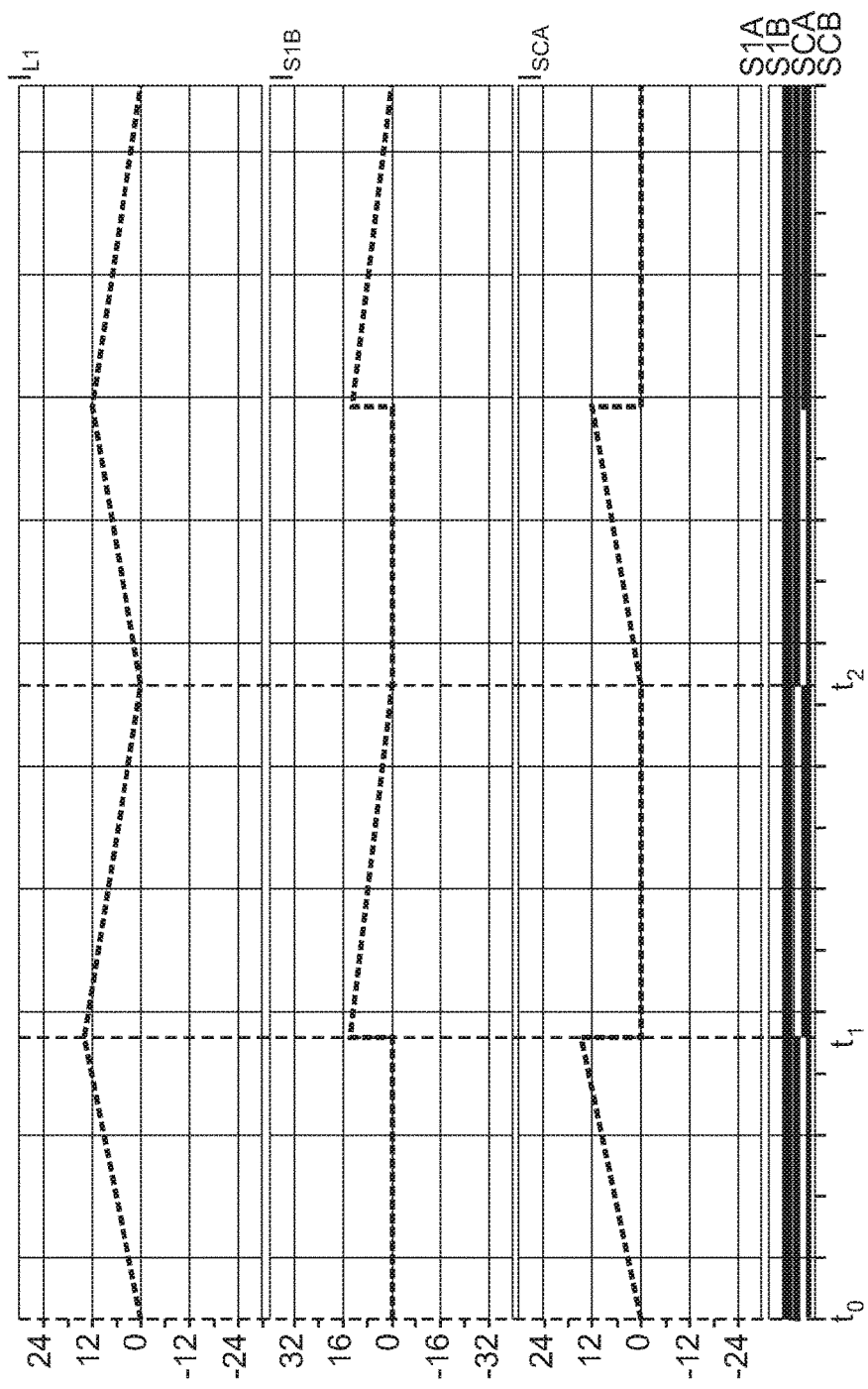
FIG. 35 illustrates various waveforms associated with the operation of the bridgeless flyback converter in MODE 6.

FIG. 35 illustrates waveforms and gate signals over two switching periods for the primary winding L1 of the transformer 104, for the bidirectional switch S1A/S1B and for the bidirectional switch SCA/SCB during MODE 6.

During MODE 6, switch S1B is gated on so bidirectional switch S1A/SIB effectively operates as a diode. Also, switch SCB is kept on for all of MODE 6 while Switch SCA is switching. With this switch configuration, the bidirectional switch SCA/SCB is equivalent to a unidirectional switch. The equivalent circuit of the primary side of the converter 102 during this operation mode is shown in FIG. 34C. Opposite to FIG. 32C, the diode and the unidirectional switch are simply flipped with respect to the ones in MODE 3. During MODE 6, the primary side of the converter 102 can work in CCM, in DCM or CRM. Next, only CRM is presented.

Conduction Period A ($t_0$-$t_1$) of Mode 6:

During this conduction period, the magnetizing inductance of the transformer 104 is charged with a linear positive current through bidirectional switch SCA/SCB and the clamping capacitor $C_s$ is consequently discharging as desired.

Conduction Period B ($t_1$-$t_2$) of Mode 6:

During this conduction period, the magnetizing inductance of the transformer 104 is discharged with a linear positive decreasing current through bidirectional switch S1A/S1B to the source AC IN. Since during this phase the input current is positive while the input voltage Vin is negative, power is provided back from the clamping capacitor $C_s$ to the source AC IN.

Mode 1/Mode 4

The clamping capacitor $C_s$ is pre-charged to a voltage value equal to VT every half switching period during MODE 1 and MODE 4.

During conduction period 6 of MODE 2, the magnetizing inductance Lm of the transformer 104 has already been charged and the aim is to discharge Lm to the load 110 through switches S3B and S2. At the same time, switch SCA is kept on to ensure the snubbing function as previously described herein.

If the voltage of the clamping capacitor $C_s$ is lower than the voltage of the output capacitor Cout, the diode on the primary side of the converter 102 will remain permanently forward biased so the current will flow from the output capacitor Cout, which will be discharged, to the clamping capacitor $C_s$ which will be charged. Instead of providing energy from the source AC IN to the load 110, the converter 102 instead absorbs energy from the load (output capacitor) to charge the clamping capacitor $C_s$. This is undesirable for two reasons. First, the output capacitor Cout is discharged when instead of being charged. Second, the negative current Iout which exits from Cout is only limited by the parasitic resistances of the components and therefore can be very high and potentially destructive. To avoid this issue, the clamping capacitor $C_s$ is pre-charged to a voltage at least equal to the one of the output capacitor Cout multiplied by the turn ratio n of the transformer 102. In this way, the diode on the primary side of the converter 102 is reverse biased and no current flow throughs the diode, avoiding the discharging of the output capacitor Cout to the clamping capacitor $C_s$.

Mode 1

During MODE 1, the input voltage $V_{in}$ is positive and the clamping capacitor $C_s$ starts initially discharged. To positively pre-charge the clamping capacitor $C_s$, the secondary side of the converter 102 is disabled and the primary side is operated as a buck-boost converter as shown in FIGS. 36A through 36C.

FIG. 36A illustrates the current path during conduction period A of MODE 1. FIG. 36B illustrates the current path during conduction period B of MODE 1. FIG. 36C illustrates the equivalent circuit of the primary side during of the converter 102 during MODE 1.

Figure 37:
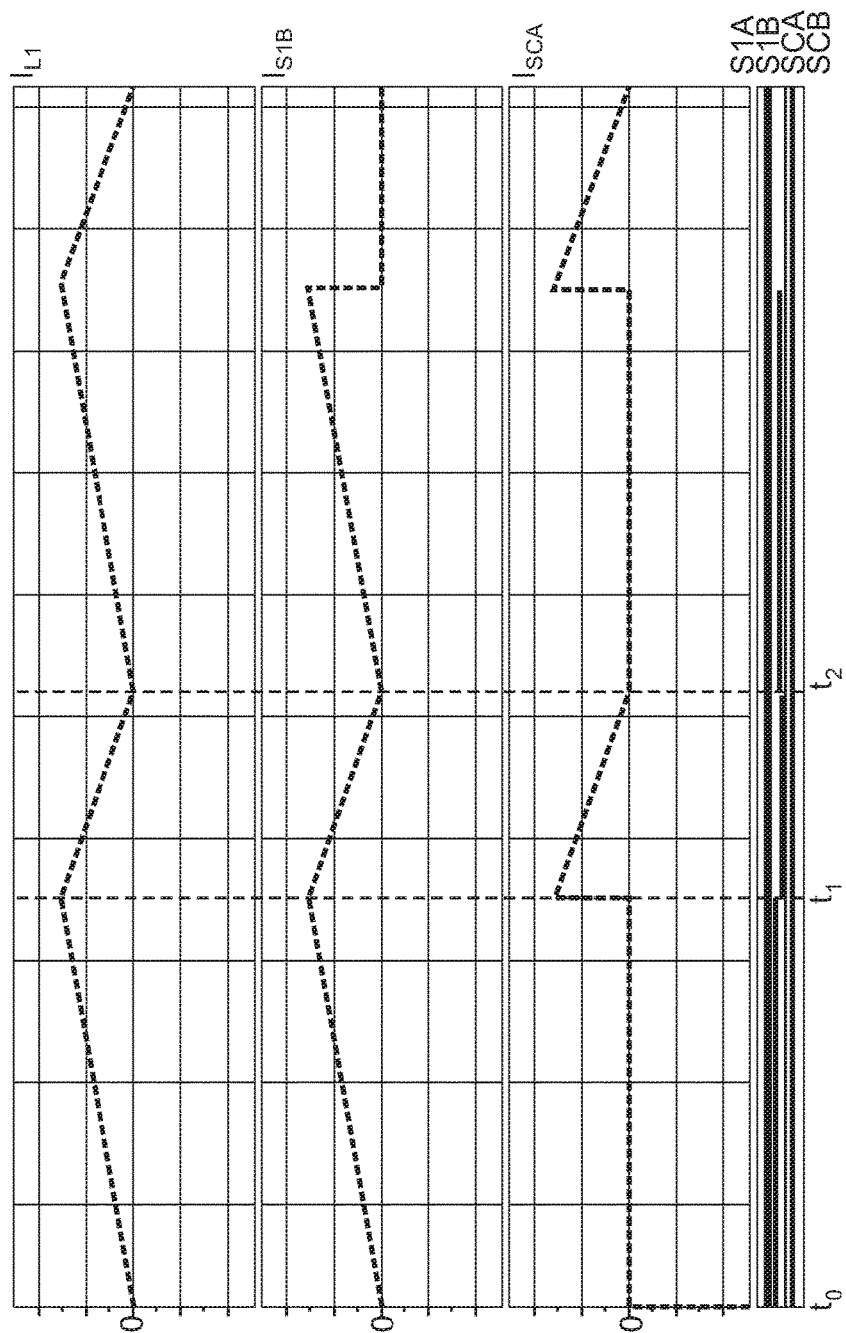
FIG. 37 illustrates various waveforms associated with the operation of the bridgeless flyback converter in MODE 1.

FIG. 37 illustrates waveforms and gate signals over two switching periods for bidirectional switch S1A/S1B and for bidirectional switch SCA/SCB on the primary side of the converter 102.

Conduction Period A ($t_0$-$t_1$) of Mode 1:

During this conduction period, the magnetizing inductance of the transformer 104 is charged with a linear positive current through bidirectional switch S1A/S1B and the AC source AC IN whose polarity is positive.

Conduction Period B ($t_1$-$t_2$) of Mode 1:

During this conduction period, the magnetizing inductance of the transformer 104 is discharged with a linear positive decreasing current through bidirectional switch SCA/SCB to the clamping capacitor $C_s$ which is consequently charged positively.

Mode 4

Figure 38B:
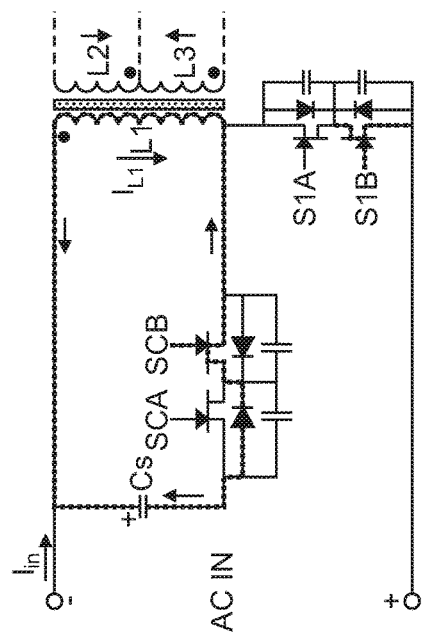
FIGS. 38A through 38O illustrate the current flow paths in the power converter circuit during different conduction periods of MODE 4.
Figure 38A:
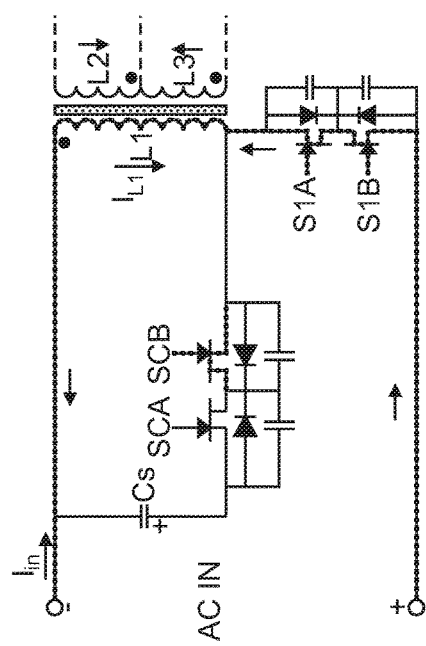
Figure 38C:
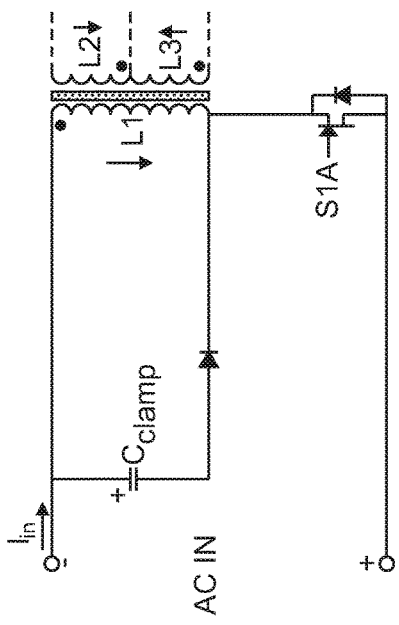

During MODE 4, the input voltage $V_{in}$ is negative and the clamping capacitor $C_s$ starts initially discharged. To negatively pre-charge the clamping capacitor $C_s$, the secondary side of the converter 102 is disabled and the primary side is operated as a buck-boost converter as shown in FIGS. 38A through 38C. FIG. 38A illustrate the current path during conduction period A of MODE 4. FIG. 38B illustrates the current path during conduction period B of MODE 4. FIG. 38C illustrates the equivalent circuit of the primary side of the converter 102 during MODE 4.

Figure 39:
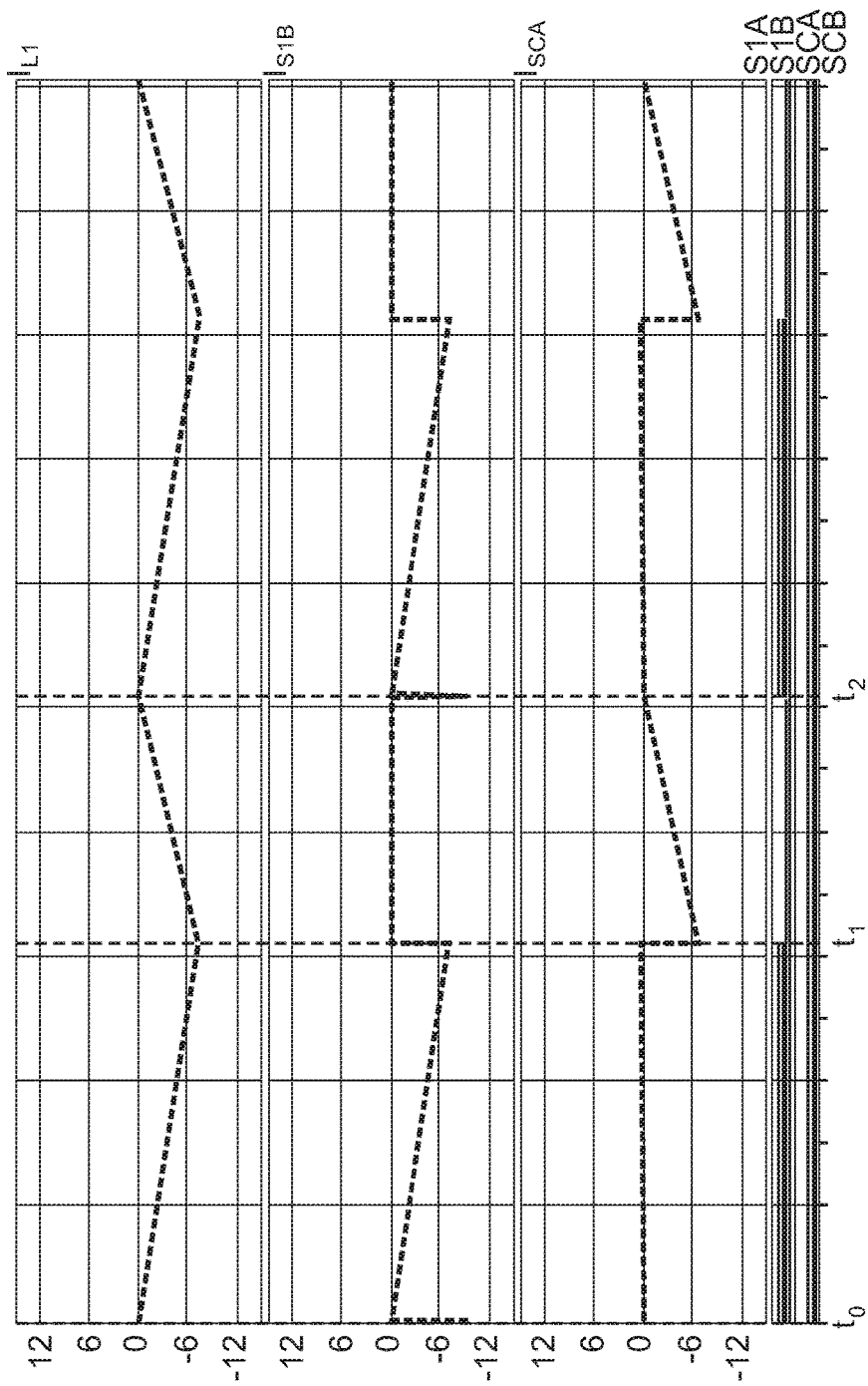
FIG. 39 illustrates various waveforms associated with the operation of the bridgeless flyback converter in MODE 4.

FIG. 39 illustrates waveforms and gate signals over two switching periods for bidirectional switch S1A/S1B and for bidirectional switch SCA/SCB on the primary side of the converter.

Conduction Period A ($t_0$-$t_1$) of Mode 4:

During this conduction period, the magnetizing inductance of the transformer 104 is charged with a linear negative current through bidirectional switch S1A/S1B and the AC source AC IN whose polarity is negative.

Conduction Period B ($t_1$-$t_2$) of Mode 4:

During this conduction period, the magnetizing inductance of the transformer 104 is discharged with a linear negative increasing current through bidirectional switch SCA/SCB to the clamping capacitor $C_s$ which is consequently charged negatively.

Start-Up

During the entire start-up phase, the load 110 is disconnected from the converter 102 by a pass-transistor (not shown). As previously mentioned herein in connection with FIGS. 16 and 17, to perform the start-up, a normally-on device is included on the secondary side of the converter 102 to provide a path for the current on the secondary side before the awakening the secondary side gate drivers and controller.

Figure 40:
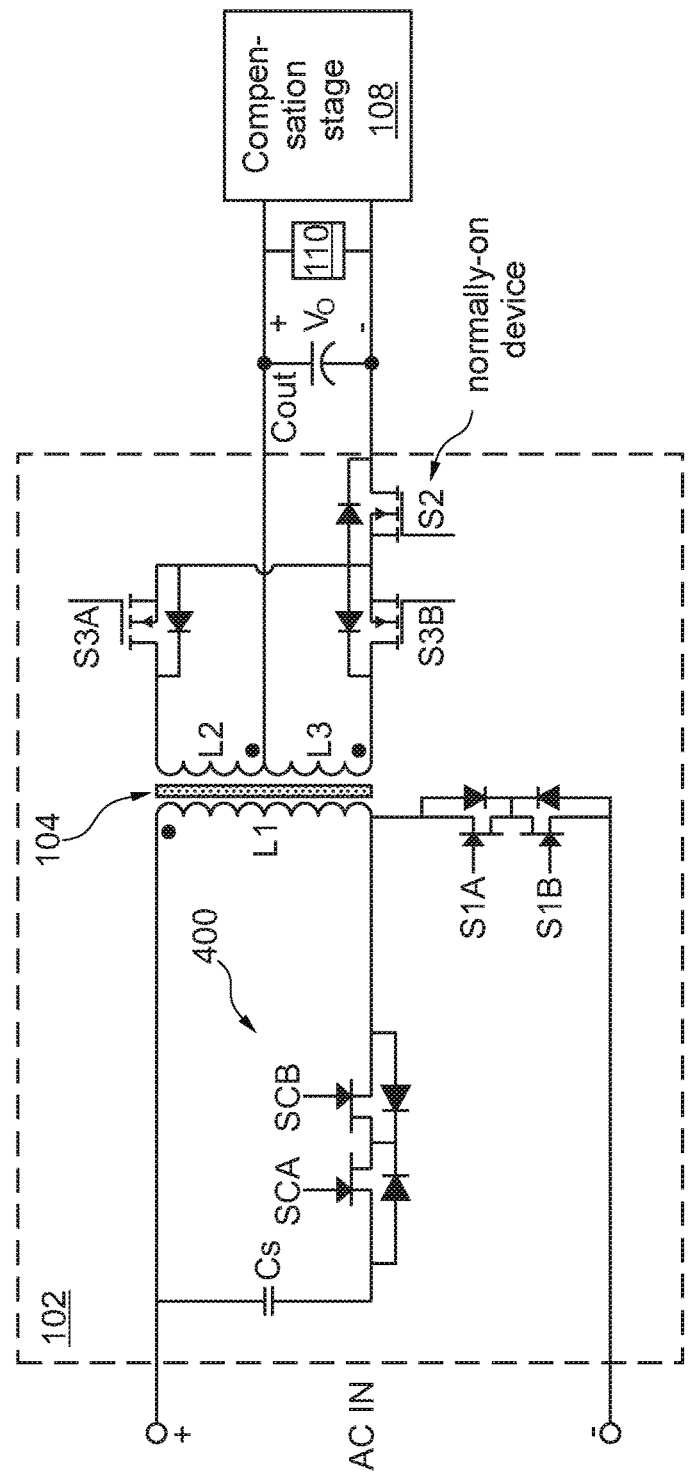
FIG. 40 illustrates a first embodiment of a start-up circuit on the secondary side of the bridgeless flyback converter.

FIG. 40 illustrates a first embodiment of a configuration that allows for the start-up of the converter 102. According to this embodiment, switch device S2 in FIGS. 16 and 17 is implemented as a normally-on device such as a normally-on GaN HEMT or a depletion mode MOSFET.

Figure 41:
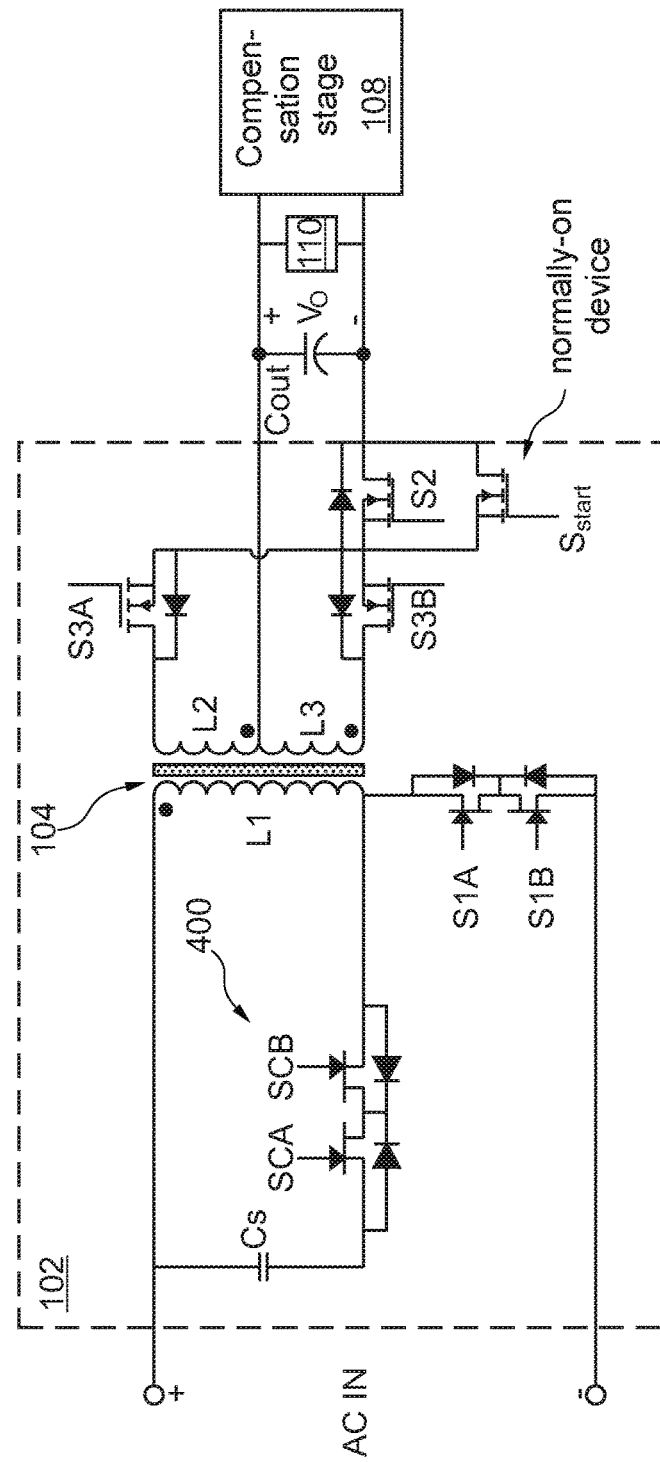
FIG. 41 illustrates a second embodiment of a start-up circuit on the secondary side of the bridgeless flyback converter.

FIG. 41 illustrates a second embodiment of a configuration that allows for the start-up of the converter 102. According to this embodiment, switch device S2 in FIGS. 16 and 17 is implemented as a normally-off device such as an enhancement mode MOSFET connected in parallel with a normally-on device $S_{tart}$ such as a GaN HEMT or a depletion mode MOSFET.

Figure 42:
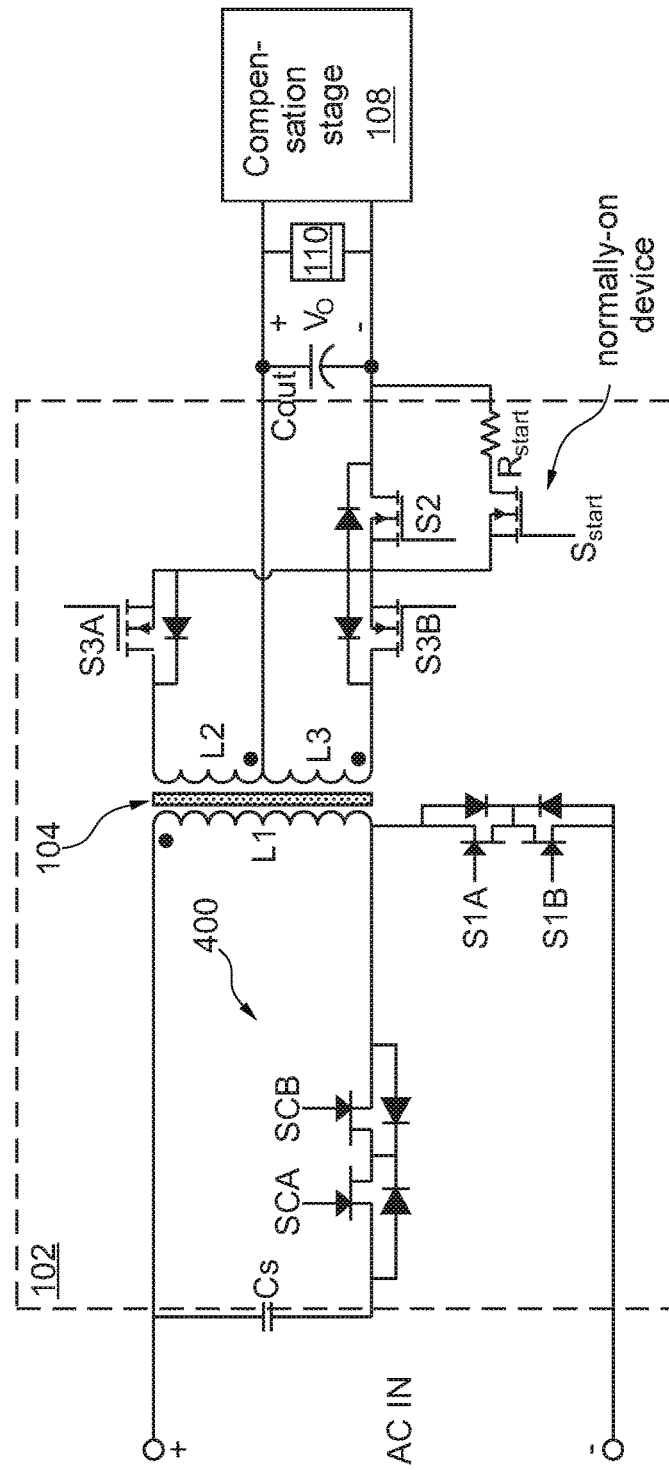
FIG. 42 illustrates a third embodiment of a start-up circuit on the secondary side of the bridgeless flyback converter.

FIG. 42 illustrates a third embodiment of a configuration that allows for the start-up of the converter 102. According to this embodiment, switch device S2 in FIGS. 16 and 17 is implemented as a normally-off device such as an enhancement mode MOSFET connected in parallel with a normally-on device $S_{tart}$ such as a GaN HEMT or a depletion mode MOSFET and a series-connected resistor $R_{start}$.

During the entire start-up phase, the normally-on switch S2 is on so the converter 102 cannot be controlled as a flyback since it is not possible to block the current on the secondary side. During the start-up phase, the output capacitor $C_{out}$ is charged. The desired side effect of this pre-charging is a simultaneous charge of the clamping capacitor $C_s$.

Figure 43:
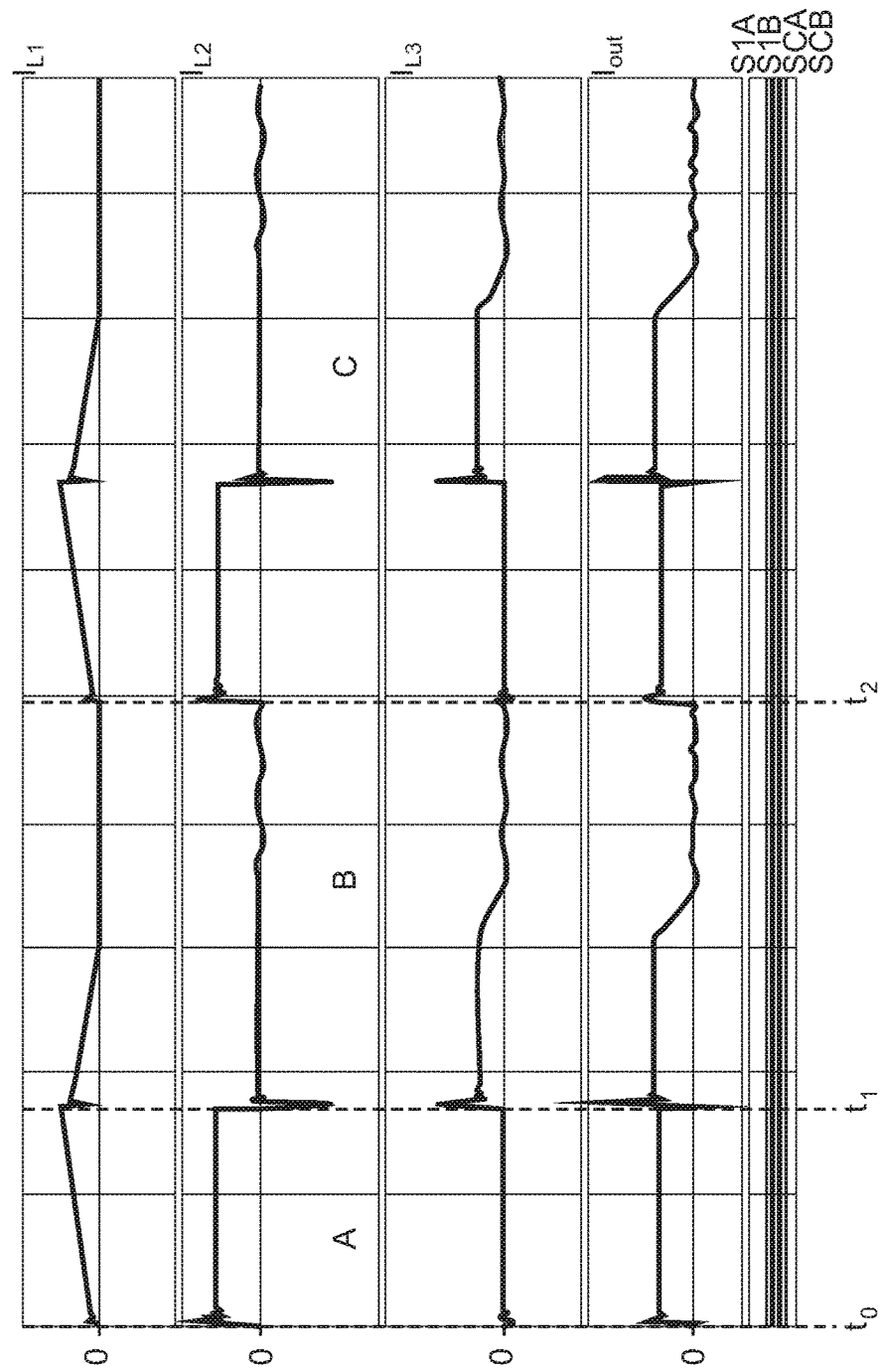
FIG. 43 illustrates various waveforms associated with the operation of the bridgeless flyback converter during a start-up phase.

FIG. 43 illustrates waveforms of the current IL1, IL2, IL3 of the transformer windings L1, L2, L3 and of the output current Iout during the start-up phase.

Figure 44A:
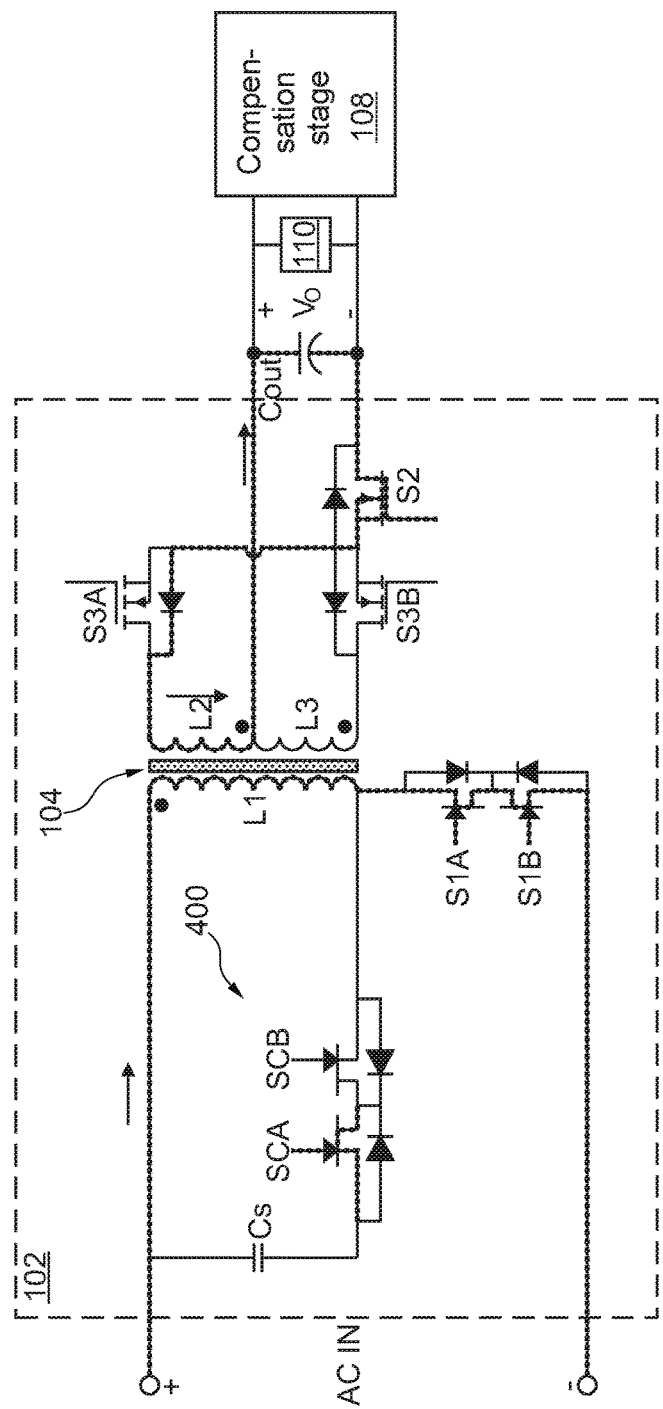
FIG. 44A illustrates various waveforms associated with the operation of the bridgeless flyback converter in conduction period A of the start-up phase.

Conduction Period A of Start-Up Phase:

FIG. 44A illustrates the current path during conduction period A of the start-up phase, in which bidirectional switch S1A/S1B and switch SCA on the primary side of the converter are turned on. The input current is positive and flows partly through the magnetizing inductance $L_r$ of the transformer 104 and partly through the upper secondary winding L2 of the transformer 104 and charges the output capacitor $C_{out}$. The current $I_{Lm}$ which flows through the magnetizing inductance of the transformer 104 is positive and linearly increasing as shown in FIG. 43, while the current Iout flowing through the output capacitor Cout is constant and equal to:

$$I_{out} = \frac{\frac{V_{in}(t)}{n} - V_{out}(t)}{R_{start}} \quad (1)$$

where $V_{in}(t)$ and $V_{out}(t)$ are the values of the input voltage and of the output voltage, respectively, during the switching cycle under consideration.

Figure 44B:
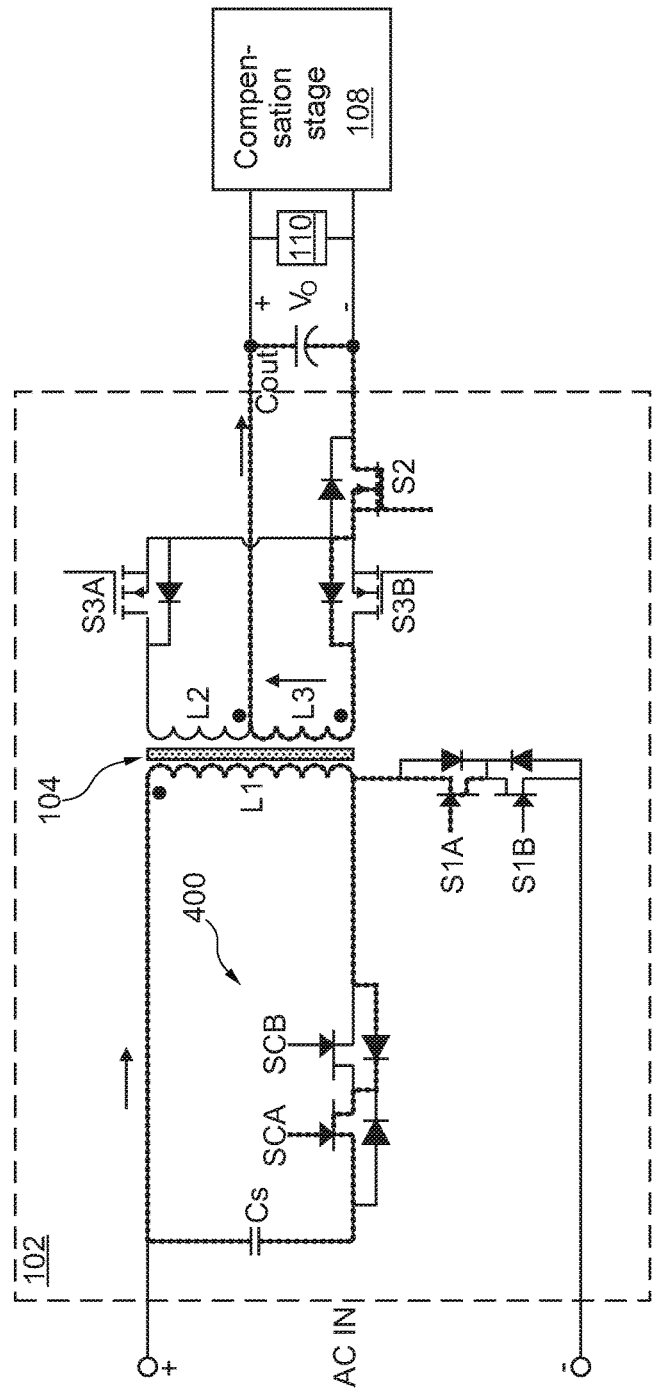
FIG. 44B illustrates various waveforms associated with the operation of the bridgeless flyback converter in conduction period B of the start-up phase.

Conduction Period B of Start-Up Phase:

FIG. 44B illustrates the current path during conduction period B of the start-up phase, in which bidirectional switch S1A/S1B is turned off while switch SCA remains on. The magnetizing inductance of the transformer 104 is discharged with a linearly decreasing current. Part of this current flows through the clamping capacitor $C_s$ on the primary side of the converter 102, and part of the current is transferred to the secondary side and charges the output capacitor Cout through the lower secondary winding L3 of the transformer 104, the body diode of switch S3B and normally-on device S2 or $S_{start}$. The output current during this phase is equal to:

$$I_{out} = \frac{\frac{V_{Cclamp}(t)}{n} - V_{out}(t)}{R_{start}} \quad (2)$$

Equations (1) and (2) show that $R_{start}$ is the only limiting factor for the output current $I_{out}$. For this reason, the on resistance $R_{start}$ of normally-on device S2 or $S_{start}$ should be properly chosen to prevent the failure of the components of the converter 102 due to overcurrent. One embodiment to determine $R_{start}$ is to consider the worst case (maximum input voltage and output capacitor completely discharged) as follows:

$$R_{start} = \frac{V_{in,max}}{nI_{out,max}} \quad (3)$$

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A circuit, comprising:
   a bridgeless flyback converter having a primary side electromagnetically coupled to a secondary side by a transformer, the primary side being devoid of a diode bridge rectifier;
   an input capacitor coupled to the primary side of the bridgeless flyback converter;
   an output capacitor coupled to the secondary side of the bridgeless flyback converter;
   an EMI (electromagnetic interference) filter coupled between an AC input and the input capacitor; and
   a compensation stage coupled in parallel with the output capacitor and including a storage capacitor,
   wherein the input capacitor has a capacitance such that the compensation stage filters the AC mains frequency ripple of the AC input from the secondary side,
   wherein the compensation stage is configured to store energy in the storage capacitor and regulate the voltage across the output capacitor,
   wherein the bridgeless flyback converter is configured to regulate the voltage across the storage capacitor.

2. The circuit of claim 1, wherein the compensation stage comprises a buck, boost or buck-boost converter coupled to the storage capacitor through an inductor.

3. The circuit of claim 1, wherein the bridgeless flyback converter comprises at least one bidirectional switch device or more than one discrete device that create a bi-directional blocking function on each side of the bridgeless flyback converter.

4. The circuit of claim 1, wherein the secondary side of the bridgeless flyback converter comprises a first bidirectional switch device connected to a first secondary side winding of the transformer and a second bidirectional switch device connected to a second secondary side winding of the transformer, and wherein a midpoint of the first bidirectional switch device is connected to a midpoint of the second bidirectional switch device.

5. The circuit of claim 1, wherein the primary side of the bridgeless flyback converter comprises a first bidirectional switch device connected to a first primary side winding of the transformer, wherein the secondary side of the bridgeless flyback converter comprises a reverse blocking switch device and two diodes or synchronous rectification devices, and wherein each diode is connected to a different secondary side winding of the transformer the reverse blocking switch device is connected to both diodes or synchronous rectification devices.

6. The circuit of claim 1, wherein the primary side of the bridgeless flyback converter comprises a series-connected active clamp device and capacitor coupled in parallel with a primary side winding of the transformer, and wherein the series-connected active clamp device and capacitor are configured to recycle leakage energy of the transformer in both directions.

7. The circuit of claim 1, further comprising first and second active clamps coupled in parallel with a primary side winding of the transformer, wherein each active clamp comprises a clamping transistor connected in series with a clamping capacitor, and wherein the second active clamp is arranged antiparallel to the first active clamp.

8. The circuit of claim 1, further comprising an active clamp device having a clamping capacitor on the primary side, and a controller operable to:
  in a first mode, operate the primary side as a buck-boost converter and disable the secondary side so that the clamping capacitor pre-charges to a voltage $-V_T$, no energy is provided from the AC input to a load of the circuit, and a voltage of the load is kept constant by the compensation stage;
  in a second mode, operate the primary and secondary sides as a flyback converter with a positive input voltage and enable the secondary side so that energy is provided from the AC input to the load;
  in a third mode, operate the primary side as a buck-boost converter so that the clamping capacitor either discharges back to the AC input capacitor or discharges to the load, and the load voltage is kept constant by the compensation stage;
  in a fourth mode, operate the primary side as a buck-boost converter and disable the secondary side so that the clamping capacitor pre-charges to a voltage $V_T$, no energy is provided from the AC input to the load, and the load voltage is kept constant by the compensation stage;
  in a fifth mode; operate the primary and secondary sides as a flyback converter with a negative input voltage and enable the secondary side so that energy is provided from the AC input to the load; and
  in a sixth mode, operate the primary side as a buck-boost converter so that the clamping capacitor either discharges back to the AC input capacitor or discharges to the load, and the load voltage is kept constant by the compensation stage.

9. The circuit of claim 1, further comprising:
  a first switch device configured to disconnect a load of the bridgeless flyback converter during a start-up phase of the bridgeless flyback converter in which the voltage across the output capacitor is not high enough to power gate drivers and control logic on the secondary side; and
  a second device configured to provide a path current to flow on the secondary side during the start-up phase.

10. The circuit of claim 9, wherein the second switch device comprises a normally-on transistor device connected between a secondary side winding of the transformer and the compensation stage.

11. The circuit of claim 9, wherein the second switch device comprises a parallel-connected normally-off transistor device connected and a normally-on transistor device connected between a secondary side winding of the transformer and the compensation stage.

12. The circuit of claim 9, wherein the second switch device comprises a parallel connected normally-off transistor device and normally-on transistor device connected in series with a resistor between a secondary side winding of the transformer and the compensation stage.

13. The circuit of claim 1, wherein the primary side of the bridgeless flyback converter comprises a bi-directional freewheeling path configured to achieve zero voltage switching for a primary side switch device connected in series with a primary side winding of the transformer.

14. The circuit of claim 1, wherein the secondary side of the bridgeless flyback converter comprises a bi-directional freewheeling path configured to achieve zero voltage switching for a primary side switch device connected in series with a primary side winding of the transformer.

15. A method of operating a circuit having a bridgeless flyback converter with a primary side electromagnetically coupled to a secondary side by a transformer, the primary side being devoid of a diode bridge rectifier, an input capacitor coupled to the primary side of the bridgeless flyback converter, an output capacitor coupled to the secondary side of the bridgeless flyback converter, an EMI (electromagnetic interference) filter coupled between an AC input and the input capacitor, and a compensation stage coupled in parallel with the output capacitor and including a storage capacitor, the method comprising:
  filtering the AC mains frequency ripple of the AC input from the secondary side via the compensation stage;
  storing energy in the storage capacitor and regulating the voltage across the output capacitor; and
  regulating the voltage across the storage capacitor via the bridgeless flyback converter.

16. The method of claim 15, further comprising:
  recycling leakage energy of the transformer in both directions via a series-connected active clamp device and capacitor coupled in parallel with a primary side winding of the transformer.

17. The method of claim 15, wherein the circuit further includes an active clamp device having a clamping capacitor on the primary side, the method further comprising:
  in a first mode, operating the primary side as a buck-boost converter and disabling the secondary side so that the clamping capacitor pre-charges to a voltage $-V_T$, no energy is provided from the AC input to a load of the circuit, and a voltage of the load is kept constant by the compensation stage;
  in a second mode, operating the primary and secondary sides as a flyback converter with a positive input voltage and enabling the secondary side so that energy is provided from the AC input to the load;
  in a third mode, operating the primary side as a buck-boost converter so that the clamping capacitor either discharges back to the AC input capacitor or discharges to the load, and the load voltage is kept constant by the compensation stage;
  in a fourth mode, operating the primary side as a buck-boost converter and disabling the secondary side so that the clamping capacitor pre-charges to a voltage $V_T$, no energy is provided from the AC input to the load, and the load voltage is kept constant by the compensation stage;
  in a fifth mode, operating the primary and secondary sides as a flyback converter with a negative input voltage and enabling the secondary side so that energy is provided from the AC input to the load; and
  in a sixth mode, operating the primary side as a buck-boost converter so that the clamping capacitor either discharges back to the AC input capacitor or discharges to the load, and the load voltage is kept constant by the compensation stage.

18. The method of claim 15, further comprising:
  disconnecting a load of the bridgeless flyback converter during a start-up phase of the bridgeless flyback converter in which the voltage across the output capacitor is not high enough to power gate drivers and control logic on the secondary side; and
  providing a path for current to flow on the secondary side during the start-up phase.

19. The method of claim 15, further comprising:
  at the end of a previous cycle when de-energizing current from either secondary side winding of the transformer reaches zero, keeping secondary side switch devices of the bridgeless flyback converter on for a time period to energize either secondary side winding of the transformer in a reverse direction; and after the time period expires, turning off the secondary side switch devices so that a bi-directional freewheeling switch on the primary side turns on and the secondary side current is coupled to the primary side as freewheeling current within the bi-directional freewheeling path to achieve zero voltage switching for a primary side switch connected in series with a primary side winding of the transformer.

* * * * *

UNITED STATES PATENT AND TRADEMARK OFFICE
CERTIFICATE OF CORRECTION

PATENT NO. : 10,148,169 B2
APPLICATION NO. : 15/360747
DATED : December 4, 2018
INVENTOR(S) : N. Fontana et al.

It is certified that error appears in the above-identified patent and that said Letters Patent is hereby corrected as shown below:

In the Claims

Column 20, Line 52 (Claim 5, Line 8), please change "the reverse" to -- and the reverse --.

Signed and Sealed this
Twenty-sixth Day of February, 2019

Andrei Iancu
*Director of the United States Patent and Trademark Office*